US011812490B2

(12) United States Patent
Park et al.

(10) Patent No.: US 11,812,490 B2
(45) Date of Patent: Nov. 7, 2023

(54) METHOD FOR PERFORMING COMMUNICATION RELATED TO PACKET SWITCH (PS) DATA OFF

(71) Applicant: LG Electronics Inc., Seoul (KR)

(72) Inventors: Sangmin Park, Seoul (KR); Hyunsook Kim, Seoul (KR); Laeyoung Kim, Seoul (KR); Jaehyun Kim, Seoul (KR); Myungjune Youn, Seoul (KR)

(73) Assignee: LG Electronics Inc., Seoul (KR)

( * ) Notice: Subject to any disclaimer, the term of this patent is extended or adjusted under 35 U.S.C. 154(b) by 69 days.

(21) Appl. No.: 16/797,711

(22) Filed: Feb. 21, 2020

(65) Prior Publication Data

US 2020/0275513 A1 Aug. 27, 2020

(30) Foreign Application Priority Data

Feb. 22, 2019 (KR) .......................... 10-2019-0021390

(51) Int. Cl.
*H04W 76/20* (2018.01)
*H04W 48/04* (2009.01)

(52) U.S. Cl.
CPC .......... *H04W 76/20* (2018.02); *H04W 48/04* (2013.01)

(58) Field of Classification Search
CPC .............................. H04W 76/20; H04W 48/04
USPC ....................................................... 370/310
See application file for complete search history.

(56) References Cited

U.S. PATENT DOCUMENTS

| 2013/0083726 | A1* | 4/2013 | Jain | H04W 4/70 370/328 |
| 2013/0215822 | A1* | 8/2013 | Worrall | H04L 47/34 370/315 |
| 2018/0199281 | A1 | 7/2018 | Huang-Fu et al. | |
| 2018/0199395 | A1* | 7/2018 | Huang-Fu | H04L 67/14 |
| 2019/0103727 | A1* | 4/2019 | Na | G01D 5/30 |
| 2019/0174449 | A1* | 6/2019 | Shan | H04W 60/04 |
| 2020/0288515 | A1* | 9/2020 | Gupta | H04W 48/18 |
| 2022/0022089 | A1* | 1/2022 | Zhu | H04W 28/0268 |
| 2022/0141700 | A1* | 5/2022 | Hedman | H04W 28/0289 370/230 |

FOREIGN PATENT DOCUMENTS

| WO | WO2017222625 | 12/2017 |
| WO | WO2018101574 | 6/2018 |

OTHER PUBLICATIONS

ETSI TS 123 501 V15.3.0 (Sep. 2018) 5G; System Architecture for the 5G System (3GPP TS 23.501 version 15.3.0 Release 15) (Year: 2018).*

(Continued)

*Primary Examiner* — Huy D Vu
*Assistant Examiner* — Nizam U Ahmed
(74) *Attorney, Agent, or Firm* — Fish & Richardson P.C.

(57) ABSTRACT

A method performed by a terminal operating in a wireless communication system. Based on that the terminal is located in a non-allowed area, and based on the terminal having a pending uplink signaling to inform a change in a Packet Switch (PS) data off status of the terminal, the terminal transmits a service request message to a network node. The service request message includes service type information that is related to the change in the PS data off status of the terminal. The terminal then receives, from the network node, a response message to the service request message.

12 Claims, 24 Drawing Sheets

(56) References Cited

OTHER PUBLICATIONS

3GPP TS 24.501 (V15.2.1 (Jan. 2019) Technical Specification 3rd Generation Partnership Project; Technical Specification Group Core Network and Terminals; Non-Access-Stratum NAS protocol for 5G System 5GS; Stage 3; Release 15) (Year: 2019).*

3rd Generation Partnership Project; Technical Specification Group Core Network and Terminals, "Non-Access-Stratum (NAS) protocol for 5G System (5GS); Stage 3 (Release 15)," 3GPP TS 24.501 V15.2.1, Jan. 2019, 455 pages.

Ericsson, PS Data Off status update when UE in non-allowed area or out of LADN area, S2-1901489, 3GPP TSG-SA WG2 Meeting #131, Santa Cruz-Tenerife, Spain, 25 Feb-Mar. 1, 2019, 7 pages.

Korean International Search Report in Korean Appln. No. PCT/KR2020/002293, dated May 27, 2020, 3 pages.

\* cited by examiner

METHOD FOR PERFORMING COMMUNICATION RELATED TO PACKET SWITCH (PS) DATA OFF

CROSS-REFERENCE TO RELATED APPLICATIONS

Pursuant to 35 U.S.C. § 119 (e), this application claims the benefit of an earlier filing date and right of priority to Korean Provisional Application No. 10-2019-0021390 filed on Feb. 22, 2019, the contents of which are all hereby incorporated by reference herein in their entirety.

TECHNICAL FIELD

The present disclosure generally relates to mobile communication.

BACKGROUND

With the success in the Evolved Universal Terrestrial Radio Access Network (E-UTRAN) for $4^{th}$ generation mobile communication, i.e., long term evolution (LTE)/LTE-Advanced (LTE-A), interest in the next-generation, i.e., $5^{th}$ generation (also known as 5G) mobile communication is rising, and extensive research and development are in process.

A new radio access technology (New RAT or NR) is being researched for the $5^{th}$ generation (also known as 5G) mobile communication.

SUMMARY

One general aspect of the present disclosure includes a method performed by a terminal operating in a wireless communication system, the method including: based on that the terminal is located in a non-allowed area, and based on the terminal having a pending uplink signaling to inform a change in a packet switch (PS) data off status of the terminal: transmitting a service request message to a network node, where the service request message includes service type information related to the change in the PS data off status. The method also includes receiving, from the network node, a response message to the service request message. Other embodiments of this aspect include corresponding computer systems, apparatus, and computer programs recorded on one or more computer storage devices, each configured to perform the actions of the methods.

Another general aspect of the present disclosure includes a device configured to operate in a wireless system, the device including: a transceiver; at least one processor; and at least one computer memory operably connectable to the at least one processor and storing instructions that, based on being executed by the at least one processor, perform operations including: based on that the device is located in a non-allowed area, and based on the device having a pending uplink signaling to inform a change in a packet switch (PS) data off status of the device: transmitting a service request message to a network node, where the service request message includes service type information related to the change in the PS data off status. The operations also include receiving, from the network node through the transceiver, a response message to the service request message. Other embodiments of this aspect include corresponding computer systems, apparatus, and computer programs recorded on one or more computer storage devices, each configured to perform the actions of the methods.

Another general aspect of the present disclosure includes a processing apparatus configured to control a wireless communication device, the processing apparatus including: at least one processor; and at least one computer memory operably connectable to the at least one processor and storing instructions that, based on being executed by the at least one processor, perform operations including: based on that the wireless communication device is located in a non-allowed area, and based on the wireless communication device having a pending uplink signaling to inform a change in a packet switch (PS) data off status of the wireless communication device: transmitting a service request message to a network node, where the service request message includes service type information related to the change in the PS data off status. The operations also include receiving, from the network node, a response message to the service request message. Other embodiments of this aspect include corresponding computer systems, apparatus, and computer programs recorded on one or more computer storage devices, each configured to perform the actions of the methods.

Other implementations of this and other aspects include corresponding systems, apparatuses, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

All or part of the features described throughout this disclosure can be implemented as a computer program product including instructions that are stored on one or more non-transitory machine-readable storage media, and that are executable on one or more processing devices. All or part of the features described throughout this disclosure can be implemented as an apparatus, method, or electronic system that can include one or more processing devices and memory to store executable instructions to implement the stated functions.

The details of one or more implementations of the subject matter of this disclosure are set forth in the accompanying drawings and the description below. Other features, aspects, and advantages of the subject matter will become apparent from the description, the drawings, and the claims.

DETAILED DESCRIPTION

Figure 1:
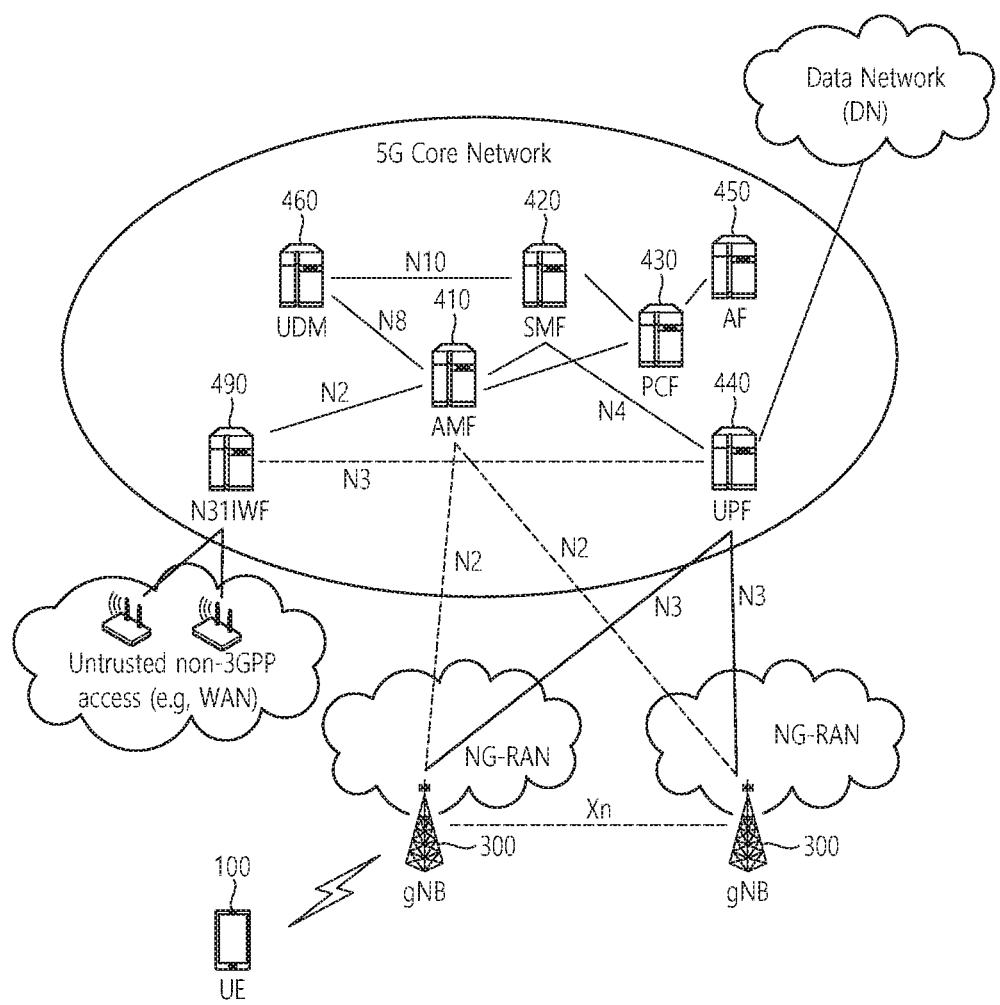
FIG. 1 illustrates an example of the architecture of a next-generation mobile communication network.

Implementations are disclosed herein that enable improved operations for a device to report a status of the device's Packet Switch (PS) Data Off, or "PS Data Off" feature. According to some implementations, even if the device is located in a non-allowed area where the device is restricted from communication, the device may nonetheless be able to report its PS Data Off status by transmitting a service request message that includes information related to a change in the device's PS Data Off status.

The feature of "PS Data Off" may help reduce unnecessary background traffic of a user equipment (UE) and unwanted usage of data (or signaling). For example, if the PS Data Off feature is activated, then certain types of traffic may be reduced. As such, if a UE activates its PS Data Off feature, then the UE may reduce certain types of uplink transmission and certain types of downlink data reception.

The UE may notify a network regarding a current status of the UE's PS Data Off feature, referred to as a PS Data Off status of the UE. Such reporting of the UE's PS Data Off status may enable the network to recognize a current status of the UE's PS Data Off feature and thus recognize whether the UE is currently in a state of reduced communication.

However, in some scenarios, a UE may be unable to report its current PS Data Off status to the network. For example, if the UE is geographically located in a "non-allowed" area where the UE is restricted from communication, then the UE may be unable to report its current PS Data Off status to the network. This may cause difficulties if the network has outdated or incorrect information regarding the UE's PS Data Off status.

According to some implementations of the present disclosure, such problems may be addressed by the UE transmitting, to the network, a Service Request message that includes specific information indicating a change in UE's PS Data Off status. By receiving this specific information indicating the change in the UE's PS Data Off status, the network may enable the UE to successfully report its PS Data Off status, even if the UE is located in a non-allowed area where the UE may otherwise be unable to perform such reporting.

Implementations of the present disclosure may be applied to various types of wireless communication systems, such as the 3rd Generation Partnership Project (3GPP) long term evolution (LTE), 3GPP LTE-advanced (LTE-A), 3GPP 5G (5th generation) or 3GPP New Radio (NR). These are just some examples, and implementations of the present disclosure may be applied to various other types of wireless communication systems. Hereinafter, LTE includes LTE and/or LTE-A.

In the appended drawings, although a User Equipment (UE) is illustrated as an example, this is merely an example given to simplify the description of the present disclosure. Herein, a UE may be a wireless communication device performing communication in a communication system such as EPS and/or 5GS, and so on. The UE shown in the drawings may also be referred to as a terminal, a mobile equipment (ME), a wireless communication device, a wireless communication apparatus, and so on. In some implementations, the UE may be implemented as a portable device, such as a laptop computer, a mobile phone, a PDA, a smart phone, a multimedia device, and so on. Alternatively, in some implementations, the UE may be implemented as a non-portable device, such as a personal computer (PC) or a vehicle mounted device.

Although the examples in the present disclosure are described based on a Universal Mobile Telecommunication System (UMTS), an Evolved Packet Core (EPC), and a next generation (also known as $5^{th}$ generation or 5G) mobile communication network, implementations of the present disclosure are not limited to the aforementioned communication systems and may be applied to various other types of communication systems and techniques.

Description of Terms

Hereinafter, prior to describing the present disclosure with reference to the appended drawings, in order to facilitate understanding of the present disclosure, various terms used in this disclosure will be briefly described.

UE/MS: This refers to a User Equipment/Mobile Station, UE.

EPS: This is an abbreviation for an Evolved Packet System, which to a core network supporting a Long Term Evolution (LTE) network. This network is an evolved form of the UMTS.

Public Data Network (PDN): This is an independent network in which a server providing a service is located.

Packet Data Network Gateway (PDN-GW): This is a network node of an EPS network performing functions of UE IP address allocation, packet screening and filtering, and charging data collection.

Serving Gateway (Serving GW): This is a network node of an EPS network performing functions of mobility anchor, packet routing, Idle mode packet buffering, and triggering MME to page a UE.

eNodeB (eNB): This is a base station of an Evolved Packet System (EPS), which is installed in the outdoors, and the size of its cell coverage corresponds to a macro cell.

MME: This is an abbreviation for a Mobility Management Entity, which performs a role of controlling each entity within the EPS in order to provide a session and mobility for the UE.

Session: A session refers to a path for performing data transmission, and its unit may be a PDN, a Bearer, an IP flow unit, and so on. As defined in the 3rd Generation Partnership Project (3GPP), the difference between each unit may be differentiated as an entire (or whole) target network unit (APN or PDN unit), units being differentiated by QoS within the entire (or whole) target network unit (Bearer units), and destination IP address units.

APN: This is an abbreviation for an Access Point Name, which is the name of an access point being managed by the network, and this name is provided to the UE. More specifically, this is a character string indicating or identifying a PDN. A corresponding P-GW needs to be passed through in order to access a requested service or network (PDN). And, the APN is a name (character string) that is defined in advance in order to find (or locate) the P-GW. For example, the APN may be defined as internet.mnc012.mcc345.gprs.

PDN connection: This indicates a connection from the UE to the PDN, i.e., a relation (connection) between a UE, which is expressed as an IP address, and a PDN, which is expressed as an APN. This denotes a connection (UE (100)-PDN GW) between entities within the core network so that a session can be configured.

UE Context: This refers to situation information of the UE, i.e., situation information configured of UE id, mobility (current location, and so on), and session attribute (QoS, priority level, and so on), being used for managing the UE in a network.

Non-Access-Stratum (NAS): This denotes an upper stratum of a control plane between UE and MME. This supports mobility management, session management, IP address maintenance, and so on, between the UE and the network.

PLMN: This is an abbreviation for a Public Land Mobile Network, which denotes a network identification number of an operator. In a roaming situation of a UE, the PLMN may be differentiated as a Home PLMN (HPLMN) and a Visited PLMN (VPLMN).

DNN: This is an abbreviation for a Data Network Name, which is the name of an access point being similarly managed by the network as the APN. And, this name is provided to the UE. In a 5G system, the DNN is used as an equivalent of the APN.

The following description of this specification may be applied to a next-generation (also known as $5^{th}$ generation or 5G) mobile communication network.

<Next-Generation Mobile Communication System Architecture>

FIG. 1 illustrates an example of the architecture of a next-generation mobile communication network.

The next-generation mobile communication network (5G system) may include various elements. FIG. 1 illustrates examples of such elements including an Access and Mobility Management Function (AMF) 410, a Session Management Function (SMF) 420, a Policy Control Function (PCF) 430, an application function (AF) 450, a Non-3GPP Interworking Function (N3IWF) 490, a User Plane Function (UPF) 440, and a Unified Data Management (UDM) data network 460.

A UE 100 is connected to a Data Network (DN) via the UPF 440 through a Next-Generation Radio Access Network (NG-RAN) including a gNB 300.

The UE 100 may also be provided with a data service through an untrusted non-3GPP access, for example, a Wireless Local Area Network (WLAN). To connect the non-3GPP access to a core network, the N3IWF 490 may be deployed.

The N3IWF 490 performs a function of managing interworking between the non-3GPP access and the 5G system. When the UE 100 is connected to the non-3GPP access (e.g., Wi-Fi called IEEE 801.11), the UE 100 may be connected with the 5G system through the N3IWF 490. The N3IWF 490 performs control signaling with AMF 410 and is connected with the UPF 440 through an N3 interface for data transmission.

The AMF 410 may manage access and mobility in the 5G system. The AMF 410 may perform a function of managing NAS security. The AMF 410 may perform a function of handling mobility in an idle state.

The UPF is a type of a gateway through which user data is transmitted and received. The UPF node may perform all or some of user-plane functions of a Serving Gateway (S-GW) and a Packet Data Network Gateway (P-GW) in fourth-generation mobile communication.

The UPF 440 is an element that operates as a boundary point between the next-generation RAN (NG-RAN) and the core network and functions to maintain a data path between the gNB 300 and the SMF 420. When the UE 100 moves over a region served by the gNB 300, the UPF 440 serves as a mobility anchor point. The UPF 440 may perform a function of handling a PDU. The UPF 440 may route packets for mobility in the NG-RAN (defined after 3GPP Release-15). Further, the UPF 440 may function as an anchor point for mobility with another 3GPP network (i.e., a RAN defined prior to 3GPP Release-15, e.g., a UTRAN or an Evolved-Universal Mobile Telecommunications System (UMTS) Terrestrial Radio Access Network (E-UTRAN)) or a Global System for Mobile Communication (GSM)/Enhanced Data rates for Global Evolution (EDGE) Radio Access Network (GERAN). The UPF 440 may correspond to the terminating point of a data interface toward a data network.

The PCF 430 is a node for controlling an operator's policy.

The AF 450 is a server for providing various services for the UE 100.

The UDM 460 is a type of a server that manages subscriber information, like a home subscriber server (HSS) in fourth-generation mobile communication. The UDM 460 stores and manages the subscriber information in a Unified Data Repository (UDR).

The SMF 420 may perform a function of allocating the Internet Protocol (IP) address of the UE 100. The SMF may control a protocol data unit (PDU) session.

Figure 2:
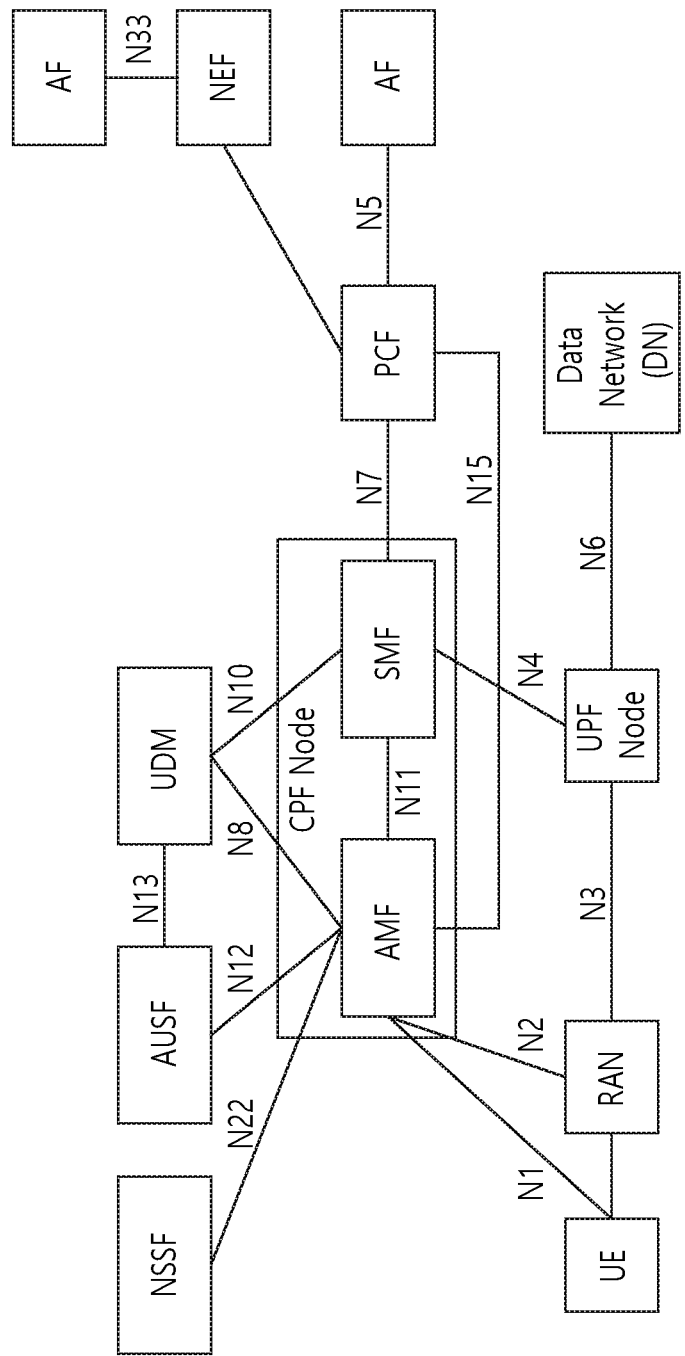
FIG. 2 is a diagram illustrating an example of a prediction architecture of the next-generation mobile communication in a node perspective.

FIG. 2 is a diagram of an example of a prediction architecture of the next-generation mobile communication in a node perspective.

As shown in the example of FIG. 2, a UE is connected to a data network (DN) through a next-generation Radio Access Network (RAN).

A Control Plane Function (CPF), which is shown in the drawing, performs all or part of the functions of a Mobility Management Entity (MME) and all or part of the control plane functions of a Serving Gateway (S-GW) and a PDN Gateway (P-GW) of the 4th generation mobile communication. The CPF node includes an Access and Mobility Management Function (AMF) and a Session Management Function (SMF).

A User Plane Function (UPF) node, which is shown in the drawing, is a type of gateway through which a user's data is transmitted and received. The UPF node may perform all or part of the user plane functions of the S-GW and P-GW of the 4th generation mobile communication.

A Policy Control Function (PCF), which is shown in the drawing, is a node controlling the policy of a service provider.

An Application Function (AF), which is shown in the drawing, is a server for providing multiple services to the UE.

A Unified Data Management (UDM), which is shown in the drawing, is a type of server managing subscriber information, just as a Home subscriber Server (HSS) of the 4th generation mobile communication. The UDM stores the subscriber information in a Unified Data Repository (UDR) and manages the stored information.

An Authentication Server Function (AUSF), which is shown in the drawing, authenticates and manages the UE.

A Network Slice Selection Function (NSSF), which is shown in the drawing, is a node for network slicing, which will be described in more detail later on.

In FIG. 2, the UE may synchronously access 2 data networks by using a multi-Protocol Data Unit (PDU) session.

Figure 3:
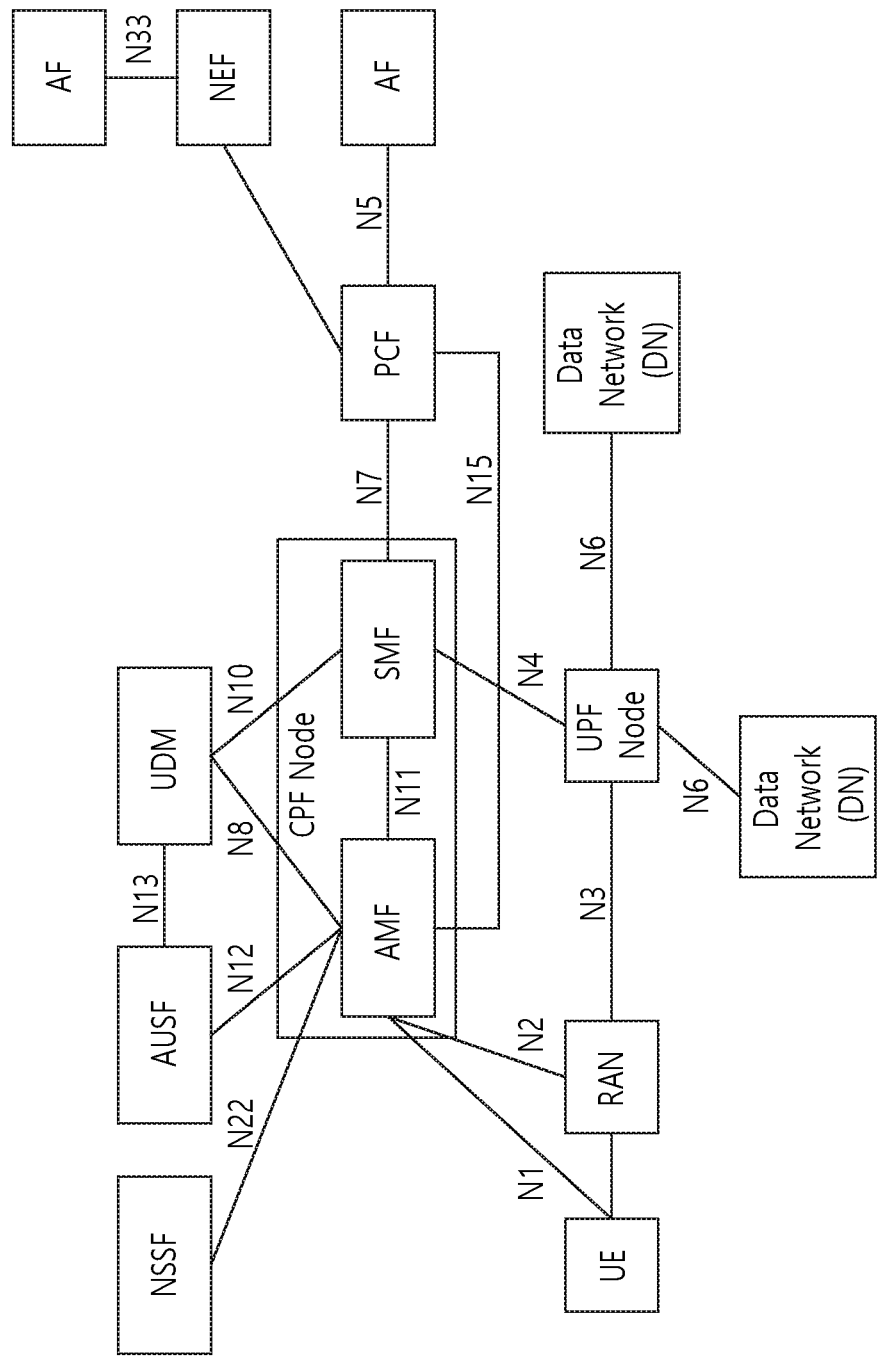
FIG. 3 is a diagram illustrating an example of an architecture for supporting synchronous access to 2 data networks.

FIG. 3 is a diagram of an example of an architecture for supporting synchronous access to 2 data networks.

The example of FIG. 3 shows an architecture enabling the UE to perform synchronous access to 2 data networks by using a single PDU session.

To facilitate description, the reference points shown in FIG. 2 and FIG. 3 will hereinafter be described.

N1: Reference point between UE and AMF
N2: Reference point between NG-RAN and AMF
N3: Reference point between NG-RAN and UPF
N4: Reference point between SMF and UPF
N5: Reference point between PCF and AF
N6: Reference point between UPF and DN
N7: Reference point between SMF and PCF
N8: Reference point between UDM and AMF
N10: Reference point between UDM and SMF
N11: Reference point between AMF and SMF
N12: Reference point between AMF and AUSF
N13: Reference point between UDM and AUSF
N15: In a non-roaming scenario, reference point between PCF and AMF. In a roaming scenario, reference point between AMF and PCF of a visited.
N22: Reference point between AMF and NSSF
N30: Reference point between PCF and NEF
N33: Reference point between AF and NEF In the examples of FIG. 2 and FIG. 3, an AF by a third party other than an operator may be accessed to 5GC through the Network Exposure Function (NEF).

Figure 4:
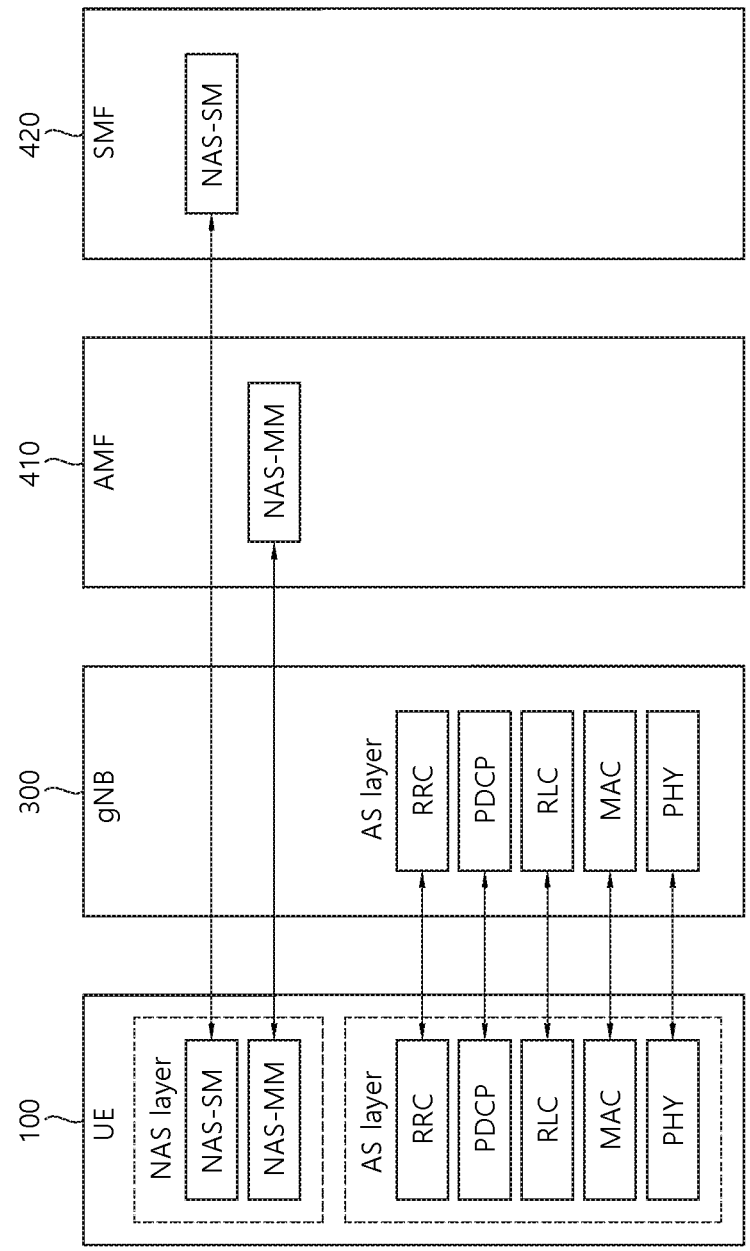
FIG. 4 is another diagram illustrating an example of an architecture of a Radio Interface Protocol between a UE and a gNB.

FIG. 4 is another diagram of an example of an architecture of a Radio Interface Protocol between a UE and a gNB.

The radio interface protocol is based on the 3GPP radio access network standard. The radio interface protocol is horizontally configured of a Physical layer, a Data Link layer, and a Network layer, and the radio interface protocol is vertically divided into a User Plane for transmitting data information and a Control Plane for transferring (or forwarding) control signals (signaling).

The protocol layers may be differentiated as a first layer (L1), a second layer (L2), and a third layer (L3), based on the lower 3 layers of an Open System Interconnection (OSI) reference model that is implemented in communication systems.

Hereinafter, each layer of the radio interface protocol will be described in detail.

The first layer, which is a physical layer, provides an Information Transfer Service by using a physical channel. The physical layer is connected with a Medium Access Control layer, which is an upper layer, through a transport channel, and data is forwarded (or transferred) between the medium access control layer and the physical layer through the transport channel. Additionally, data is forwarded (or transferred) between different physical layers, i.e., between a physical layer of a transmitting end and a physical layer of a receiving end, through a physical channel.

The second layer includes a Medium Access Control (MAC) layer, a Radio Link Control (RLC) layer, and a Packet Data Convergence Protocol (PDCP) layer.

The third layer includes a Radio Resource Control (hereinafter abbreviated as RRC) layer. The RRC layer is defined only in the control plane and manages the control of a logical channel, a transport channel, and physical channels in relation to the configuration, reconfiguration, and release of Radio Bearers (hereinafter abbreviated as RBs). At this point, the RB refers to a service being provided by the second layer for data forwarding (or transfer) between the UE and an E-UTRAN.

The Non-Access Stratum (NAS) layer performs the functions of connection management (session management), mobility management, and so on.

The NAS layer is divided into a NAS entity for mobility management (MM) and a NAS entity for session management (SM).

1) The NAS entity for MM provides the following generic functions.

As an AMF-relation NAS procedure, the following is included:
 a Registration management and access management procedure. The AMF supports the following function:
 a safe NAS signal connection (integrity protection, encryption) between the UE and the AMF.

2) The NAS entity for SM performs session management between the UE and an SMF.

An SM signaling message is processed, i.e., generated and processed, in the NAS-SM layer of the UE and SMF. Content of the SM signaling message is not interpreted by the AMF.

In case of an SM signaling transmission,
 the NAS entity for MM generates a security header indicating a NAS transmission of SM signaling and a NAS-MM message inducing a method and location for forwarding an SM signaling message through additional information regarding the received NAS-MM.
 when receiving SM signaling, the NAS entity for SM performs an integrity check on the NAS-MM message and interprets additional information and, then, induces a method and location for deriving an SM signaling message.

Meanwhile, in FIG. 4, the RRC layer, the RLC layer, the MAC layer, and the PHY layer being located below the NAS layer are also collectively referred to as an Access Stratum (AS).

<Network Slice>

The following describes the slicing of the network to be introduced in the next generation mobile communication.

Next-generation mobile communication introduces the feature of network slicing in order to provide various services through a single network. In this connection, slicing a network refers to a combination of network nodes with the functions needed to provide a specific service. The network node that constitutes the slice instance may be a hardware independent node, or it may be a logically independent node.

Each slice instance may consist of a combination of all the nodes needed to construct the entire network. In this case, one slice instance alone may provide service to the UE.

Alternatively, the slice instance may consist of a combination of some of the nodes that make up the network. In this case, the slice instance may provide service to the UE in association with other existing network nodes without the slice instance alone providing the service to the UE. In addition, a plurality of slice instances may cooperate with each other to provide the service to the UE.

The slice instance may differ from a dedicated core network in that all network nodes, including the core network (CN) node and the RAN may be separated from each other. Further, the slice instance differs from the dedicated core network in that the network nodes may be logically separated.

Figure 5A:
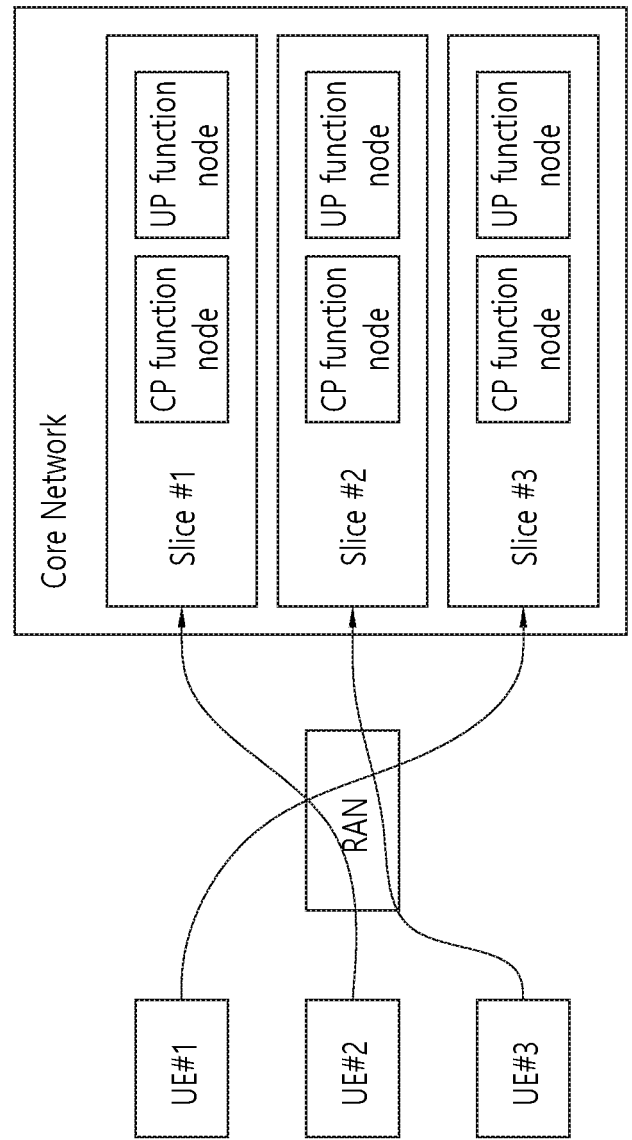
FIG. 5A is a diagram illustrating an example of an architecture for implementing network slicing.

FIG. 5A is a diagram illustrating an example of an architecture for implementing a feature of network slicing.

As can be seen from FIG. 5A, the core network (CN) may be divided into several slice instances. Each slice instance may contain one or more of a CP function node and a UP function node.

Each UE may use a network slice instance corresponding to its service through RAN.

Unlike the case shown in FIG. 5A, each slice instance may share one or more of a CP function node, and a UP function node with another slice instance. This will be described with reference to FIG. 5B below.

Figure 5B:
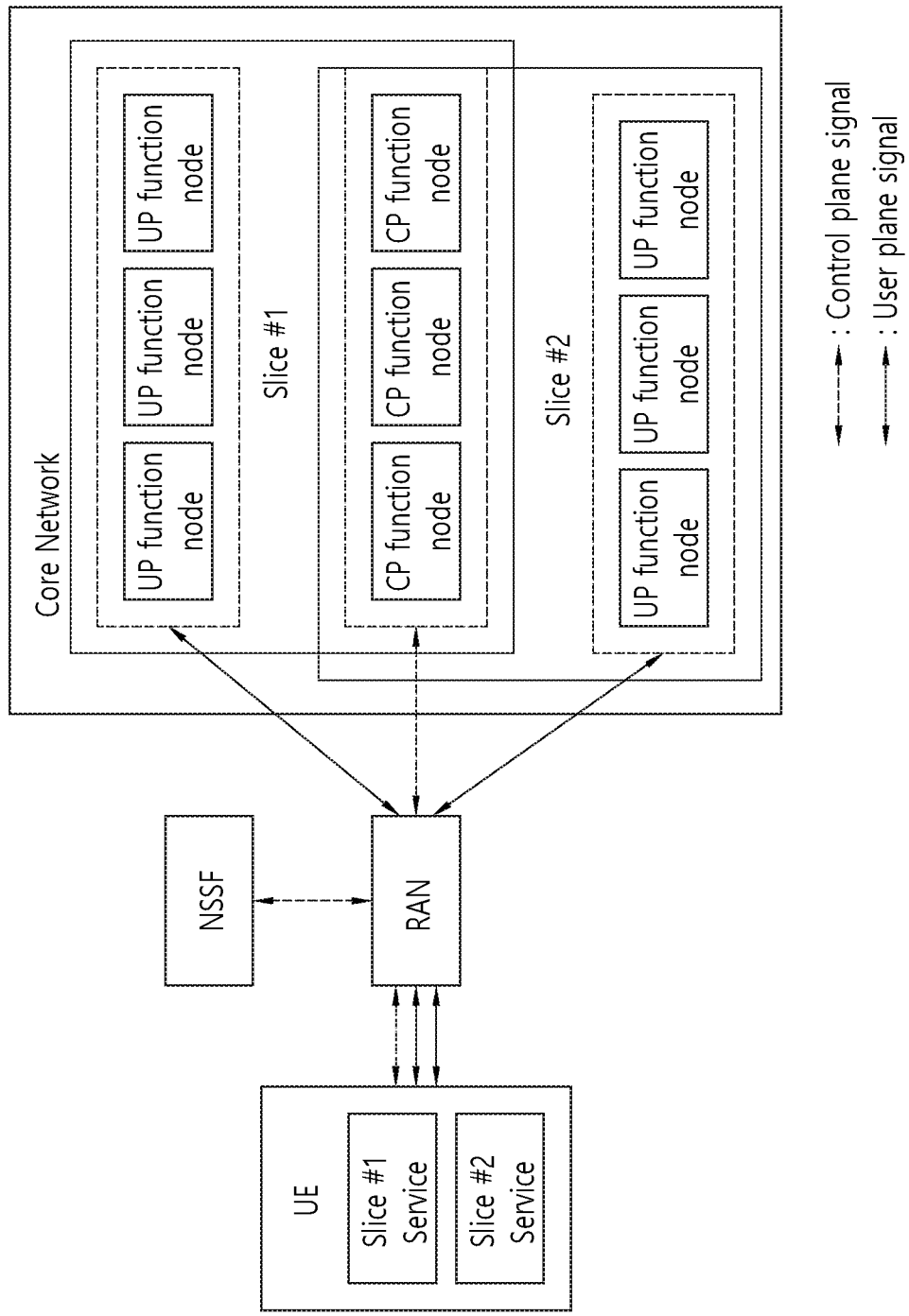
FIG. 5B is a diagram showing another example of an architecture for implementing network slicing.

FIG. 5B is a diagram showing another example of an architecture for implementing the feature of network slicing.

Referring to FIG. 5B, a plurality of UP function nodes are clustered, and a plurality of CP function nodes are also clustered.

Further, referring to FIG. 5B, slice instance #1 (or instance #1) in the core network includes a first cluster of an UP function node. Moreover, the slice instance #1 shares the cluster of the CP function node with slice instance #2 (or instance #2). The slice instance #2 includes a second cluster of an UP function node.

The illustrated NSSF selects a slice (or instance) that can accommodate the UE's service.

The illustrated UE may use the service #1 via the slice instance #1 selected by the NSSF and may use the service #2 via the slice instance #2 selected by the NSSF.

<Registration Procedure>

In some implementations, in order to allow mobility tracking and data reception to be performed, and in order to receive a service, the UE needs to gain authorization. For this, the UE shall register to a network. The registration procedure is performed when the UE needs to perform initial registration to a 5G system. Additionally, the Registration Procedure is performed when the UE performs periodic registration update, when the UE relocates to a new tracking area (TA) in an Idle state, and when the UE needs to perform periodic registration renewal.

During the initial registration procedure, an ID of the UE may be obtained from the UE. The AMF may forward (or transfer) a PEI (IMEISV) to a UDM, SMF, and PCF.

Figure 6A:
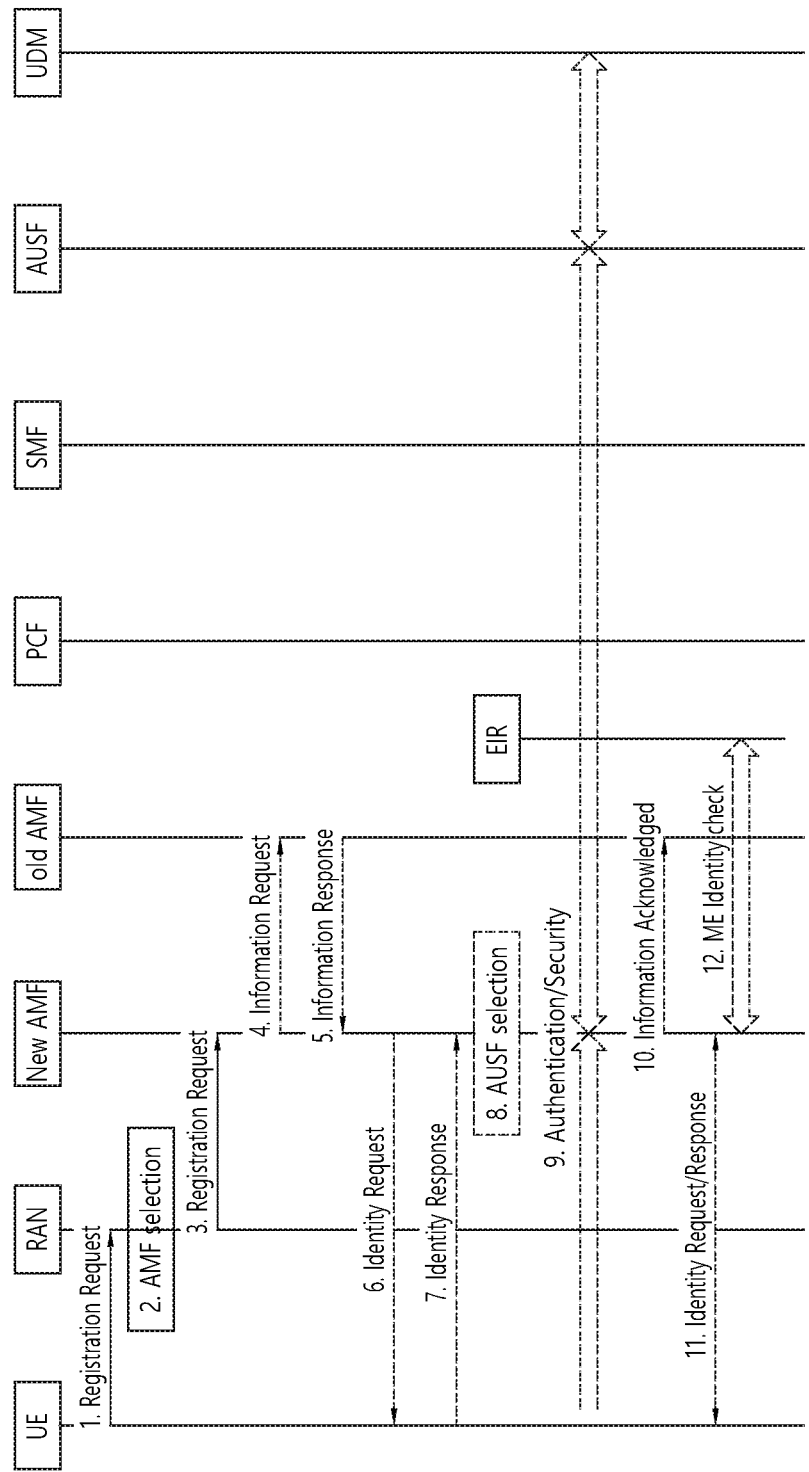
FIG. 6A is a signal flow chart showing an example of a registration procedure.
Figure 6B:
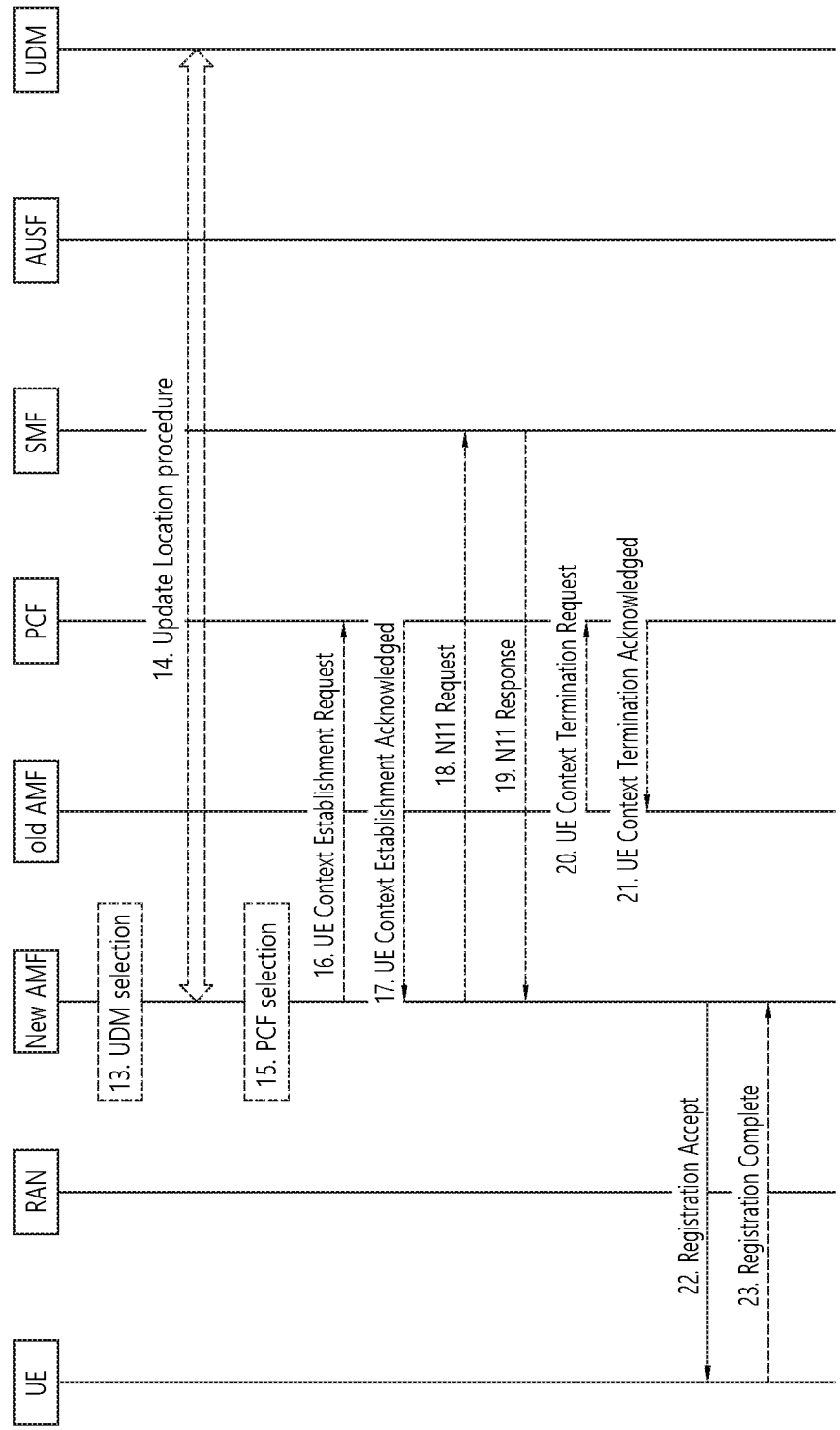
FIG. 6B is a signal flow chart showing the example of the registration procedure continued from FIG. 6A.

FIG. 6A is a signal flow chart showing an examples of a registration procedure. FIG. 6B is a signal flow chart showing the example of the registration procedure continued from FIG. 6A.

For reference, the registration procedure shown in FIG. 6A and FIG. 6B is merely an example, and, therefore, the scope of implementations in this disclosure is not limited to this examples. For example, in some implementations, the registration procedure may be performed by omitting some of the process steps shown in FIG. 6A and FIG. 6B, or by modifying some of the process steps shown in FIG. 6A and FIG. 6B, or by including additional process steps that are not shown in FIG. 6A and FIG. 6B.

The signal flow chart of FIGS. 6A and 6B will now be described in more detail.

1) The UE may transmit an AN message to the RAN. The AN message may include an AN parameter and a registration request message. The registration request message may include information, such as a register type, a subscriber permanent ID or temporary user ID, a security parameter, NASSAI, 5G capability of the UE, a PDU session status, and so on.

In case of a 5G RAN, the AN parameter may include a SUPI or a temporary user ID, a selected network, and NASSAI.

The registration type may indicate whether the registration is an "initial registration" (i.e., the UE is in a non-registered state), "mobility registration update" (i.e., the UE is in a registered state, and the registration procedure is initiated by mobility), or "periodic registration update" (i.e., the UE is in a registered state, and the registration procedure is initiated due to the expiration of a periodic update timer). In case a temporary user ID is included, the temporary user ID indicates a last serving AMF. In case the UE has already been registered through a PLMN of a 3GPP access and a non-3GPP access in another PLMN, the UE may not provide a UE temporary ID, which is allocated by the AMF during a registration procedure through a non-3GPP access.

The security parameter may be used for authentication and integrity protection.

The PDU session status indicates a PDU session that is available (and previously configured) in the UE.

2) In case the SUPI is included, or in case the temporary user ID does not indicate a valid AMF, the RAN may select an AMF based on a (R)AT and NSSAI.

In case the (R)AN cannot select an appropriate AMF, a random AMF is selected according to a local policy, and the registration request is forwarded (or transferred) by using the selected AMF. If the selected AMF cannot provide service to the UE, the selected AMF may select another AMF that is more appropriate for the UE.

3) The TAN transmits an N2 message by using a new AMF. The N2 message includes an N2 parameter and a registration request. The registration request may include a registration type, a subscriber permanent identifier or temporary user ID, a security parameter, NSSAI, MICO mode default settings (or configuration), and so on.

When a 5G-RAN is used, the N2 parameter includes location information related to a cell in which the UE is camping, a cell identifier, and a RAT type.

If the registration type indicated by the UE is a periodic registration update, process 4 to process 17, which will be described in detail later on, may not be performed.

4) The newly selected AMF may transmit an information request message to the previous (old) AMF.

In case the temporary user ID of the UE is included in a registration request message, and in case the last AMF is modified after the last registration, a new AMF may include an information request message, which includes complete registration request information for requesting SUPI and MM context of the UE, to the previous (old) AMF.

5) The previous (old) AMF transmits an information response message to the newly selected AMF. The information response message may include SUPI, MM context, and SMF information.

More specifically, the previous (old) AMF transmits an information response message including SUPI and MM context of the UE.

In case information regarding an active PDU session is included in the previous (old) AMF, SMF information including SMF ID and PDU session ID may be included in the information response message of the previous (old) AMF.

6) In case the SUPI is not provided by the UE, or in case the SUPI is not searched from the previous (old) AMF, the new AMF transmits an Identity Request message to the UE.

7) The UE transmits an Identity Response message including the SUPI to the new AMF.

8) The AMF may determine to perform triggering of an AUSF. In this case, the AMF may select an AUSF based on the SUPI.

9) The AUSF may initiate authentication of the UE and the NAS security function.

10) The new AMF may transmit an information response message to the previous (old) AMF.

If the AMF is modified, in order to verify the forwarding of UE MM context, the new AMF may transmit the information response message.

If the authentication/security procedure is failed, the registration is rejected, and the new AMF may transmit a rejection message to the previous (old) AMF.

11) The new AMF may transmit an Identity Request message to the UE.

In case a PEI is not provided by the UE, or in case a PEI is not searched from the previous (old) AMF, an Identity Request message may be transmitted in order to allow the AMF to search the PEI.

12) The new AMF checks an ME identifier.

13) If process 14, which will be described later on, is performed, the new AMF selects a UDM based on the SUPI.

14) If the AMF is modified after the final registration, if valid subscription context of the UE does not exist in the AMF, or if the UE provides a SUPI, wherein the AMF does not refer to a valid context, the new AMF initiates an Update Location procedure. Alternatively, even in a case where a UDM initiates Cancel Location for the previous (old) AMF, the Update Location procedure may be initiated. The previous (old) AMF discards the MM context and notifies all possible SMF(s), and, after obtaining AMF-related subscription data from the UDM, the new AMF generates MM context of the UE.

In case network slicing is used, the AMF obtains allowed NSSAI based on the requested NSSAI and UE subscription and local policy. In case the AMF is not appropriate for supporting the allowed NSSAI, the registration request is re-routed.

15) The new AMF may select a PCF based on the SUPI.

16) The new AMF transmits a UE Context Establishment Request message to the PCF. The AMF may request an operator policy for the UE to the PCF.

17) The PCF transmits a UE Context Establishment Acknowledged message to the new AMF.

18) The new AMF transmits an N11 request message to the SMF.

More specifically, when the AMF is modified, the new AMF notifies the new AMF that provides services to the UE to each SMF. The AMF authenticates the PDU session status from the UE by using available SMF information. In case the AMF is modified, the available SMF information may be received from the previous (old) AMF. The new AMF may send a request to the SMF to release network resources related to a PDU session that is not activated in the UE.

19) The new AMF transmits an N11 response message to the SMF.

20) The previous (old) AMF transmits a UE Context Termination Request message to the PCF.

In case the previous (old) AMF has previously requested UE context to be configured in the PCF, the previous (old) AMF may delete the UE context from the PCF.

21) The PCF may transmit a UE Context Termination Request message to the previous (old) AMF.

22) The new AMF transmits a Registration Accept message to the UE. The Registration Accept message may include a temporary user ID, registration area, mobility restriction, PDU session status, NSSAI, periodic registration update timer, and allowed MICO mode.

In case the AMF allocated a new temporary user ID, the temporary user ID may be further included in the Registration Accept message. In case the mobility restriction is applied to the UE, information indicating the mobility restriction may be additionally included in the Registration Accept message. The AMF may include information indicating the PDU session status for the UE in the Registration Accept message. The UE may remove a random internal resource being related to a PDU session that is not marked as being active from the received PDU session status. IF the PDU session status information is included in the Registration Request, the AMF may include the information indicating the PDU session status to the UE in the Registration Accept message.

23) The UE transmits a Registration Complete message to the new AMF.

<Connection Management (CM)>

In some implementations, Connection Management (CM) may be implemented for establishing or releasing a signaling connection between a UE and an AMF. For example, the CM may include a function of establishing and a function of releasing a NAS signaling connection between a UE and an AMF through an N1 reference point. The NAS signaling connection may enable a NAS signaling exchange to be carried out between a UE and a core network.

The NAS signaling connection may include an AN signaling connection between an Access Network (AN) and a UE (e.g., RRC connection through 3GPP access or connection between UE and N3IWF through non-3GPP access) and an N2 connection for the UE between an AN and an AMF.

In some implementations, two CM statuses are used for reflecting the NAS signaling connection between the UE and the AMF. The two CM statuses are as described below:

CM-IDLE

CM-CONNECTED

According to some implementations, a CM status for a 3GPP access and a CM status for a non-3GPP access may be independent from one another. For example, for the 3GPP access, the CM status may be in a CM-IDLE state, and for the non-3GPP access, the CM status may be in a CM-CONNECTED state.

Hereinafter, the CM-IDLE state, the CM-CONNECTED state, and a transition between the CM-IDLE state and the CM-CONNECTED state according to some implementations will be described in further detail.

1. CM-IDLE State

A UE in the CM-IDLE state does not have a NAS signaling connection with an AMF through an N1 interface. The UE may perform a cell selection or cell re-selection procedure and a PLMN selection procedure.

For a UE in a CM-IDLE state, an AN signaling connection, an N2 connection, and an N3 connection do not exist. In case the UE is in a CM-IDLE state and in a Registration Management (RM)-REGISTERED state, the UE may perform the following operations, according to some implementations:

unless the UE is in a Mobile Initiated Connection Only (MICO) mode, the UE may respond to paging by performing a service request procedure.

when the UE has uplink signaling or user data that is to be transmitted, the UE may perform a service request procedure.

Within an AMF, if the UE status is RM-REGISTERED, then UE information for initiating communicating with the UE may be stored in the AMF. The AMF may search the stored information that is needed for initiating communication with the UE by using a 5G-Globally Unique Temporary Identifier (GUTI).

While performing the procedure for AN signaling connection establishment, the UE may provide a 5G-Short-Temporary Mobile Subscriber Identity (5G-S-TMSI) as part of an AN parameter. Each time an AN signaling is established between the UE and the AN (a case where the UE may enter an RRC Connected state through a 3GPP access, or a case where a connection is established between the UE and the N3IWF through a non-3GPP access), the UE may enter a CM-CONNECTED state.

The transmission of an initial NAS message initiates a transition from a CM-IDLE state to a CM-CONNECTED state. Herein, the initial NAS message may be, for example, a Registration Request message, a Service Request message, or a Deregistration Request message.

In case the UE status within the AMF is a CM-IDLE state and a RM-REGISTERED state, the AMF may perform the following operations, according to some implementations:

In case the AMF has mobile-terminated data or signaling that is to be transmitted to the UE, the AMF may perform a network triggered Service Request procedure by transmitting a Paging Request message to the UE. With the exception of a case where the UE cannot respond due to the MICO mode or mobility restriction, and so on, the AMF may perform the network triggered Service Request procedure.

Each time an N2 connection is established between an AN and an AMF for the UE, the AMF may enter a CM-CONNECTED state for the UE. The reception of an initial N2 message (e.g., N2 INITIAL UE MESSAGE) initiates a transition from a CM-IDLE state to a CM-CONNECTED state in the AMF.

When the UE and the AMF are in the CM-IDLE state, for example, by activating the MICO mode, the power efficiency and signaling efficiency may be optimized.

2. CM-CONNECTED State

A UE that is in a CM-CONNECTED state has a signaling connection with an AMF through an N1 reference point. An NAS signaling connection may use an RRC connection between the UE and an NG-RAN and a New Generation Application Protocol (NGAP) UE association between the AN and the AMF. The UE may be in a CM-CONNECTED state along with a NGAP UE association that is not bound to a random Transport Network Layer Association (TNLA) between the AN and the AMF. If the NAS signaling procedure is completed, the AMF may determine to perform release its NAS signaling connection with the UE.

In the CM-CONNECTED state, the UE may perform the following operations:

Each time an AN signaling connection is released (e.g., in case the UE enters an RRC Idle state through the 3GPP access, or in case a release of a connection between the UE and an N3IWF through a non-3GPP access is detected by the UE), the UE may enter a CM-IDLE state.

In case the UE CM state within the AMF is a CM-CONNECTED state, the AMF may perform the following operations:

When the AN Release procedure is completed, if a logical NGAP signaling connection and an N3 user plane connection for the UE are released, the AMF may enter a CM-IDLE state for the UE.

The AMF may maintain the UE CM status within the AMF to the CM-CONNECTED state, until the UE is de-registered from the core network.

The UE being in the CM-CONNECTED state may be in an RRC inactive state. If the UE is in the RRC inactive state, the following details are applied:

UE reachability is managed by the RAN along with assistance information from the core network.

UE paging is managed by the RAN.

The UE manages paging by using a CN (5G-S-TMSI) of the UE and a RAN identifier.

3. Transition Between a CM-IDLE State and a CM-CONNECTED State

Based on the above-described description of the CM-IDLE state and the description of the CM-CONNECTED state, an example of a transition between the CM-IDLE state and the CM-CONNECTED state will be described.

In case the CM status within the UE is a CM-IDLE state, if an AN signaling connection is established (e.g., in case the UE has transmitted an initial NAS message), the CM status is transitioned to a CM-CONNECTED state. In case the CM status within the UE is the CM-CONNECTED state, if the AN signaling connection is released, the CM status is transitioned to the CM-IDLE state.

In case the CM status for the UE within the AMF is a CM-IDLE state, if an N2 context is established, the CM status is transitioned to the CM-CONNECTED state. And, in case the CM status for the UE within the AMF is a CM-CONNECTED state, if an N2 context is released, the CM state is transitioned to the CM-IDLE state.

<PDU Session>

Figure 7:
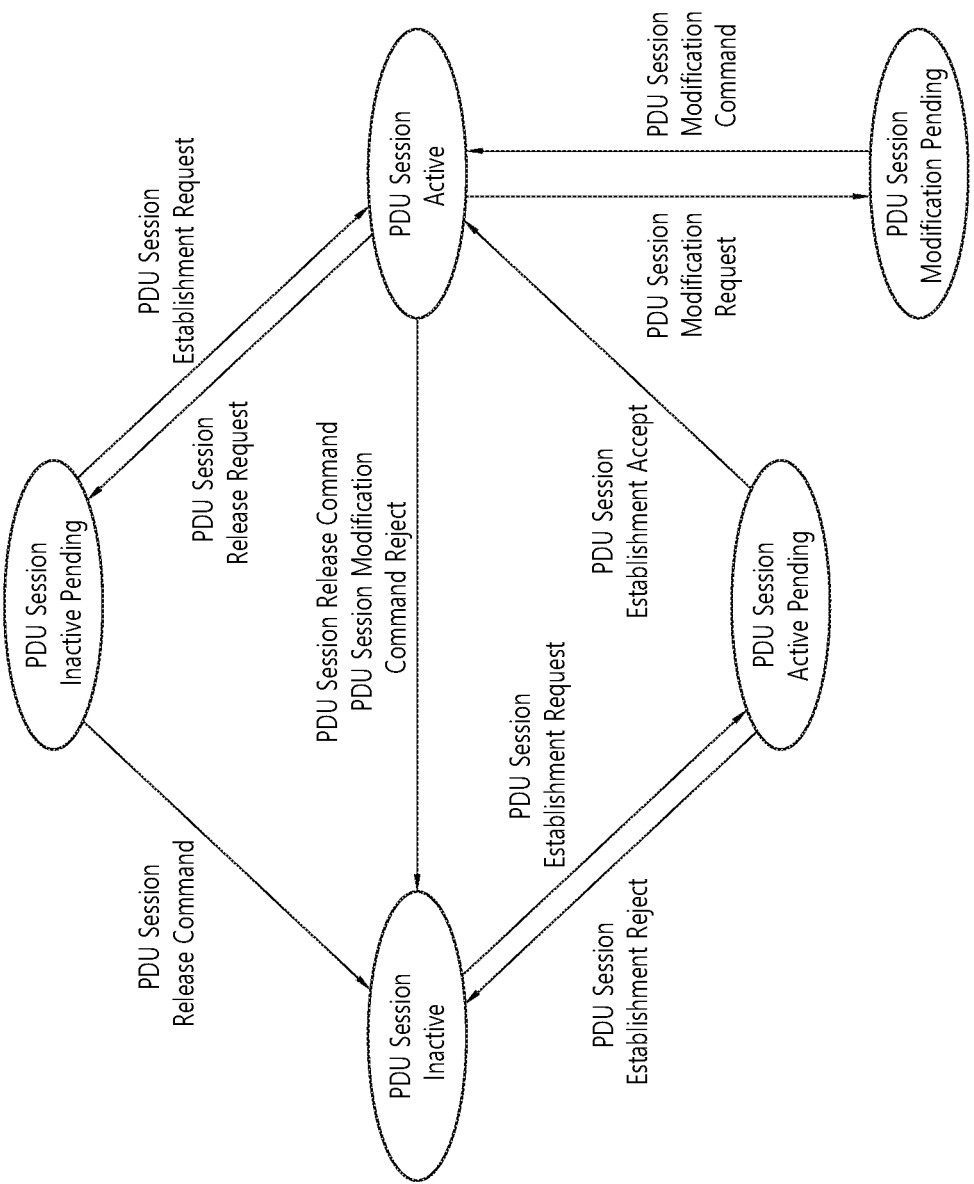
FIG. 7 is a diagram showing an example of a status of a PDU session.

FIG. 7 is a diagram showing an example of a status of a PDU session.

A PDU session is a logical connection between the UE and a data network. The UE may receive a service through the PDU session.

Referring to the example of FIG. 7, a PDU session active state, a PDU session inactive state, a PDU session inactivation pending state, a PDU session activation pending state, and a PDU session modification pending state are shown.

The PDU session inactive state denotes a status where a PDU session context does not exist.

The PDU session activation pending state denotes a status where the UE waits for a response from the network after initiating the PDU Session Establishment procedure to the UE.

The PDU session active state denotes a status where the PDU session context within the UE is in an active state.

The PDU session inactivation pending state denotes a status where the UE waits for a response from the network after performing a PDU Session Release procedure.

The PDU session modification pending state denotes a status where the UE waits for a response from the network after performing a PDU Session Modification procedure.

<PDU Session Establishment Procedure>

For the PDU Session Establishment procedure, according to some implementations, two different types of PDU Session Establishment procedures may be implemented:

A PDU Session Establishment procedure initiated by the UE.

A PDU Session Establishment procedure initiated by the network. For this, the network may transmit a Device Trigger message to an application (or applications) of the UE.

Figure 8A:
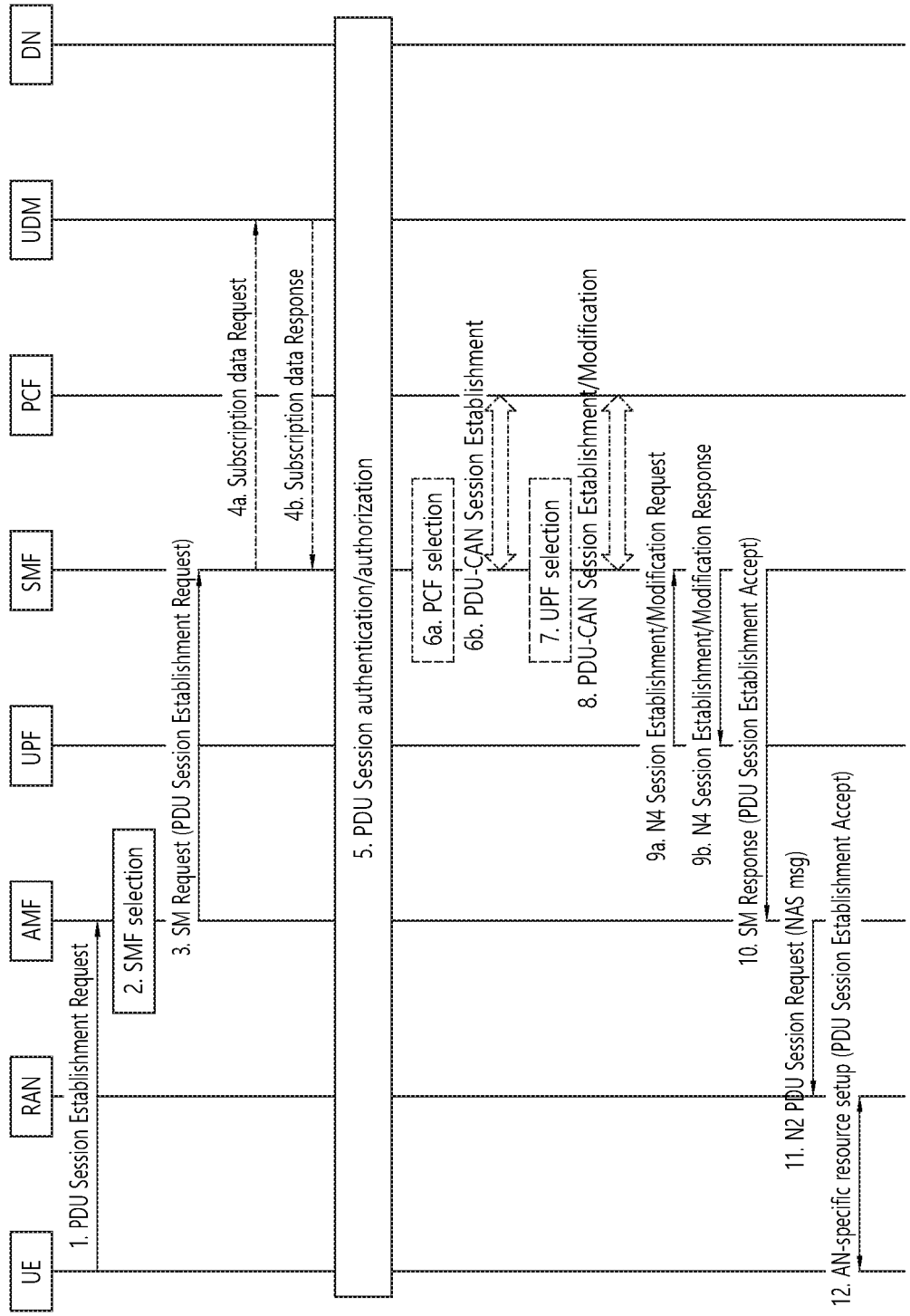
FIG. 8A is a signal flow chart showing an example of a PDU Session Establishment procedure.
Figure 8B:
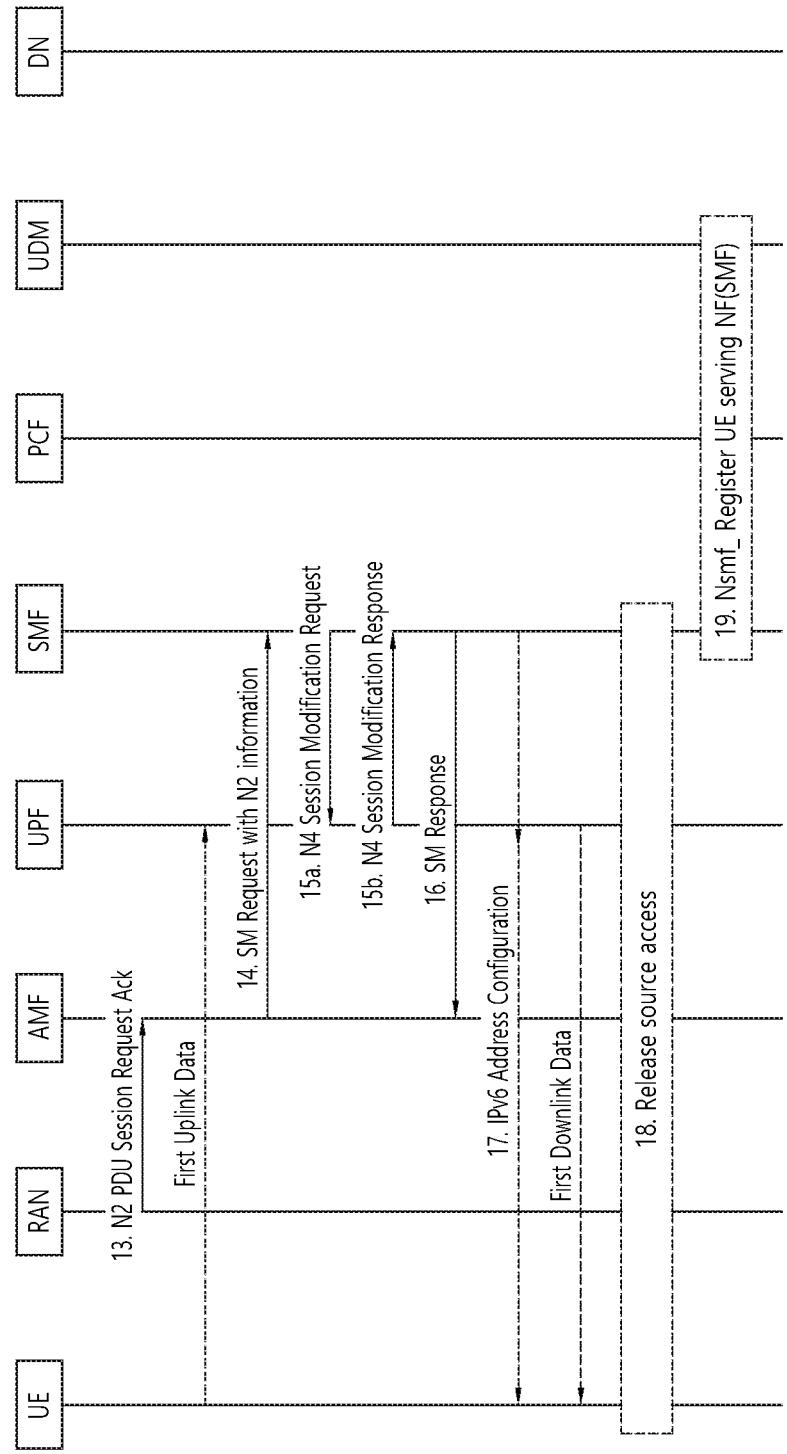
FIG. 8B is a signal flow chart showing the example of the PDU Session Establishment procedure continued from FIG. 8A.

FIG. 8A is a signal flow chart showing an example of a PDU Session Establishment procedure. FIG. 8B is a signal flow chart showing the example of the PDU Session Establishment procedure continued from FIG. 8A.

In the example procedure shown in FIG. 8A and FIG. 8B, it will be assumed that, according to the Registration procedure shown in FIG. 6A and FIG. 6B, the UE has already been registered in the AMF. Therefore, it will be assumed that the AMF has already obtained the user subscriber data from the UDM. For reference, the PDU Session Establishment procedure shown in FIG. 8A and FIG. 8B is merely one example, and, therefore, the scope of implementations in this disclosure are not limited only to this example. For example, in some implementations, the PDU Session Establishment procedure may be performed by omitting some of the process steps shown in FIG. 8A and FIG. 8B, or by modifying some of the process steps shown in FIG. 8A and FIG. 8B, or by including additional process steps that are not shown in FIG. 8A and FIG. 8B.

The example procedure of FIGS. 8A and 8B is described in further detail.

1) The UE transmits a NAS message to the AMF. The message may include Single-Network Slice Selection Assistance Information (S-NSSAI), DNN, PDU session ID, a Request type, N1 SM information (including PDU Session Request), and so on.

In some implementations, in order to establish a new PDU session, the UE may generate a new PDU session ID.

By transmitting a NAS message having a PDU Session Establishment Request message included in N1 SM information, the PDU Session Establishment procedure that is initiated by the UE may be started. The PDU Session Establishment Request message may include a Request type, an SSC mode, and a protocol configuration option.

In case the PDU Session Establishment is for configuring a new PDU session, the Request type indicates "initial access". However, in case an existing PDU session exists between the 3GPP access and the non-3GPP access, the Request type may indicate an "existing PDU session".

The NAS message being transmitted by the UE is encapsulated within an N2 message by the AN. The N2 message is transmitted to the AMF and may include user location information and access technique type information.

The N1 SM information may include an SM PDU DN request container including information regarding a PDU session authentication performed by an external DN.

2) In case the request type indicates an "initial request", and in case the PDU session ID has not been used for the existing PDU session of the UE, the AMF may determine that the message correspond to a request for a new PDU session.

If the NAS message does not include the S-NSSAI, the AMF may determine default S-NSSAI for the requested PDU session according to the UE subscription. The AMF may relate a PDU session ID with an ID of the SMF and may store the PDU session ID.

3) The AMF transmits an SM request message to the SMF. The AMF may include a subscriber permanent ID, DNN, S-NSSAI, a PDU session ID, an AMD IF, N1 SM information, user location information, and an access technique type. The N1 SM information may include a PDU session ID and a PDU Session Establishment Request message.

The AMF ID is used for identifying an AMF providing services to the UE. The N1 SM information may include the PDU Session Establishment Request message, which is received from the UE.

4a) The SMF transmits a Subscriber Data Request message to the UDM. The Subscriber Data Request message may include a subscriber permanent ID and DNN.

In the above-described process 3, in case the Request type indicates an "existing PDU session", the SMF determines that the corresponding request is caused by a handover between the 3GPP access and the non-3GPP access. The SMF may identify the existing PDU session based on the PDU session ID.

In case the SMF has not yet searched the SN-related subscription data for the UE that is related to the DNN, the SMF may request the subscription data.

4b) The UDM may transmit a Subscription Data Response message to the SMF.

The subscription data may include an authenticated Request type, an authenticated SSC mode, and information regarding a default QoS profile.

The SMF may verify whether or not the UE request follows the user subscription and local policy. Alternatively, the SMF may reject the UE request via NAS SM signaling (including the related SM rejection cause), which is forwarded (or transferred) by the AMF, and then the SMF may notify to the AMF that this shall be considered as a release of the PDU session ID.

5) The SMF transmits a message to the DN through a UP.

More specifically, in case the SMF is required to authorize/authenticate a PDU session establishment, the SMT selects a UPF and triggers the PDU.

If the PDU Session Establishment authentication/authority assignment fails, the SMF ends the PDU Session Establishment procedure and notifies the rejection to the UE.

6a) If dynamic Policy and Charging (PCC) is distributed, then the SMF selects a PCF.

6b) The SMF may start a PDU-CAN session establishment towards the PCF in order to obtain a default PCC rule for the PDU session. In case the Request type indicates an "existing PDU session", the PCF may start a PDU-CAN session modification instead.

7) In case the Request type of process 3 indicates an "initial request", the SMF selects an SSC mode for the PDU session. If process 5 is not performed, the SMF may also select a UPF. In case of Request type IPv4 or IPv6, the SMF may allocate an IP address/prefix for the PDU session.

8) In case dynamic PCC is deployed and the PDU-CAN session establishment is not yet completed, the SMF may begin (or start) PDU-CAN Session Start.

9) In case the Request type indicates an "initial request", and in case process 5 is not performed, the SMF may uses the selected UPF and start an N4 Session Establishment procedure. And, otherwise, the SMF may use the selected and start an N4 Session Modification procedure.

9a) The SMF transmits an N4 Session Establishment/Modification request message to the UPF. And, the SMF may provide packet discovery, execution, and reporting rules of packets that are to be installed in the UPF for the PDU session. In case the SMF allocates CN tunnel information, the CN tunnel information may be provided to the UPF.

9b) By transmitting an N4 Session Establishment/Modification response message, the UPF may respond. In case the CN tunnel information is allocated by the UPF, the CN tunnel information may be provided to the SMF.

10) The SMF transmits an SM response message to the AMF. The message may include a cause, N2 SM information, and N1 SM information. The N2 SM information may include a PDU session ID, a QoS profile, and CN tunnel information. The N1 SM information PDU Session Establishment Accept message. The PDU Session Establishment Accept message may include an allowed QoS rule, an SSC mode, S-NSSAI, and allocated IPv4 address.

As information that shall be forwarded to the RAN by the AMF, the N2 SM information may include the following, according to some implementations.

CN tunnel information: This corresponds to a core network address corresponding to the PDU session.

QoS Profile: This is used for providing mapping between a QoS parameter and a QoS flow identifier (QFI) to the RAN.

PDU session ID: This may be used for indicating a relation between AN resources for the UE and the PDU session to the UE via AN signaling for the UE.

In some implementations, the N1 SM information includes a PDU Session Establishment Accept message that shall be provided to the UE by the AMF.

Multiple QoS rules may be included in the N1 SM information and the N2 SM information within the PDU Session Establishment Accept message.

The SM response message also includes information enabling the PDU session ID and AMF to determine not only which target UE to use but also which access is to be used for the UE.

11) The AMF transmits an N2 PDU Session Request message to the RAN. The message may include N2 SM information and an NAS message. The NAS message may include a PDU session ID and a PDU Session Establishment Accept message.

The AMF may transmit an NAS message including a PDU session ID and a PDU Session Establishment Accept message. Additionally, the AMF may include the N2 SM information received from the SMF in the N2 PDU Session Request message and may then transmit the message including the N2 SM information to the RAN.

12) The RAN may perform a specific signaling exchange with a UE being related to the information received from the SMF.

The RAN also allocates RAN N3 tunnel information for the PDU session.

The RAN forwards the NAS message, which is provided in process 10. The NAS message may include a PDU session ID and N1 SM information. The N1 SM information may include a PDU Session Establishment Accept message.

The RAN transmits the NAS message to the UE only in a case where a needed RAN resource is configured and allocation of RAN tunnel information is successful.

13) The RAN transmits an N2 PDU Session Response message to the AMF. The message may include a PDU session ID, a cause, and N2 SM information. The N2 SM information may include a PDU session ID, (AN) tunnel information, and a list of allowed/rejected QoS profiles.

The RAN tunnel information may correspond to an access network address of an N3 tunnel corresponding to the PDU session.

14) The AMF may transmit an SM Request message to the SMF. The SM Request message may include N2 SM information. Herein, the AMF may forward the N2 SM information received from the RAN to the SMF.

15a) In an N4 session for the PDU session has not already been configured, the SMF may start an N4 Session Establishment procedure along with the UPF. Otherwise, the SMF may use the UPF to start an N4 Session Modification procedure. The SMF may provide AN tunnel information and CN tunnel information. The CN tunnel information shall be provided only in a case where the SMF selects the CN tunnel information in Process 8.

15b) The UPF may transmit an N4 Session Establishment/Modification Response message to the SMF.

16) The SMF may transmit an SM Response message to the AMF. When this process is ended (or completed), the AMF may forward the related event to the SMF. This occurs during a handover, in which the RAN tunnel information is modified or the AMF is re-deployed.

17) The SMF transmits information to the UE through the UPF. More specifically, in case of PDU Type IPv6, the SMF may generate an IPv6 Router Advertisement and may transmit the generated advertisement to the UE through the N4 and UPF.

18) In case the PDU Session Establishment Request is caused by a handover between the 3GPP access and the non-3GPP access, i.e., if the Request type is configured as an "existing PDU session", the SMF release the user plane through a source access (3GPP or non-3GPP access).

19) In case the ID of the SMF is not included in Process 4b by the UDM of the DNN subscription context, the SMF may call (or page or summon) a "UDM Register UE serving NF service" including an SMF address and DNN. The UDM may store the ID, address, and DNN of the SMF.

During the procedure, of the PDU Session Establishment is not successful, the SMF notifies this to the AMF.

<PDU Session Modification Procedure>

Figure 9A:
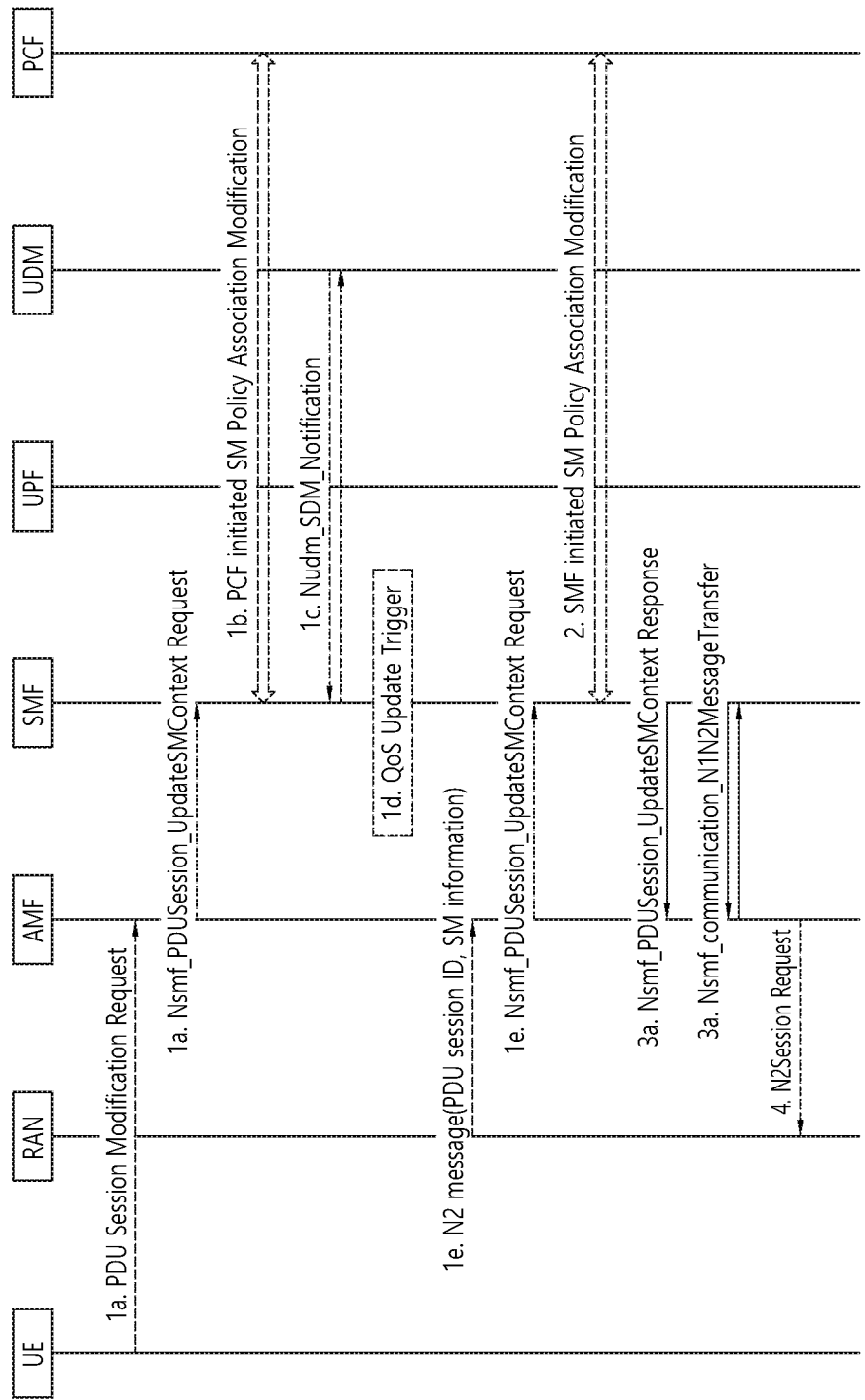
FIG. 9A and FIG. 9B are signal flow charts showing examples of a PDU Session Modification procedure.
Figure 9B:
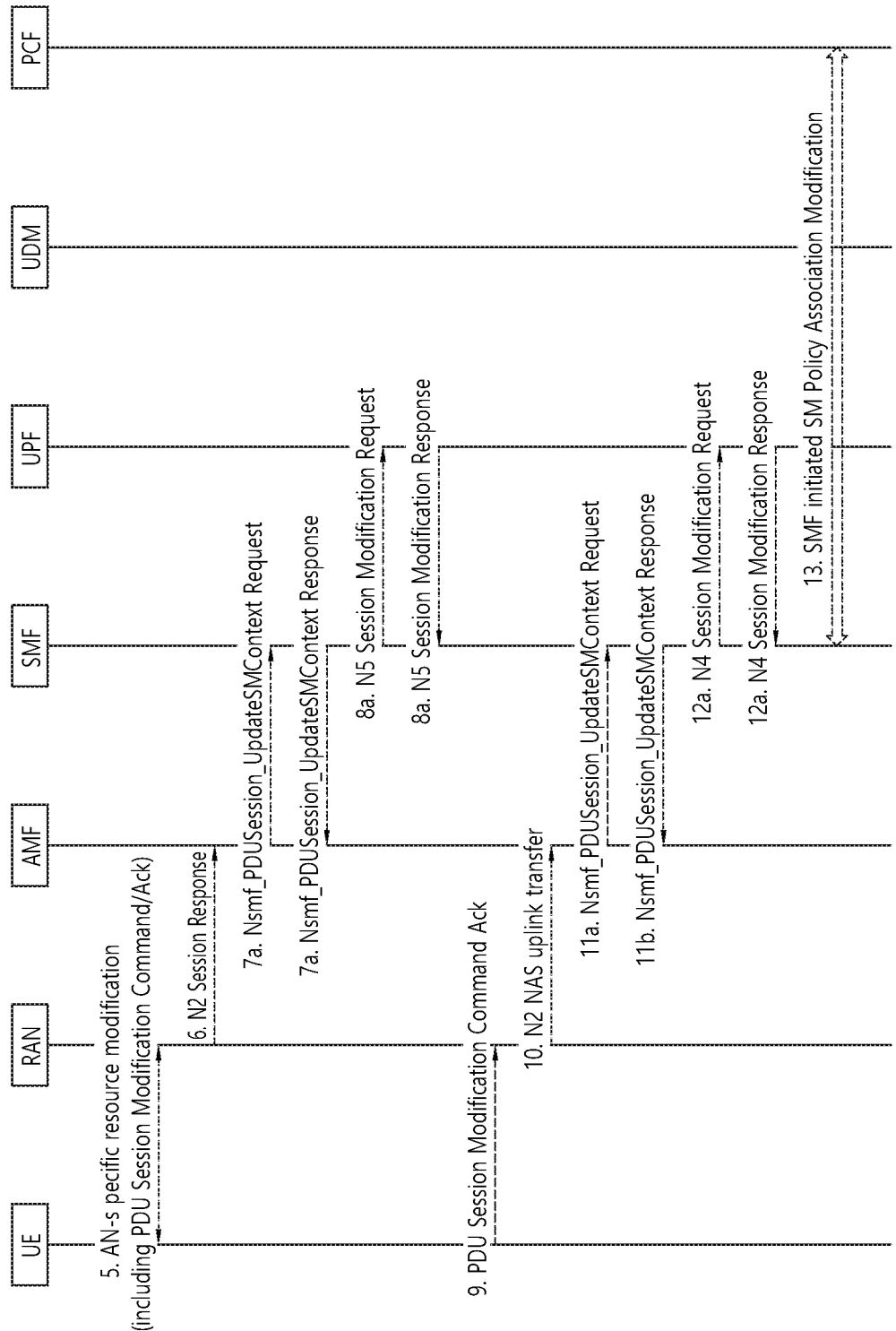

FIG. 9A and FIG. 9B are signal flow charts showing an example of a PDU Session Modification procedure.

The PDU Session Modification procedure may be used in a case where one or more Quality of Service (QoS) parameters being exchanged between the UE and the network is/are modified.

The signal flow charts shown in FIG. 9A and FIG. 9B are merely one example of the PDU Session Modification procedure. More specifically, the signal flow charts in FIG. 9A and FIG. 9B show examples of UE or network requested PDU Session Modifications (a non-roaming case and a roaming with local breakout case).

The example of the PDU Session Modification procedure may be triggered by the following events (Step 1a to Step 1e):

1a) (Modification initiated by the UE) the UE may initiate the PDU Session Modification procedure by transmitting an NAS message.

For example, the UE may transmit a PDU Session Modification request message. Herein, the NAS message may include an N1 SM container, a PDU session ID, and a UE Integrity Protection Maximum Data Rate. The N1 SM container may include a PDU Session Modification request (a PDU session ID, packet filters, operation, a request QoS, segregation, a 5GSM Core Network capability, a number of packet filter, and an Always-on PDU Session Requested, in case an Always-on PDU Session is requested.

Depending on the Access type, in case the UE was in the CM-IDLE state, this SM-NAS message is preceded by the Service Request procedure (i.e., a Service Request procedure may be preceded before the SM-NAS is transmitted). The (R)AN may forward the NAS message to the AMF along with an indication of the user location information.

The AMF may call an SM context which is related to the PDU session update. For example, the AMF may call a Nsmf_PDUSession_UpdateSMContext. The Nsmf_PDUSession_UpdateSMContext may include an SM context ID and an N1 SM container (including a PDU Session Modification request).

If the UE requests specific QoS handling for a selected Service Data Flow (SDF), the PDU Session Establishment request may include a packet filter describing the SDF, a packet filter operation (add, modify or delete) that is requested for the indicated packet filter, and a request QoS. The PDU session establishment request may optionally include a segregation indication. In case the UE requests the network to bind an applicable SDF to a distinct and dedicated QoS Flow (e.g., even if an existing QoS flow may support a requested QoS), the Segregation indication may be included in the PDU Session Establishment request. Although the network shall follow (or obey) the request of the UE, instead of the request of the UE, the network may bind an SDF, which is selected for the existing QoS flow.

NOTE 1: Only one QoS flow may be used for traffic segregation. In case the UE makes a subsequent request for the segregation of an additional SDF, the additional SDF is multiplexed in the existing QoS flow that is used for the segregation.

If the UE is outside of an available area of a Local Area Data Network (LADN), the UE does not trigger a PDU Session Modification procedure for a PDU session corresponding to the LADN.

For a PDU session that is established within an EPS, when the UE first moves from the EPS to a 5GS, in case the UE intends to modify the PDU session to an Always-on PDU session, the UE may include an indication indicating that an Always-on PDU session is being request in the PDU Session Modification Request message.

1b) (Modification requested by the SMF) A PCF may perform a PCF initiated SM Policy Association Modification procedure for notifying the modification of a policy to the SMF. The PCF initiated SM Policy Association Modification procedure may, for example, be triggered by a policy determination or may be triggered when an application function (AF) is requested.

1c) (Modification requested by the SMF) A UDM may update subscription data of the SMF by using a Subscriber Data Management (SDM) notification. For example, the SDM notification may be a Nudm_SDM_Notification (including a Subscription Permanent Identifier (SUPI) and Session Management Subscription Data). The SMF may update the Session Management Subscription data and may return a SUPI and Ack and may acknowledge the update.

1d) (Modification requested by the SMF) The SMF may determine to modify the PDU session. Step 1d) may also be triggered from a locally configured policy or (R)AN. Step 1d) may also be triggered in a case where a user plane (UP) connection is activated and may also be triggered in a case where, even though the status(es) of one or more QoS flows is/are deleted from the 5GC, the SMF marks the failure to establish synchronization with the UE.

In case the SMF receives one of the triggers of step 1b) to 1d), the SMF may start the PDU Session Modification procedure, which is requested by the SMF.

1e) (Modification initiated by the AN) Regardless of whether or not a notification control is configured, if an AN resource having a QoS flow mapped thereto is released, the (R)AN shall indicate this to the SMF. The (R)AN may transmit an N2 message (including a PDU session ID and N2 SM information) to the AMF. The N2 SM information may include a QoS flow ID (QFI), user location information, and an indication indicating that the QoS flow has been released.

The AMF may call an SM context request related to the update of the PDU session. For example, the AMF may call Nsmf_PDUSession_UpdateSMContext (including an SM context ID and N2 SM information).

(Notification control initiated by the AN) In case the notification control is configured for a GBR flow, if the (R)AN determines that QoS targets of the QoS flow cannot be satisfied or that each QoS target of the QoS flows can be satisfied once again, the (R)AN may transmit an N2 message (including a PDU session ID and N2 SM information). The N2 SM information may include an indication indicating that QFI and QoS targets of the QoS target flow cannot be satisfied or an indication indicating that each QoS target of the QoS flows can be satisfied once again. The AMF may call an SM context request related to an update of the PDU session. For example, the AMF may call Nsmf_PDUSession_UpdateSMContext (including a SM context ID and N2 SM information). In case the PCF has subscribed to an event, the SMF may report this event according to each of the set PCC rules (see Step 2)). Alternatively, in case a dynamic PCC is not applied to this DNN and depends on a policy that is locally configured, the SMF may initiate the PDU Session Modification procedure, which is requested by the SMF, as shown in the example of Step 3b).

2) The SMF performs an SMF initiated SM Policy Association Modification procedure and may report some subscribed events to the PCF. Step 2) may be omitted in case the PDU Session Modification procedure is triggered by Step 1b or Step 1d. In case a dynamic PCC is not deployed, the SMF may determine whether or not to modify the QoS profile by applying a local policy.

In case the operations (e.g., gating) performed by the UPF are only needed in the PDU Session Modification, Step 3) to Step 7) may not be called.

3a) For the UE initiated modification or the AN initiated modification, the SMF may respond to the AMF through a PDU session update SM context. For example, the PDU session update SM context may be Nsmf_PDUSession_UpdateSMContext. Nsmf_PDUSession_UpdateSMContext may include N2 SM information (a PDU session ID, QFI, a QoS profile, a session-Aggregate Maximum Bit Rate (AMBR)) and an N1 SM container (including a PDU Session Modification command). The PDU Session Modification command may include a PDU session ID, a QoS rule, QoS rule operations, QoS flow level QoS parameters in case a QoS related to the QoS rule is needed, Session-AMBR, and an Always-on PDU Session Requested in case an Always-on PDU Session is requested.

In case the PDU Session Modification has been requested by the UE, in order to modify the PDU session to an always-on PDU session, the SMF may include an Always-on PDU Session Granted indication within the PDU Session Modification command. The Always-on PDU Session Granted indication may be included in order to indicate whether or not the PDU session is to be modified to an Always-on PDU session.

The N2 SM information may carry information that is to be provided to the (R)AN by the AMF. In order to notify to the (R)AN that one or more QoS flows has/have been added or modified, the N2 SM information may include a QoS profile and the corresponding QFI. In order to notify to the (R)AN that one or more QoS flows has/have been removed, the N2 SM information may include only the QFI. In case the PDU Session Modification is triggered by the (R)AN release of Step 1e), the SM information may carry acknowledgement of the (R)AN release. In case the UE requests PDU session modification for a PDU session having no established user plane resource, the N2 SM information being provided to the (R)AN may include information for the establishment of a user plane resource.

The N1 SM container carries a PDU Session Modification command that is to be provided to the UE by the AMF. In order to notify to the (R)AN that one or more QoS flows has/have been added, removed or modified, the N1 SM container may include a QoS rule, QoS flow level QoS parameters when needed for a QoS related to QoS rule operations corresponding to the QoS rule, and QoS flow level QoS parameter operations.

3b) For the modification requested by the SMF, the SMF may call Namf_Communication_N1N2MessageTransfer. The Namf_Communication_N1N2MessageTransfer may include N2 SM information (including a PDU session ID, QFI(s), QoS Profile(s), session-AMBR) and an N1 SM container (including a PDU Session Modification command). The PDU Session Modification command may include a PDU session ID, QoS rules, QoS flow level QoS parameters when needed for the QoS rules, QoS rule operations and QoS related to the QoS rule operations and the QoS rules, and a session-AMBR.

In case the UE is in a CM-IDLE state, and in case an Asynchronous Type Communication (ATC) is activated, the AMF may update the UE context based on the Namf_Communication_N1N2MessageTransfer and may store the update. Herein, Step 4) and Step 7) may be omitted. For reference, if the ATC mode is activated, paging is not performed on a UE being in the IDLE state. In case the UE is reachable (e.g., in case the UE has entered the CM-CONNECTED state), the AMF may forward an N1 message for the synchronization of the UE and the UE context.

4) The AMF may transmit an N2 PDU Session Request message to the (R)AN. The N2 PDU Session Request may include N2 SM information received from the SMF and a NAS message (including a PDU session ID and an N1 SM container (including a PDU Session Modification command)).

5) The (R)AN may perform an AN specific signaling exchange with a UE that is related to the information received from the SMF. For example, in case of NG-RAN, the UE may perform an RRC Connection Reconfiguration by modifying the required (R)AN resource that is related to the PDU session.

By transmitting an N2 PDU session Ack message to the AMF, the (R)AN may acknowledge the N2 PDU Session Request. The N2 PDU session Ack message may include N2 SM information (list of accepted/rejected QFI, AN tunnel information, PDU 세션 ID, and Secondary RAT using data) and user location information. In case of Dual Connectivity, when one or more QFI is added to the PDU session, a master RAN node may allocate one or more of the added QFI to an NG-RAN node (an NG-RAN node that is not previously involved in a PDU session). In this case, the AN tunnel information may include a new N3 tunnel end-point for the QFI being allocated to the new NG-RAN node. Accordingly, in case one or more QFI is removed from the PDU session, the (R)AN node is no longer involved in the PDU session, and the corresponding tunnel end-point is removed from the AN tunnel information. In case the QFI cannot satisfy the user plane security reinforcement information for the corresponding QoS profile (e.g., due to an excess in the UE Integrity Protection Maximum Data Rate), the NG-RAN may reject the AFI.

In case the PLMN configures secondary RAT usage reporting, the NG-RAN node may provide a RAN usage data report.

7) The AMF may forward N2 SM information and user location information received from the AN to the SMF through a Nsmf_PDUSession_UpdateSMContext service operation. And, as a Nsmf_PDUSession_UpdateSMContext response, the SMF may reply to the AMF. The N2 SM information may include secondary RAT usage data.

In case the (R)AN rejects the QFI, the SMF is responsible for updating a QoS rule and a QoS flow level QoS parameter when needed for a QoS flow associated with the QoS rule in the UE.

8) By transmitting an N4 Session Modification Request message to the UPF, the SMF may update an N4 session associated with the PDU session modification (see NOTE 3).

In case a new QoS flow is generated, the SMF may update the UPF by using UL Packet Detection Rules of the new QoS flow.

NOTE 2: By performing the update, a UL packet having a QFI of the new QoS flow may be forwarded.

9) By transmitting a NAS message, the UE may acknowledge a PDU Session Modification command. The NAS message may include a PDU session ID and an N1 SM container (including a PDU Session Modification command Ack).

10) The (R)AN may forward the NAS message to the AMF.

11) The AMF may transmit the N1 SM container (including a PDU Session Modification command Ack) received from the AN and user location information to the SMF through a Nsmf_PDUSession_UpdateSMContext service operation.

The SMF may send a rely by using a Nsmf_PDUSession_UpdateSMContext response.

In case the SMF initiated PDU Session Modification procedure is for deleting QoS flows that do not include QoS flows associated with default QoS rules (e.g., in case the procedure is triggered by the PCF), and in case the SMF fails to receive a response from the UE, the SMF marks that the statuses of such QoS flows shall be synchronized with the UE.

12) By transmitting an N4 Session Modification Request message (including an N4 session ID), the SMF may update an N4 session of the UPF that is not associated with the PDU Session Modification. For a PDU session of an Ethernet PDU session type, the SMF may notify to the UPF that an Ethernet Packet Filter Set and forwarding rule(s) are to be added or removed.

NOTE 3: UPFs that are influenced during the PDU Session Modification procedure are different according to the modified QoS parameters and deployment. For example, in case a session AMBR of a PDU session having an Uplink Classifier (UL CL) is modified, only the UL CL may be related. This Note may also be applied to Step 8).

13) In case the SMF interacts with the PCF in Step 1b) or Step 2), by performing the SMF initiated SM Policy Association Modification procedure, the SMF may notify to the PCF whether or not the PCC determination can be enforced.

The SMF may notify a random entity being subscribed to the user location information related to the PDU session modification.

In case Step 1b) is triggered for performing an application function influence for traffic routing, the SMF may reconfigure the user plane of the PDU session.

<Service Request Procedures>

In some implementations, a Service Request procedure is used for requesting establishment of a safe (or secure) connection to an AMF by a UE or 5G Core Network (5GC). A Service Request procedure may also be used for activating a user plane connection of an established PDU session even in a case where the UE is in a Connection Management (CM)-IDLE state and in a case where the UE is in a CM-CONNECTED state. For reference, in order to reflect a Non Access Stratum (NAS) signaling connection of the AMF and the UE, the two types of CM statuses, i.e., the CM-IDLE state and the CM-CONNECTED state, are used.

In case a Service Request procedure being in process exists, the UE does not initiate (or trigger) a Service Request procedure.

Examples of the Service Request procedure include a Service Request procedure that is initiated (or triggered) by the UE (i.e., UE Triggered Service Request), and a Service Request procedure that is initiated (or triggered) by the network (i.e., a Network Triggered Service Request).

Hereinafter, referring to FIG. 10A to FIG. 10C, examples of the UE triggered service request will be described in detail. The Service Request procedures described in FIG. 10A to FIG. 10C are merely examples, and, in general, implementations according to the present disclosure may include other types and techniques of Service Request procedures being initiated (or triggered) by the UE and other types and techniques of Service Request procedures being initiated (or triggered) by the network.

Figure 10A:
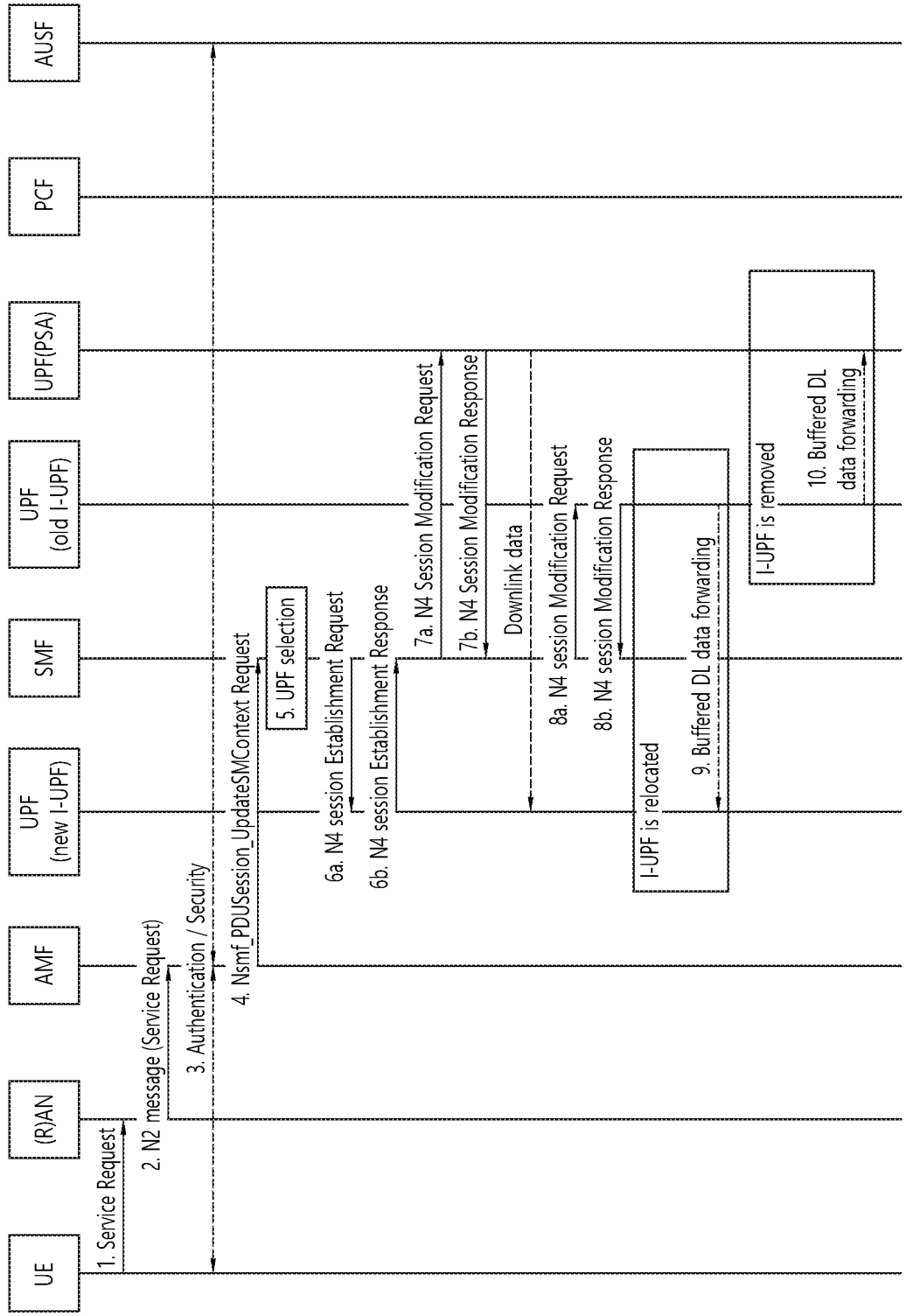
FIG. 10A to FIG. 10C are signal flow charts showing an examples of a UE Triggered Service Request procedure.
Figure 10B:
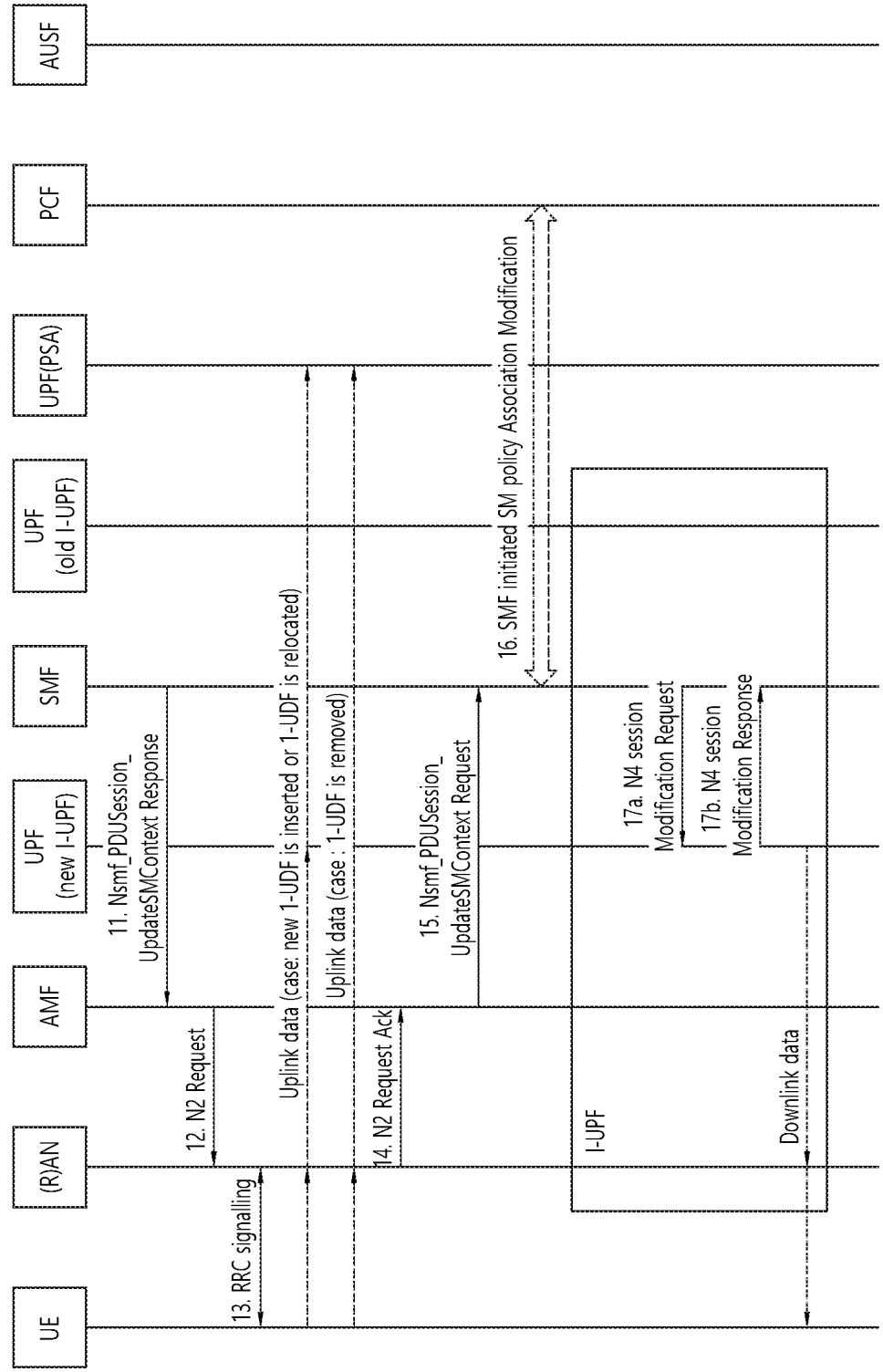
Figure 10C:
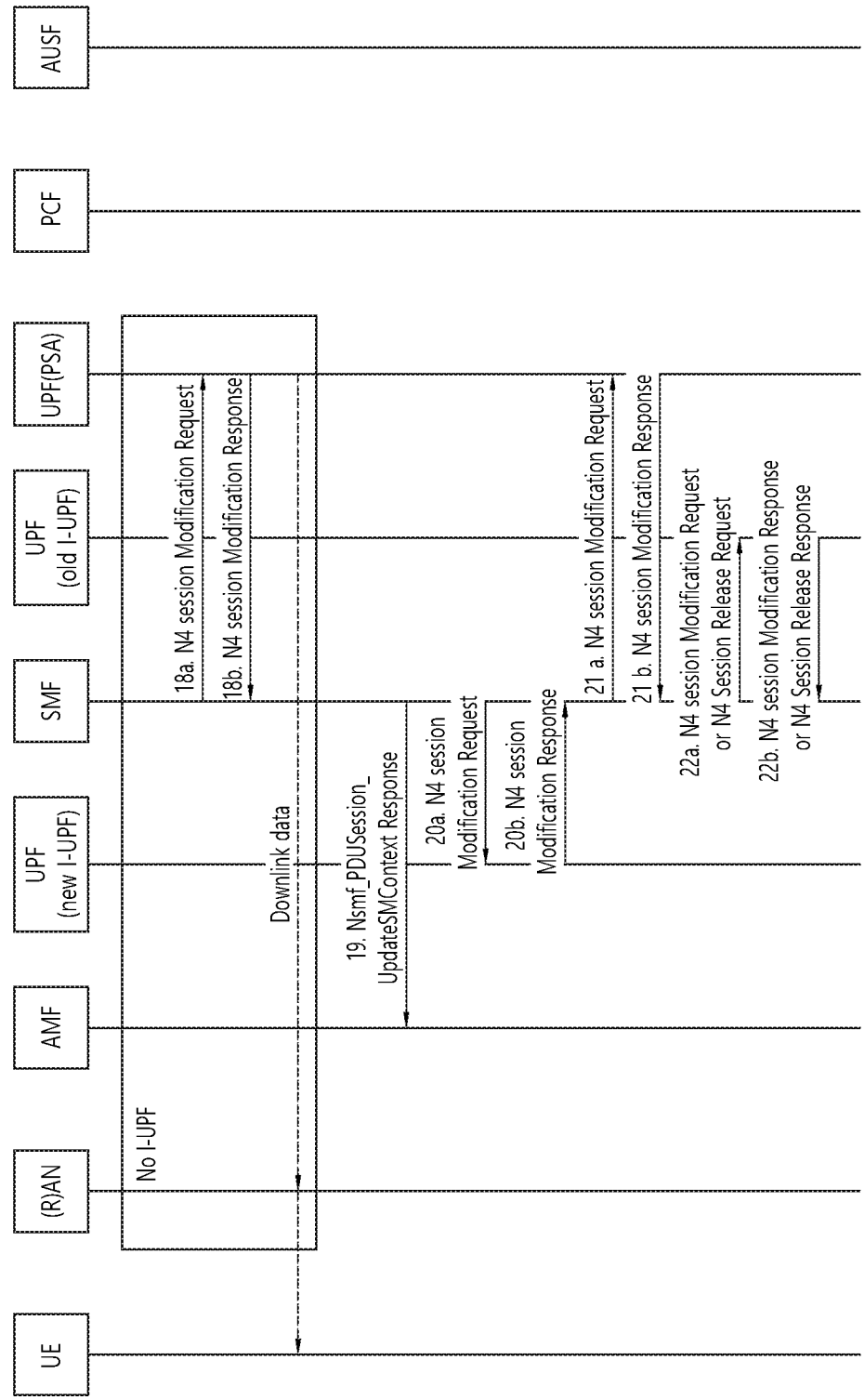

FIG. 10A to FIG. 10C are signal flow charts showing examples of a UE Triggered Service Request procedure.

A UE being in the CM-IDLE state initiates (or triggers) a Service Request procedure for transmitting a response to an uplink signaling message, user data or a network paging request. After receiving a Service Request message, the AMF may perform authentication. After establishing a signaling connection for the AMF, the UE or network may transmit a signaling message (e.g., PDU Session establishment from a UE to an SMF through the AMF).

The Service Request procedure may be used by a UE being in the CM-CONNECTED state in order to request activation of a user plane connection for the PDU session and to respond to an NAS Notification message received from the AMF.

For a random Service Request procedure, if needed, the AMF may include status information of the PDU session in a Service Accept message in order to synchronize the PDU session status between the UE and the network.

In case the Service Request is not accepted by the network, the AMF responds to the UE by a Service Reject message. The Service Reject message may include an indication or cause code requesting the UE to perform a Registration Update procedure.

During the UE Triggered Service Request procedure, both SMF and UPF belong to an PLMN serving the UE. For example, in case of a Home-Routed Roaming case, the SMF and UPF of an HPLMN are not influenced by the Service Request procedure (i.e., the SMF and UPF of the HPLMN are not involved in the Service Request procedure).

For the Service Request according to the user data, the network may take additional measures in case the user plane connection activation is not successful.

The UE Triggered Service Request procedure may be applied to a scenario having or not having an intermediate UPF and a scenario having or not having a re-selection of the intermediate UPF.

1) Signaling from the UE to the (R)AN: the UE may transmit an Access Network (AN) message (AN parameters and a Service Request (including a List of PDU Sessions to be activated, a List of allowed PDU Sessions, security parameters, and PDU session status)) to the (R)AN.

When the UE intends to re-activate the PDU session, the List of PDU Sessions to be activated is provided by the UE. In case the Service Request is a response to an NAS notification of the PDU session related to a non-3GPP access, or in case the Service Request is a response to a paging, the List of PDU Sessions to be activated is provided by the UE. Additionally, the List of PDU Sessions to be activated identifies the PDU sessions that may be moved (or relocated) to a 3GPP access.

In case of an NG-RAN:

AN parameters include a selected PLMN ID and an Establishment cause. The Establishment cause provides a cause for requesting the establishment of an RRC connection.

the UE transmits a Service Request message being encapsulated in an RRC message (a message addressed to the AMF) to the NG-RAN. The RRC message may be used for carrying a 5G System Architecture Evolution (SAE (S))-Temporary Mobile Subscriber Identity (5G-S-TMSI).

In case a Service Request is triggered for the user data, the UE uses the List of PDU Sessions to be activated to notify PDU sessions that are to have the user plane (UP) connection activated in the Service Request message.

In case the Service Request is triggered only for the signaling, the UE does not include the List of PDU Sessions to be activated.

In case the Service Request procedure is triggered for a paging response, and, at the same time, in case the UE has user data that are to be transmitted, the UE may use the List of PDU Sessions to be activated to notify the PDU sessions that are to have the UP connection activated in the Service Request message. Otherwise, the UE does not notify any PDU session in the Service Request for the paging response.

In a specific case, in case pending uplink data of the PDU sessions do not exist, in case the Service Request is triggered only for the signaling, or in case the Service Request is triggered for paging response, the UE may include the PDU session in the List of PDU Sessions to be activated.

In case a Service Request through a 3GPP access is triggered as a paging, or in case a Service Request through a 3GPP access is triggered as a response to an NAS notification indicating a non-3GPP access, non-3GPP PDU sessions that may be re-activated through 3GPP may be included in the List of allowed PDU Sessions and then transmitted. (See example that is to be described in Step 6 of FIG. 12.)

The PDU session status indicates PDU sessions being available to the UE.

In case a UE is located outside of an available area of an LADN, the UE does not trigger a Service Request procedure for the PDU sessions corresponding to the LADN. And, in case the Service Request procedure is triggered due to other reasons, the UE does not include such PDUs in the List of PDU Sessions to be activated.

In case the UE is in the CM-CONNETED state, only the List of PDU Sessions to be activated and the List of allowed PDU Sessions may be included in the Service Request.

2) Signaling from the (R)AN to the AMF: the (R)AN may transmit an N2 message to the AMF. The N2 message may include N2 parameters, a Service Request, and a UE Context Request.

In case the AMF cannot handle a Service Request, the AMF shall reject the Service Request.

In case an NG-RAN is being used, the N2 parameters may include 5G-S-TMSI, a selected PLMN ID, location information, and an Establishment cause.

In case the UE is in the CM-IDLE state, the NG-RAN may obtain 5G-S-TMSI during an RRC procedure. The NG-RAN may select an AMF based on the 5G-S-TMSI. The location information is associated with a cell in which the UE is camping.

Based on the PDU session status, the AMF may perform a PDU Session Release procedure for PDU sessions being marked by the UE that the PDU session IDs are not available in the network.

3a) Signaling from the AMF to the (R)AN: the AMF may transmit an N2 request to the (R)AN. Herein, the N2 request may include security context, a Handover Restriction list, and a list of recommended cells/TAs/NG-RAN node identifiers.

In case a 5G-AN has made a request for UE context, or in case the AMF needs to provide the UE context (e.g., in case the AMF needs to initiate a fallback procedure for an urgent service), the AMF may initiate an NG Application Protocol (NGAP) procedure. For a UE being in the CM-IDLE state, the 5G-AN stores a security context in a UE AN context. The Handover Restriction list is related to mobility restriction.

The 5G-AN is used for protecting a message that is exchanged with the UE.

In case the NG-RAN node provides a list of recommended cells/TAs/NG-RAN node identifiers during an AN release procedure, the AMF may include the list of recommended cells/TAs/NG-RAN node identifiers in the N2 request. In case the RAN has been determined to enable an RRC Inactive state for the UE, the RAN may use this information for allocating a RAN notification area.

3) In case the Service Request is not transmitted due to integrity protection or failure to verify integrity protection, the AMF may initiate an NAS authentication/security procedure.

In case a UE being in the CM-IDLE state initiates a Service Request only for a signaling connection, after a successful establishment of the signaling connection, the UE and the network may exchange NAS signaling, and Step 4 to Step 11 and Step 15 to Step 22 of FIG. 10A to FIG. 10C may be omitted.

4) [Conditional operation] Signaling from the AMF to the SMF: the AMF may transmit a Nsmf_PDUSession_UpdateSMContext Request to the SMF. Herein, the Nsmf_PDUSession_UpdateSMContext Request may include a PDU session ID, an Operation type, UE location information, an Access type, a RAT type, and a UE presence in an LADN service area.

The Nsmf_PDUSession_UpdateSMContext Request is called in the following cases:
  a case where the UE includes a List of PDU Sessions to be activated in a Service Request message;
  although this procedure is triggered by the SMF, a case where a PDU session identified by the UE has a correlation with a PDU session ID other than the PDU session ID triggering this procedure;
  although this procedure is triggered by the SMF, there is a case where the location of the current UE is outside of an "area of validity for the N2 SM information" provided by the SMF (see Step 3a of FIG. 12). In this case, the AMF does not transmit the N2 information provided by the SMF (see Step 3a of FIG. 12). In case the location of the current UE is outside of the "area of validity for the N2 SM information", Step 4 to Step 11 are omitted.

If the DNN corresponds to the LADN, the "UE presence in an LADN service area" indicates whether the UE is inside (IN) or outside (OUT) of the LADN service area. If the AMF does not provide indication of the "UE presence in an LADN service area", and if the SMF determines that the DNN corresponds to an LADN, the SMF considers that the UE is outside of the LADN service area.

The AMF determines whether or not the PDU session(s) is/are to be activated. And, in order to indicate the establishment of a user plane resource for the PDU session, the AMF transmits a Nsmf_PDUSession_UpdateSMContext Request related to a PDU session along with an Operation type set to "UP active" to the SMF. The AMF determines an Access type and a RAT type based on a global RAN node ID related to an N2 interface.

In case this procedure is triggered as a response to a paging or NAS notification indicating the non-3GPP access, and in case the UE is not included in the paged or notified List of allowed PDU Sessions (which is provided from the UE), the AMF may notify to the SMF that a user plane for the PDU session cannot be re-activated. The Service Request procedure may be ended without performing re-activation of another PDU session within the List of allowed PDU Sessions.

While a previous NAS signaling connection is maintained through the NG-RAN, the AMF may receive a Service Request through the NG-RAN in order to establish another NAS signaling connection. In this case, in order to release the old (or previous) NAS signaling connection, the AMF may trigger an AN release procedure according to the following logic for the old NG-RAN:
  for a "List of PDU Sessions to be activated", the AMF may request the SMF to perform Step 4 so as to immediately activate the PDU session(s).
  for PDU sessions being included in a "List of PDU Session ID(s) with active N3 user plane" but not being included in a "List of PDU Sessions to be activated", the AMF may request the SMF to deactivate the PDU session(s).

5) In case a PDU session ID corresponds to the LADN, and in case the SMF determines that the UE is located outside of an area of validity of the LADN based on the "UE presence in an LADN service area", the SMF may determine to perform the following operations (based on a local policy):
  the SMF may maintain the PDU session(s). However, the SMF may reject the activation of the user plane connection of the PDU session(s) and may notify such rejection to the AMF. In case the Service Request procedure is triggered by a network initiated Service Request of FIG. 12, the downlink data for the PDU session may be deleted (or discarded), and/or, in order to prevent additional data notification from being provided, the SMF may notify such deletion to a UPF (the UPF that has sent the data notification); or
  the SMF may release the PDU session(s). The SMF may release the PDU session(s) and may notify the AMF that the PDU session(s) has/have been released.

In the above-described two cases, the SMF may respond to the AMF with an appropriate rejection cause, and the user plane activation of the PDU session may be suspended.

In case the SMF determines that the UE is located in the LDN validity area, based on the location information received from the AMF, the SMF may verify a UPF selection reference and may determine to perform one of the following operations:

the SMF may accept activation of a UP connection and may continue to use the current UPF;

in case the UE moves outside of the service area of the UPF (the UPF that was previously connected to the AN), while maintaining the UPF that operates as a PDU Session Anchor, the SMF may accept the activation of the UP connection and may select a new intermediate UPF (or may add/remove an intermediate UPF (I-UPF)). A process step performing the addition/modification/removal of an I-UPF will hereinafter be described through the conditional process steps.

NOTE 1: For a connection to a local access for a data network, in case an old and/or new I-UPF realize(s) an Uplink Classifier (UL CL) or Branching Point (BP) function and a PDU session anchor, the signaling being described in this drawing shall be intended as signaling for adding, removing or modifying a PDU session anchor, and the signaling for adding, removing or modifying each UL CL or BP shall be completed by another procedure.

The SMF may reject the activation of the UP connection of the PDU session of a Session and Service Continuity (SSC) Mode 2. And, after the Service Request procedure, in order to allocate a new UPF (a UPF operating as a PDU session anchor), the SMF may trigger a re-establishment of the PDU session. (Such operation may, for example, be performed in a case where the UE has moved outside of the service area of an anchor UPF, which is connected to the NG-RAN.)

6a) [Conditional operation] Signaling from the SMF to a new UPF (or new I-UPF): the SMF may transmit an N4 Session Establishment Request to the UPF.

In case the SMF selects a new UPF operating as an I-UPF for the PDU session, or in case the SMF selects to inserted an I-UPF for the PDU session (which does not have an I-UPF), the SMF may transmit the N4 Session Establishment Request to the UPF. Herein, the N4 establishment request provides packet detection of packets that are to be installed in the I-UPF, data forwarding, enforcement, and reporting rules. PDU session anchor addressing information (PDU session anchor addressing information from an N9 reference point (a reference point between two UPFs)) for the PDU session may also be provided to the I-UPF.

In case the Service Request is triggered by the network, and in case the SMF selects a new UPF in order to replace the existing (or old) UPF (or the existing (or old) I-UPF), the SMF may include Data forwarding indication to an N4 Session Establishment Request. The Data forwarding indication may indicate to the UPF that a secondary tunnel end-point needs to be reserved for the buffered DL data being provided from an old (or previous) I-UPF.

6b) Signaling from a new UPF (or I-UPF) to the SMF: a new UPF (or I-UPF) may transmit an N4 Session Establishment Response to the SMF.

A new I-UPF may transmit an N4 Session Establishment Response to the SMF. In case the UPF allocates CN tunnel information, the new I-UPF may transmit DL Core Network (CN) tunnel information for the UPF operating as the PDU session anchor and UL tunnel information of the new I-UPF to the SMF. If a data forwarding indication is received, a new UPF (or I-UPF) operating as an N3 terminating point may transmit DL tunnel information of the new I-UPF to the SMF for performing data forwarding from the old UPF (or I-UPF) to the SMF. IF resource of the old I-UPF exists, in order to release the corresponding resource, the SMF may operate a timer, which is to be used in Step 22a.

7a) [Conditional operation] Signaling from the SMF to a UPF (PDU Session Anchor (PSA)): the SMF may transmit an N4 Session Modification Request to the UPF.

In case the SMF selects a new UPF so that the selected UPF is to be operated as a PDU session, the SMF may provide DL tunnel information, which is received from the new I-UPF, by transmitting an N4 Session Modification Request message to the PDU session anchor UPF. In case a new I-UPF is added for the PDU session, the UPF (PSA) may provide DL data to the new I-UPF according the indication indicated to the DL tunnel information.

In case a Service Request is triggered by the network, and in case the SMF removes the old I-UPF and does not replace the old I-UPF with a new I-UPF, the SMF may include a data forwarding indication to the N4 session modification request. The data forwarding indication may indicate to the UPF (PSA) that a secondary tunnel end-point needs to be reserved for the buffered DL data being received from an old (or previous) I-UPF. In this case, the UPF (PSA) may start the buffering of DL data that is to be synchronously received from an N6 interface.

7b) The UPF (PSA) may transmit an N4 Session Modification Response message to the SMF.

In case the UPF (PSA) has received the data forwarding indication, the UPF (PSA) may be the N3 terminating point, and the UPF (PSA) may transmit CN DL tunnel information for the old UPF (or I-UPF) to the SMF. The SMF may operate a timer. If resource of the old I-UPF exists, in order to release the corresponding resource, the SMF may operate a timer, which is to be used in Step 22a.

In case the UPF being connected to the RAN is a UPF (PSA), and in case the SMF knows that the PDU session has been activated when receiving the Nsmf_PDUSession_UpdateSMContext Request (including an Operation type being set to "UP activate" for indicating the establishment of a user plane resource for the PDU session) of Step 4, the SMF may receive AN tunnel information and may initiate an N4 Session Modification procedure for removing tunnel information of the AN from the UPF.

8a) [Conditional operation] Signaling from the SMF to the old (or existing) UPF (or I-UPF): the SMF may transmit an N4 Session Modification Request (including a new UPF address and a new UPF DL tunnel ID) to the old UPF (or I-UPF).

In case the Service Request is triggered by the network, and in case the SMF has removed the old UPF (or I-UPF), the SMF may provide DL tunnel information for the buffered DL data by transmitting the N4 Session Modification Request message to the old UPF (or I-UPF). In case the SMF allocates a new I-UPF, the DL tunnel information is received from a new UPF (or I-UPF) operating as the N3 terminating point. In case the SMF does not allocate a new I-UPF, the DL tunnel information is received from the UPF (PSA) operating as the N3 terminating point. The SMF may operate a timer for monitoring a forwarding tunnel, as described in Step 6b or Step 7b.

When the SMF receives a Nsmf_PDUSession_UpdateSMContext Request (including an Operation type being set to "UP activate" in order to indicate the establishment of a user plane resource for the PDU session) of Step 4, in case the SMF knows that the PDU session has been activated, in order to remove tunnel information of the AN from the UPF, the SMF may remove the AN tunnel information and may initiate the N4 Session Modification Procedure.

8b) Signaling from the old UPF (or I-UPF) to the SMF: the old UPF (or I-UPF) may transmit an N4 Session Modification Response message to the SMF.

9) [Conditional operation] Signaling from the old UPF (or I-UPF) to a new UPF (or I-UPF): the old UPF (or I-UPF) may forward buffered downlink data to a new UPF (or I-UPF).

In case the I-UPF is modified and a forwarding tunnel is established for a new I-UPF, the old UPF (or I-UPF) forwards data being buffered to the old UPF (or I-UPF) to a new UPF (or I-UPF), which operates an the N3 terminating point.

10) [Conditional operation] Signaling from the old UPF (or I-UPF) to the UPF (PSA): the old UPF (or I-UPF) may forward buffered downlink data to the UPF (PSA).

In case the old I-UPF is removed and a new I-UPF is not allocated for the PDU session, and in case the forwarding tunnel is established for the UPF (PSA), the old UPF (or I-UPF) may forward data being buffered to the old UPF (or I-UPF) to a new UPF (or I-UPF), which operates an the N3 terminating point.

11) [Conditional operation] Signaling from the SMF to the AMF: the SMF may transmit a Nsmf_PDUSession_UpdateSMContext Response to the AMF. The Nsmf_PDUSession_UpdateSMContext Response may include N2 SM information (including a PDU session ID(s), QoS Flow ID(s) (QFI(s)), a Quality of Service (QoS) profile, CN N3 tunnel information, S-NSSAI, User Plane Security Enforcement, UE Integrity Protection Maximum Data Rate) and a cause. In case the UPF being connected to the RAN is a UPF (PSA), the CN N3 tunnel information is UL tunnel information of the UPF (PSA). In case the UPF being connected to the RAN is a new I-UPF, the CN N3 tunnel information is UL tunnel information of the I-UPF.

In Step 5, for a PDU session in which the SMF has determined to accept the activation of the UP connection, the SMT may generate only the N2 SM information and may transmit a Nsmf_PDUSession_UpdateSMContext Response to the AMF in order to establish a user plane. The N2 SM information may include information that is to be provided by the AMF to the NG-RAN. In case the SMF determines to modify a PSA UPF for an SSC Mode 3 PDU session, after accepting the UP activation of the PDU session, the SMF may trigger the modification of an SSC Mode 3 PDU session anchor as an independent procedure.

By including a cause in the Nsmf_PDUSession_UpdateSMContext Response, the SMF may reject the activation of the UP of the PDU session. For example, the SMF may reject the activation of the UP of the PDU session in the cases listed below:

as described in Step 5, a case where the PDU session corresponds to an LADN and where the UE is located outside of the area of validity of the LADN;

a case where the AMF notifies to the SMF that the UE is reachable only to regulatory prioritized services and where the PDU session that is to be activated is not for the regulatory prioritized services; or as described in Step 5, a case where the SMF determines to modify the PSA UPF for the requested PDU session. In this case, after the SMT transmits the Nsmf_PDUSession_UpdateSMContext Response, the SMF may perform another procedure for indicating the UE to perform re-establishment of a PDU session for SSC Mode 2.

a case where the SMF receives a negative response in Step 6b due to UPF resource unavailability.

In case an EPS bearer ID is allocated to the PDU session, the SMF maps the EPS bearer ID and QFI to the N2 SM information and transmits the mapped information to the NG-RAN.

The User Plane Security Enforcement information is determined by the SMF during the PDU Session Establishment procedure. In the User Plane Security Enforcement information, if Integrity Protection indicates "preferred)" or "required", the SMF may also include a UE Integrity Protection Maximum Data Rate.

12) Signaling from the AMF to the (R)AN: the AMF may transmit an N2 Request to the (R)AN. The N2 Request may include N2 SM information received from the SMF, security context, a Handover Restriction List, a Subscribed UE-Aggregate Maximum Bit Rate (AMBR), an MM NAS Service Accept, a list of recommended cells/TAs/NG-RAN node identifiers, and UE Radio Capability. An NSSAI that is allowed for an Access type of the UE may be included in the N2 message.

In case the UE triggers a Service Request while being in the CM-CONNECTED state, only the N2 SM information received from the SMF and the MM NAS Service Accept may be included in the N2 Request.

While the SMF is in the CM-CONNECTED state, in the case the Service Request procedure is triggered by the network, only the N2 SM information received from the SMF may be included in the N2 Request.

When the Service Request procedure is triggered, for a UE that was in the CM-IDLE state, the NG-RAN may store a security context and NAS signaling connection ID. In case the Service Request is not triggered by the UE only for the signaling connection, the RAN may store QoS information regarding a QoS flow of activated PDU Session(s), an N3 tunnel ID of the UE RAN context, and a Handover Restriction List.

The MM NAS Service Accept may include a PDU session status of the AMF. During the Session Request procedure, a random local PDU Session Release may be notified to the UE through the PDU session status. A PDU Session Re-activation result may be included in a Service Accept message. The PDU Session Re-activation result provides PDU session(s) within the List of PDU Sessions to be activated and an activation result for PDU Session(s) within the List of allowed PDU Sessions that has generated the paging or NAS notification. In case the PDU Session Re-activation result of the PDU session(s) is a failure, the cause of the failure may also be provided.

In case multiple PDU sessions related to multiple SMFs exist, the AMF does not need to wait for the response of all SMFs in Step 11. However, before transmitting the MM NAS Service Accept message to the UE, the AMF shall wait for all responses from the multiple SMFs.

In case Step 12 is triggered for the PDU Session User Plane Activation, the AMF may include at least one N2 SM information received from the SMF to the N2 Request. In case additional N2 SM information received from the SMF exists, the AMF may include the additional N2 SM information, which is received from the SMF, in a separate N2 message (e.g., N2 Tunnel Setup Request) and may transmit the message. Alternatively, in case multiple SMFs are involved, after receiving all Nsmf_PDUSession_UpdateSMContext Response service operations related to the UE, which are received from the SMFs, the AMF may transmit one N2 Request message to the (R)AN.

During the AN Release procedure, in case the NG-RAN node provides a list of recommended cells/TAs/NG-RAN node identifiers, the AMF may include the list of recommended cells/TAs/NG-RAN node identifiers in the N2 Request. When the NG-RAN determines to enable the RRC inactive state for the UE, the NG-RAN may use this information for allocating a RAN Notification Area.

The AMF that is based on the network configuration may include "RRC Inactive Assistance Information" of the UE in the N2 Request.

When possible, the AMF may include UE Radio Capability information in the N2 Request and may transmit the message to the NG-RAN node.

13) Signaling from the (R)AN to the UE: the NG-RAN may perform RRC Connection Reconfiguration with the UE. More specifically, the NG-RAN may perform RRC Connection Reconfiguration with the UE according to QoS information for all QoS flows of the PDU Session(s) having the Data Radio Bearers and UP connection activated. For the UE that was in the CM-IDLE state, in case the Service Request is not triggered by the UE only for the signaling connection, the User plane security may be established in this process step. For the UE that was in the CM-IDLE state, in case the Service Request is triggered by the UE only for the signaling connection, the AS security context may be established in this process step.

In case the N2 Request includes an NAS message, the NG-RAN may forward the NAS message to the UE. The UE locally deletes a context of the PDU session that cannot be used in the 5GC.

NOTE 2: Even if the Service Accept message is received, the user plane radio resource may not always be activated.

After the user plane radio resource is set up, the uplink data from the UE may then be forwarded to the NG-RAN. The NG-RAN may transmit uplink data to a UPF address and tunnel ID, which are provided in Step 11.

14) [Conditional operation] Signaling from the (R)AN to the AMF: the (R)AN may transmit a verification of the N2 Request. For example, the (R)AN may transmit an N2 Request Ack to the AMF. Herein, the N2 Request Ack may include N2 SM information (including AN tunnel information, a List of accepted QoS Flows for the PDU Sessions whose UP connections are activated, and a List of rejected QoS Flows for the PDU Sessions whose UP connections are activated)) and a PDU session ID.

A message including the N2 Request Ack may include N2 SM information (e.g., AN tunnel information). In case the AMF transmits a separate N2 message in Step 11, the NG-RAN may respond to the N2 SM information by using a separate N2 message.

In case multiple N2 SM messages are included in the N2 Request message of Step 12, the N2 Request message may include multiple N2 SM information and information allowing the AMF to associate a response to a related SMF.

15) [Conditional operation] Signaling from the AMF to the SMF: the AMF may transmit a Nsmf_PDUSession_UpdateSMContext Request (including N2 SM information, a RAT type, and an Access type) per PDU Session to the SMF. The AMF may determine an Access type and a RAT type based on a global RAN node ID associated to the N2 interface.

In case the AMF receives N2 SM information (one or more) in Step 14, the AMF may forward the N2 SM information to an SMF related to each PDU Session ID. In case a UE Time Zone is modified as compared to the UE Time Zone that was previously reported, the AMF may include a UE Time Zone information element (IE) in a Nsmf_PDUSession_UpdateSMContext Request.

16) [Optional operation] Signaling from the SMF to the PCF: in case dynamic PCC is distributed, the SMF may initiate notification related to a new location information to the PCF (in case of subscription) by performing an SMF triggered SM Policy modification procedure. The PCF may provide an updated policy.

17a) [Conditional operation] Signaling from the SMF to a new I-UPF: the SMF may transmit an N4 Session Modification Request to the new I-UPF. The N4 Session Modification Request may include AN tunnel information and a list of accepted QFIs.

In case the SMF selects a new SMF that is to be operated as an I-UPF for the PDU session in Step 5, the SMF may initiate the N4 Session Modification procedure for the new I-UPF and may provide AN tunnel information. Downlink data from the new I-UPF may be forwarded to the NG-RAN and the UE.

17b) [Conditional operation] Signaling from the UPF to the SMF: the UPF may transmit an N4 Session Modification Response to the SMF.

18a) [Conditional operation] Signaling from the SMF to the UPF (PSA): the SMF may transmit an N4 Session Modification Request to the UPF (PSA). The N4 Session Modification Request may include AN tunnel information and a list of rejected QoS flows.

In case a user plane is set up or modified, and in case an I-UPF does not exist after the modification, the SMF may initiate the N4 Session Modification procedure for the UPF (PSA) and may provide AN tunnel information. The downlink data from the UPF (PSA) may then be forwarded to the NG-RAN and the UE.

For the QoS flow within the list of rejected QoS flows, the SMF may indicate to the UPF to remove rules related to the corresponding QoS flow (e.g., Packet Detection Rules, and so on).

18b) [Conditional operation] Signaling from the UPF to the SMF: the UPF may transmit an N4 Session Modification Response to the SMF.

19) [Conditional operation] Signaling from the SMF to the AMF: the SMF may transmit a Nsmf_PDUSession_UpdateSMContext Response to the AMF.

20a) [Conditional operation] Signaling from the SMF to a new UPF (or I-UPF): the SMF may transmit an N4 Session Modification Request to a new UPF (or I-UPF).

In case a forwarding tunnel is established for the new I-UPF, and in case a timer set for the forwarding tunnel by the SMF in Step 8a is expired, the SMF may transmit an N4 Session Modification Request to a new UPF (or I-UPF) operating as an N3 terminating point in order to release the forwarding tunnel.

20b) [Conditional operation] Signaling from a new UPF (or I-UPF) to the SMF: a new UPF (or I-UPF) may transmit an N4 Session Modification Response to the SMF.

A new UPF (or I-UPF) operating as the N3 terminating point may transmit an N4 Session Modification Response to the SMF.

21a) [Conditional operation] Signaling from the SMF to the UPF (PSA): the SMF may transmit an N4 Session Modification Request to UPF (PSA).

In case a forwarding tunnel is established for the UPF (PSA), and in case a timer set for the forwarding tunnel by the SMF in Step 7b is expired, the SMF may transmit an N4

Session Modification Request to the UPF (PSA) operating as an N3 terminating point in order to release the forwarding tunnel.

21b) [Conditional operation] Signaling from the UPF (PSA) to the SMF: the UPF (PSA) may transmit an N4 Session Modification Response to the SMF.

The UPF (PSA) operating as an N3 terminating point may transmit an N4 Session Modification Response to the SMF.

22a) [Conditional operation] Signaling from the SMF to an old UPF: the SMF may transmit an N4 Session Modification Request or an N4 Session Release Request to the old UPF.

In case the SMF determines to continue the usage of the old UPF in Step 5, the SMF may transmit an N4 Session Modification Request and provide AN tunnel information to the old UPF.

In case the SMF selects a new UPF operating as an I-UPF in Step 5, and in case the old UPF is not a PSA UPF, after the timer is expired in Step 6b or 7b, by transmitting the N4 Session Release Request (including a Release cause) to an old I-UPF, the SMF may initiate (or trigger) the resource release.

22b) Signaling from the old I-UPF to the SMF: the old I-UPF may transmit an N4 Session Modification Response or an N4 Session Release Response to the SMF.

The old UPF verifies the modification or release of the resource through the N4 Session Modification Response or N4 Session Release Response.

An example of the UE triggered Service Request procedure is as described above in Step 1 to Step 22b.

For a mobility related event, the AMF may call a Namf_EventExposure_Notify service operation after Step 4.

If the Namf_EventExposure_Notify is received along with an indication indicating that the UE is reachable, in case the SMF has DL data that is pending, in order to establish a user plane for the PDU session, the SMF may call the Namf_Communication_N1N2MessageTransfer service operation for the AMF. In another case, for the DL data, the SMF may resume the transmission of a DL data notification for the AMF.

<Mobility Restrictions>

Mobility restrictions restrict mobility handling or service access of a UE. The mobility restriction function may be provided by the UE (only for the Mobility Restriction category provided to the UE), the Radio Access Network, and the Core Network.

The mobility restrictions are applied only to the 3GPP access and are not applied to the non-3GPP access.

When the UE is in the RRC Inactive state, the UE may execute Service Area restrictions and handling of Forbidden Areas for the CM-CONNECTED state and the CM-IDLE state based on the information received from the core network.

In the CM-CONNECTED state, the Core Network may include Mobility Restrictions in a list of Mobility Restrictions and may provide the list to the Radio Access Network.

As described below, the Mobility Restrictions include RAT Restriction, Forbidden Area, Service Area Restriction, and Core Network Type Restriction.

1) RAT Restriction:

RAT Restriction defines 3GPP Radio Access Technology(ies) (RAT(s)) that are not allowed for access of the UE within a PLMN. UE based on subscription within the restricted RAT does not allow access to a network of this PLMN. For the CM-CONNECTED state, in case the Radio Access Network determines a target RAT and a target PLMN during a handover procedure, RAT Restriction per PLMN shall be considered. The RAT Restriction is enforced in the network, and the RAT Restriction is not provided to the UE.

2) Forbidden Area

In a forbidden area, a subscription-based UE cannot initiate any communication with a network for the corresponding PLMN. In light of cell selection, RAT selection, and PLMN selection, the operations of the UE depend on a network response notifying the forbidden areas to the UE.

3) Service Area Restriction:

The Service Area Restriction defines areas in which the UE can initiate communication with the network and areas in which the UE cannot initiate communication with the network, as described below:

Allowed Area:

in an Allowed Area, the UE may initiate communication with a network according to details allowed by the subscription.

Non-Allowed Area:

in a Non-Allowed Area, service areas of the UE are restricted based on the subscription. For example, the UE and network cannot initiate a Service Request or SM signaling in order to obtain user service (in both the CM-IDLE state and the CM-CONNECTED state). The UE shall not use an entry to a non-allowed area as a reference for cell re-selection, a reference for triggering PLMN selection, or a reference for domain selection of UE originating sessions or calls.

In a Non-Allowed Area, the RRC procedure during which the UE is in the RRC Inactive state and the CM-CONNECTED state is not modified in comparison to the RRC procedure during which the UE is in the Allowed Area. An RM related procedure is not modified in comparison to a case where the UE is in the Allowed Area. The UE being in the Non-allowed area shall respond to an NAS notification message or network paging received from a non-3GPP access through a Core Service Request and a RAN paging.

NOTE 2: If a service is restricted in a 5GS due to the Service Area Restriction, it will be assumed that services in all RATs/systems using an appropriate mechanism that is available in other RATs/systems are restricted in the same location.

4) Core Network Type Restriction:

A Core Network Type Restriction defines whether or not the UE can connect to the 5GC in the corresponding PLMN.

NOTE 3: The Core Network Type Restriction may be used in a network deployment according to which the E-UTRAN connects both the EPC and the 5GC.

For a given UE, the core network may determine the above-described Mobility Restrictions 1) to 4) based on a UE location and a local policy. The Mobility Restrictions may, for example, be varied according to a UE subscription, a change in the UE location, a local policy, and so on. Optionally, the Service Area Restriction or the Non-allowed Area may be fine-tuned by the PCF. For example, the PCF may perform fine-tuning of the Service Area Restriction or the Non-allowed Area based on the UE location, a Permanent Equipment Identifier (PEI), and a network policy.

The Service Area Restriction may be updated during a Registration procedure or a UE Configuration Update procedure.

NOTE 4: In case of a Multimedia Priority Service (MPS) subscriber, the subscription restriction will not include Mobility Restrictions.

In case the network transmits a Service Area Restriction to the UE, the network transmits only one of the Allowed Area or the Non-allowed Area and does not transmit both areas simultaneously.

If the UE has received an Allowed Area from the network, a random Tracking Area (TA) that is not included in the Allowed Area is considered to be not allowed by the UE. If the UE has received a Non-allowed Area from the network, a random Tracking Area (TA) that is not included in the Non-allowed Area is considered to be allowed by the UE.

In some implementations, if the UE has not received any Service Area Restriction, then all TAs within the area considered to be allowed.

In case a Forbidden area, a Service Restriction area, and an overlaying area within the combination of such areas exist, the UE, for example, may handle (or treat) the overlaying area according to the following precedence order (or priority level):

An evaluation of the Forbidden area precedes an evaluation of the Service Restriction area. For example, in case an overlaying area exists between the Forbidden area and the Service Restriction area, the corresponding area may be evaluated as a Forbidden area.

In case the network is accessed due to regulatory prioritized services, such as Emergency services and MPS, the UE and the network shall always override the Forbidden Area, the Non-allowed Area, and the Core Network Type Restriction.

The above-described 3) Service Area Restriction will hereinafter be described in detail.

<Service Area Restriction>

Hereinafter, the Service Area Restriction will be described in detail.

1. Management of Service Area Restrictions

The Service Area Restriction may include one or more (e.g., a maximum of 16) of whole TA. Each TA may belong to an equivalent PLMN that can be used in a registered PLMN or a Registration Area. Alternatively, the Service Area Restriction may include all TAs of the registered PLMN.

Subscription data of the UE within a UDM may include Service Area Restriction. The Service Area Restriction may include Allowed Area or Non-allowed Area. For example, the Allowed Area or Non-allowed Area may be specified by using an explicit TA identity and/or other geographic information (e.g., longitude/latitude, postal code, and so on).

The geographic information that is used for specifying the Allowed Area or Non-allowed Area is managed only by the network, and before transmitting Service Area Registration information to the PCF, the NG-RAN, and the UE, the network may map the geographic information to a list of TAs.

The Allowed area may also be restricted by a maximum allowed number of tracking areas (TAs). Or, the Allowed area may alternatively be unlimitedly configured. For example, the Allowed area may include all TAs of the PLMN.

The Registration Area of the UE within the Non-allowed Area may be configured of a set of TAs belonging to the Non-allowed Area of the UE. The Registration Area of the UE within the Allowed Area may be configured of a set of TAs belonging to the Allowed Area of the UE.

During the Registration procedure, the AMF may provide Service Area Restriction in the form of TA(s) (TA(s) that may be a subset of full list stored in the subscription data of the UE) to the UE.

NOTE: Since the maximum level of granularity for the Service Area Restriction is the TA level, one or some TAs may be allocated to the subscription of a geographically restricted range (e.g., subscription to a Fixed Wireless Access (FWA)), as a result, access to a service in a wider area may be allowed.

As part of the subscription data of the UE, the UDM may store the Service Area Restriction of the UE. The PCF within a serving network may additionally adjust the Service Area Restriction of the UE (e.g., due to various conditions, such as UE location, application being used, time and date, and so on). For example, the PCF may expand the Allowed area, decrease the non-allowed area, or increase the maximum allowed number of TAs.

The UDM and the PCF may update the Service Area Restriction of the UE at all times. For a UE being in the CM-CONNECTED state, the AMF may immediately update the Service Area Restriction for the UE and the RAN. For a UE being in the CM-IDLE state, the AMF may immediately page the UE, or the AMF may store the Service Area Restriction and may then update the Service Area Restriction for the UE during a next signaling interaction with the UE.

During the Registration procedure, in case the Service Area Restriction of the UE does not exist in the AMF, the AMF may obtain the Service Area Restriction (Service Area Restriction that can be additionally controlled (or adjusted) by the PCF) of the UE from the UDM.

The serving AMF shall enforce the Service Area Restriction of the UE. Until the number of TAs reaches the maximum allowed number of tracking areas (TAs), the AMF may dynamically allocate the Service Area Restriction by adding random TAs that are not yet visited by the UE to a restricted allowed area given by the maximum allowed number of tracking areas (TAs).

If the AMF allocates a restricted allowed area to the UE, the AMF may provide the Service Area Restriction to the UE. Herein, the Service Area Restriction may be configured of an allowed area or a non-allowed area. The allowed area being included in the Service Area Restriction may be pre-configured in advance and/or may be dynamically allocated by the AMF.

For a UE being in the CM-CONNECTED state, the AMF may indicate (or mark) Service Area Restriction for this UE to the RAN by using a list of Mobility Restrictions.

If the UE stores the received Service Area Restriction, and if previously stored Service Area Restriction exists, the previously stored Service Area Restriction may be replaced with the newly received information.

In case the Service Area Restriction includes a restricted allowed area, the Service Area Restriction is applicable to the TA being indicated in the Service Area Restriction. In case the Service Area Restriction includes an unrestricted allowed area, the received Service Area Restriction is applicable to a registered PLMN or an equivalent PLMN of the registered PLMN that is available for usage in the Registration area. The RAN may use the Service Area Restriction for a target cell selection based on an Xn interface and an N2 based handover.

In case the AMF is modified according to the mobility, an old AMF may provide the Service Area Restriction (Service Area Restriction that can be additionally controlled (or adjusted) by the PCF) of the UE to a new AMF.

The network may perform paging to the UE in order to update the Service Area Restriction. For example, the network may update the Service Area Restriction by using a Generic UE Configuration Update procedure.

In case of roaming, the UDM may forward Service Area Restriction to a serving PCF within a visited network through a serving AMF. The service PCF of the visited network may additionally control (or adjust) the Service Area Restriction.

2. Example of Signaling Related to Service Area Restrictions

A Service Area Restriction is applicable only for a 3GPP access.

A Service Area Restriction may be configured of TA(s) configuring an allowed area or a non-allowed area. Herein, the TA(s) may belong to a registered PLMN or an equivalent PLMN of the registered PLMN in the Registration area.

The allowed area may include a maximum of 16 TAs, or the allowed area may include all TAs of a registered PLMN or an equivalent PLMN of a registered PLMN in a registered area. The non-allowed area may include a maximum of 16 TAs.

The network may forward the Service Area Restriction to the UE by including one of the allowed area or the non-allowed area within a Service Area List Information Element (IE) of a REGISTRATION ACCEPT message or a CONFIGURATION UPDATE COMMAND message.

In case the network does not forward the Service Area Restriction within a Service Area List IE of the Registration Accept message, the UE may consider all TAs of the registered PLMN or an equivalent PLMN of the registered PLMN in the Registration area as the allowed area and may delete the stored "allowed TA" list or stored "non-allowed TA" list.

During the Registration procedure or the Generic UE Configuration Update procedure, when the UE receives the Service Area List IE along with the allowed area indication, the UE may operate as described below:
- a) in case a "Type of list" included in the Service Area List IE does not indicate all TAI(s) belonging to all PLMN(s) within the Registration area as the allowed area, the UE may delete an old "allowed TA" list and may store the TA(s) within the allowed area as an "allowed TA" list. In case the UE has stored a "non-allowed TA" list, the UE may delete the "non-allowed TA"; or
- b) in case a "Type of list" included in the Service Area List IE indicates all TAI(s) belonging to all PLMN(s) within the Registration area as the allowed area, the UE may consider all TAs of the registered PLMN and the equivalent PLMN of this PLMN as the allowed area and may delete the stored "allowed TA" list or stored "non-allowed TA" list.

If the UE receives the Service Area List IE including a non-allowed area indication during the Registration procedure or the Generic UE Configuration Update procedure, the UE may delete an old list of "non-allowed TAs" and may store TAs included in the non-allowed area indication in the "non-allowed TA" list. In case the UE has a stored list of "allowed tracking areas (TAs)", the UE may delete this list.

In case the UE is successfully registered in the PLMN, and in case the UE has the stored list of "allowed TAs", the UE may operate as described below:
- a) while the UE camps on a cell having TAI included in the list of "allowed TAs", the UE may maintain a 5GMM-REGISTERED.NORMAL-SERVICE state or enter the 5GMM-REGISTERED.NORMAL-SERVICE state, and the UE may initiate random 5GMM and 5GSM procedures. Herein, as a subset of a 5GMM-REGISTERED state, the 5GMM-REGISTERED.NORMAL-SERVICE state is a state of a case where the cell selected by the UE corresponds to the allowed area; and
- b) while the UE camps on a cell within a registered PLMN or a cell within a PLMN of a list of equivalent PLMNs, the UE may enter a 5GMM-REGISTERED.NON-ALLOWED-SERVICE state. Herein, the 5GMM-REGISTERED.NON-ALLOWED-SERVICE state is a state of a case where the cell selected by the UE is located in the non-allowed area. The TAI of the cell on which the UE camps is included in the Registration area and is not included in the list of "allowed TAs". And, the UE may perform the following operations:
  - b-1) in case the UE is in a 5GMM-IDLE through a 3GPP access, the UE may perform the following operations:
    - b-1-i) with the exception for a case for an emergency service or a high precedence order access, the UE does not perform a Registration procedure for mobility and periodic registration update by using an uplink data status IE; and
    - b-1-ii) with the exception for a response to an emergency service, high precedence order access, or paging or notification, the UE does not initiate the Service Request procedure.
  - b-2) in case the UE is in a 5GMM-CONNECTED mode through a 3GPP access or in the 5GMM-CONNECTED mode along with an RRC inactivation indication, the UE may perform the following operations:
    - b-2-i) with the exception for a case for an emergency service or a high precedence order access, the UE does not perform a Registration procedure for mobility and periodic registration update by using an uplink data status IE; and
    - b-2-ii) with the exception for a response to an emergency service, high precedence order access, or paging or notification, the UE does not initiate the Service Request procedure; and
    - b-2-iii) with the exception for an emergency service or a high precedence order access, the UE does not initiate a 5GSM procedure.

In case the UE is successfully registered to the PLMN, and in case the UE has the stored list of "non-allowed tracking areas (TAs)", the UE may operate as described below:
- a) while the UE camps on a cell within a registered PLMN or a PLMN within a list of equivalent PLMNs, the UE may maintain a 5GMM-REGISTERED.NON-ALLOWED-SERVICE state or enter the 5GMM-REGISTERED.NON-ALLOWED-SERVICE state, and the UE may initiate a random 5GMM procedure and a random 5GSM procedure. The TAI of the cell on which the UE camps is not included in the list of "non-allowed TAs"; and
- b) in case the UE camps on a cell having TAI included in the list of "non-allowed TAs", the UE may enter a 5GMM-REGISTERED.NON-ALLOWED-SERVICE state. And, the UE may perform the following operations:
  - b-1) in case the UE is in a 5GMM-IDLE mode through a 3GPP access, the UE may perform the following operations:
    - b-1-i) with the exception for a case for an emergency service or a high precedence order access, the UE does not perform a Registration procedure for mobility and periodic registration update by using an uplink data status IE; and b-1-ii) with the exception for a response to an emergency service, high precedence order access, or paging or notification, the UE does not initiate the Service Request procedure.

b-2) in case the UE is in a 5GMM-CONNECTED mode through a 3GPP access or in the 5GMM-CONNECTED mode along with an RRC inactivation indication, the UE may perform the following operations:

b-2-i) with the exception for a case for an emergency service or a high precedence order access, the UE does not perform a Registration procedure for mobility and periodic registration update by using an uplink data status IE; and b-2-ii) with the exception for a response to an emergency service, or paging or notification through the high precedence order access or non-3GPP access, the UE does not initiate the Service Request procedure; and b-2-iii) with the exception for an emergency service or a high precedence order access, the UE does not initiate a 5GSM procedure.

The "allowed TA" list and the "non-allowed TA" list may be deleted in the following cases:

a) in case the UE is switched off; and b) in case a Universal Integrated Circuit Card (UICC) including a Universal Subscriber Identity Module (USIM) is removed.

Hereinafter, PS data off will be described in detail.

<Packet Switch (PS) Data Off>

With the vast increase in the data service usage of users, the data capacity in the mobile communication network is increasing. Accordingly, methods allowing operators to restrict unnecessary background traffic of a user equipment (UE) or allowing users to restrict unwanted usage of data (or signaling) have been discussed. As an example of such a solution, a feature referred to as "PS Data Off" may be implemented in some systems, such as in EPS and 5GS.

In some implementations, if 3GPP PS Data Off feature is activated by a user, then traffic through 3GPP access (e.g., all Internet Protocol (IP) packets, and all traffic for Unstructured and Ethernet data) is prevented, with the exception of data related to certain exempted services (e.g., 3GPP PS Data Off Exemption Services, hereinafter referred to as 'exemption services').

The exemption services, or 3GPP PS Data Off Exemption Services, are services that are allowed even if the 3GPP PS Data off feature is activated by the user. In some implementations, the 3GPP PS Data Off Exemption Services are a set of operator services. A 5GC may assist (or support) 3GPP PS Data Off operations in a non-roaming scenario mode and a roaming scenario mode.

Examples of 3GPP Data Off Exempt services are as listed below:

Multimedia Telephony (MMTel) Voice;

SMS over IP Multimedia Subsystem (IMS);

Unstructured Supplementary Services Data (USSD) over IMS (USSD simulation service in IMS (USSI));

MMTel Video;

Particular IMS services not defined by 3GPP, where each of such IMS services is identified by an IMS communication service identifier;

Device Management over PS; and

IMS Supplementary Service configuration via the Ut interface using an Extensible Markup Language (XML) Configuration Application Protocol (XCAP)

As such, in case a UE activates the PS Data Off feature, then the UE cannot perform uplink transmission (e.g., mobile originating data transmission) and downlink data reception (e.g., mobile terminated data reception), with the exception of such exemption services.

The UE may maintain information regarding a status of the PS data off feature, referred to as a PS Data Off status (e.g., "activated" or "deactivated"). The UE may include the PS Data Off status to a Protocol Configuration Option (PCO) of Attach Request, PDN Connectivity Request (per PDN (APN)), and Bearer Resource Modification Request (per PDN (APN)) messages and may notify the network. The network may notify acceptance (Accept) of PS Data Off assistance (or support) of the corresponding PDN (APN) or may reject the assistance (or support).

In some implementations, even if PS Data Off related operations are performed between the UE and the network, the transmission of uplink data and downlink data shall be possible for the exemption services defined by the operator, even while the PS Data Off is in the active state. In some scenarios, a list of such exemption services may be pre-configured by a network of the operator, and may be provided to the UE, for example through a Management Object (MO) (a NAS configuration MO or a new MO configuration) via Open Mobile Alliance Device Management (OMADM) or USIM.

As such, in some implementations, if the user activates the PS Data Off feature, then the UE cannot perform uplink data transmission to a PDN for all services, except for services that are included in the exemption services list. In some implementations, the activation or deactivation of the PS Data Off feature may be generically configured by the user.

According to some implementations, a maximum of two lists of 3GPP Data Off Exemption services for the UE may be configured, and this list may be provided to the UE by a Home PLMN (HPLMN) via Device Management or UICC provisioning. If two lists are configured for the UE, then one list is valid for a UE camping on the HPLMN, and another list is valid in a random VPLMN where a UE is roaming. In some implementations, without any indication of which PLMN this is applicable to, if only one list is configured for the UE, then this list may be valid for the home PLMN and a random PLMN in which the UE intends to roam.

In some implementations, an operator shall ensure a list of GPP Data Off Exemption services are provided to the UE and configured in the network.

During a UE Requested PDU Session Establishment procedure, the UE may include its 3GPP PS Data Off status in a PCO, and the UE may report this to an (H-)SMF.

In some implementations, the reporting of the 3GPP PS Data Off status of the UE, by the UE, during a UE Requested PDU Session Establishment procedure, may also be applied to a scenario where a handover to a 3GPP access occurs after the user activates/deactivates the 3GPP PS Data Off, while the UE is in a connected state only via non-3GPP access.

In case the 3GPP PS Data Off feature is activated, according to implementations the UE prevents uplink transmission of uplink IP packets and unstructured and Ethernet data, based on a pre-configured list of 3GPP Data Off Exemption services.

The UE may include modifications (or shifts) in the 3GPP PS Data Off status of the UE in a PCO by using the UE Triggered PDU Session Modification procedure, and the UE shall report this immediately. This may also be applied to an inter-RAT mobility scenario to the NG-RAN and a scenario wherein the 3GPP PS Data Off status is change (or shifted) while a Session management back-off timer is being operated. In case the UE moves outside of the LADN area, and in case the PDU session is still maintained in the UE, the UE shall immediately report any change (or shift) in the 3GPP PS Data Off for a PDU session.

Additional operations of the SMF for the 3GPP Data Off may be controlled by a locate configuration or policy of the PCF.

In case of a PDU session being used in an IMS service, the 3GPP Data Off Exemption services are enforced in the IMS area. If a 3GPP Data Off status of the UE is set to "activated", a policy being configured in an (H-)SMF/PCF shall be ensured so that such services can always be allowed.

As described above, in some implementations, a maximum of two lists of 3GPP Data Off Exemption services for the UE supporting (or assisting) the 3GPP PS data off may be configured. A list of the Exemption services may also be configured by an EF3GPPPSDATAOFF USIM file. Herein, EF denotes an Elementary File, and EF3GPPPSDATAOFF represents an EF associated with the 3GPP Data Off. Examples of the two list of Exemption services are as described below:
- A) a list of 3GPP PS Data Off Exemption services to be used in an HPLMN or equivalent HPLMN (EHPLMN); and
- B) a list of 3GPP PS Data Off Exemption services to be used in a VPLMN.

In some implementations, in case only the above-described described list is configured, then this list may also be used in the VPLMN.

In case the UE assists (or supports) the 3GPP PS Data Off feature, then during a UE Requested PDU Session Establishment procedure and a UE Requested PDU Session Modification procedure, the UE may provide the 3GPP PS Data Off UE status by including the status in an extended PCO IE, according to some implementations.

The UE may operate in a network that shall assist (or support) the 3GPP PS Data Off feature.

By using the UE Requested PDU Session Modification procedure, the UE may indicate a change (or shift) in the 3GPP PS data off status for a PDU session.

In case the 3GPP PS Data Off status is "activated", the UE may perform the following example operations, according to some implementations:
- 1) with the exception of the following exemptions, the UE does not transmit an uplink IP packet through a 3GPP access:
- 1-i) when the UE is within an HPLMN or EHPLMN of the UE, a service specified in a list of 3GPP PS Data Off Exemption services that are to be used in the HPLMN or EHPLMN;
- 1-ii) in case only the list of 3GPP PS Data Off Exemption services that are to be used in the HPLMN or EHPLMN is configured for the UE, when the UE is within a VPLMN of the UE, a service specified in a list of 3GPP PS Data Off Exemption services that are to be used in the HPLMN or EHPLMN;
- 1-iii) in case a list of 3GPP PS Data Off Exemption services that are to be used in the VPLMN is configured for the UE, a service specified in a list of 3GPP PS Data Off Exemption services that are to be used in the VPLMN;
- 1-iv) a service specified in the EF3GPPPSDATAOFF USIM file; and
- 1-vi) uplink traffic according to a procedure associated with an Extensible Markup Language (XML) Configuration Access Protocol (XCAP) over the Ut interface for Manipulating Supplementary Services.
- 2) the UE does not transmit any uplink Ethernet user data packet via 3GPP access; and
- 3) the UE does not transmit any uplink unstructured user data packet via 3GPP access.

In case the 3GPP PS Data Off status is not "activated", the UE may transmit uplink user data packets unrestrictedly.

The 3GPP PS Data Off feature does not limit the transmission of uplink user data packets via non-3GPP access, according to some implementations.

In some scenarios, implementations of this disclosure may provide various advantages and help address various problems that arise in related communication systems. Some examples of such advantages are described next.

As described above regarding the PS Data Off feature, if a user activates the PS Data Off feature, then the UE may not be able to perform uplink data transmission based on a PDU session associated with services, unless the service is included in the list of PS Data Off Exemption services. In some implementations, the activation or deactivation of the PS Data Off may be generically configured by the user.

In case the PS Data Off status is changed (or shifted), then in order to report the changed (or shifted) PS Data Off status to the network, in some implementations, the UE shall perform a PDU Session Modification procedure. The UE Requested PDU Session Modification procedure may enable indicating a change (or shift) in the UE's 3GPP PS Data Off status for the PDU session. If the PS Data Off status is changed (or shifted), then the UE may include the changed (or shifted) PS Data Off status in a PCO and may transmit a PDU Session Modification Request message including the PCO.

In some implementations, a pre-determined degree of special handling, such as not applying congestion control or other type of special handling, is applied to the PDU Session Modification procedure in order to report the PS Data Off status, and so on.

However, if the PS Data Off status is changed (or shifted) while being in a status where Service Area Restriction is applied to the UE (e.g., a case where the UE is located in a non-allowed area or located in an area that is not an allowed area), then a problem may occur in that the UE cannot perform a procedure of reporting the PS Data Off status. For example, in such scenarios, one or more of the problems listed below may occur.

1) In order to send a 5G Session Management (5GSM) message, a UE being in a 5G Mobility Management (5GMM)-IDLE state shall be shifted (or transitioned) to a CONNECTED state. In order to transition (or shift) the UE to the CONNECTED state, a Service Request procedure shall be performed. However, as described above, in case the UE is located in a non-allowed area or located in an area that is not an allowed area, then the UE cannot perform the Service Request procedure, with the exception of certain scenarios specified in the following example.

1-a) In case the UE is in the 5GMM-IDLE mode via 3GPP access, the UE may perform the following operations:

1-a-i) with the exception of a case for an emergency service or a high priority access, the UE does not perform a Registration procedure for mobility and periodic registration update by using an uplink data status IE; and 1-a-ii) with the exception of a response to an emergency service, high priority access, or paging or notification, the UE does not initiate a Service Request procedure.

Just as the operations of the UE described above in 1-a-ii), since the UE cannot initiate a Service Request procedure, the UE cannot be transitioned (or shifted) to the CONNECTED status. Therefore, the UE cannot transmit a 5GSM message for reporting the PS Data Off status.

Therefore, in case the user changes the PS Data Off status of the UE by activating or deactivating the PS Data Off feature, there may not be a solution for processing an NAS signaling request enabling the UE to report the change (or shift) in the PS Data Off status.

For example, while the UE is registered to the network and is provided with a service by using PDU Session #1 (in a state where the UE has not activated PS Data Off), the UE may move (or may be relocated) and enter a non-allowed area. If the UE activates the PS Data Off feature when the UE is located in a non-allowed area (e.g., if the user activates PS Data Off feature for various reasons, such as having the UE enter a WiFi-available area, or other reasons), since the UE is located in a non-allowed area, the transmission of a Service Request message may not be possible. Therefore, in such scenarios, the UE cannot be transitioned (or shifted) from the 5GMM-IDLE state to the 5GMM-CONNECTED state. Thus, since the UE cannot perform the PDU Session Modification Request procedure, the UE cannot notify the network that the PS Data Off status of the UE has been changed (or shifted) from the deactivated state to the activated state.

If the UE fails to notify the change in the UE's PS Data Off status, then even if the PS Data Off status of the UE is activated, the network still acknowledges the PS Data Off status for PDU Session #1 as being in the deactivated state. In such scenarios, the network transmits traffic corresponding not only to the PS Data Off Exemption services but also to other services, e.g., all traffic, to the UE through PDU Session #1. For example, even if a UE in the IDLE mode is located in a non-allowed area, since the corresponding UE can respond to the paging transmitted from the network, the network may also transmit such traffic to the UE. Thus, even though the UE is actually incapable of receiving data because it is located in a non-allowed area, a problem may occur in that the operator may charge the user with a fee for data usage.

2) In case the UE is located in a non-allowed area or located in an area that is not an allowed area while being in the 5GMM-CONNECTED state, 2-a) in case the UE is in the 5GMM-CONNECTED mode via 3GPP access or in the 5GMM-CONNECTED mode along with an RRC inactive indication, the UE may perform the following operations:

2-a-i) with the exception for a case for an emergency service or a high precedence order access, the UE does not perform a Registration procedure for mobility and periodic registration update by using an uplink data status IE; and 2-a-ii) with the exception for a response to an emergency service, high precedence order access, or paging or notification, the UE does not initiate the Service Request procedure; and 2-a-iii) with the exception for an emergency service or a high precedence order access, the UE does not initiate the 5GSM procedure.

Therefore, in case the UE is located in a non-allowed area or located in an area that is not an allowed area while being in the 5GMM-CONNECTED state, the UE cannot initiate the 5GSM procedure. Therefore, the PDU Session Modification Request message for reporting the change in the PS Data Off status cannot be transmitted. More specifically, even if the PS Data Off status is changed, the UE cannot report such change in the UE's PS Data Off status to the network.

As described above in the examples of the UE being in the 5GMM-IDLE state and the UE being in the 5GMM-CONNECTED state, if the PS Data Off status is changed (e.g., a change or shift from the active state to the inactive state, or a change or shift from an inactive state to the active state), then while the UE is located in a non-allowed area or located in an area that is not an allowed area, the UE cannot report the change or shift in the PS Data Off status. For systems in the related art, there may not be a solution for processing a NAS signaling request in such situations. As a result, in some scenarios, such problems may eventually lead to a waste of network resources, which may degrade user experience.

Implementations of this disclosure enable improved operations of entities within a communication system, such as a UE, a base station, a network node, and so on, for reporting the PS Data Off status, in case the PS Data Off status of the UE is changed. For example, some implementations of this disclosure enable improved operations of entities within a communication system, such as a UE, a base station, a network node, and so on, for reporting the PS Data Off status, in case a change (or shift) occurs in the PS Data Off status while the UE is located in a non-allowed area or an area that is not an allowed area.

For reference, hereinafter, the expression "the UE is located in a non-allowed area" may refer to a case where the UE is located in a non-allowed area and a case where the UE is located in an area that is not an allowed area.

I. First Implementation

In some implementations, if a UE, which is located in a non-allowed area or an allowed area, is to report the UE's PS Data Off status, then the UE may perform the operations that are described below. As an example, at this point, the UE may be in the IDLE state.

When the PS Data Off status of the UE is changed (e.g., by having the user activate or deactivate the PS Data Off feature), in case the 5GMM status or CM status of the UE is an IDLE state, even if the UE is located in a non-allowed area, the UE may transmit a Service Request message. More specifically, the UE may initiate (or trigger) a Service Request procedure.

In some scenarios, an object of the transmission of a Service Request message performed by the UE is not for requesting a user plane service, but instead for establishing a signaling connection for reporting the PS Data Off status.

If the UE enters a non-allowed area, the 5GMM status of the UE is transitioned (or shifted) to 5GMM-REGISTERED.NON-ALLOWED-SERVICE. In this case, as described above, in some systems in the related art, the UE may not be able to perform a Service Request procedure or a Registration procedure of the UE. By contrast, in some implementations of this disclosure, an exception will be applied to a case where the object of transmission is for the UE to report the PS Data Off status of the UE. For example, even if the UE is located in a non-allowed area, the procedure for the UE to report the UE's PS Data Off status may nonetheless be performed as an exception.

According to some implementations, when the UE requests a Service Request procedure, the UE may perform the request while including information indicating that the corresponding request is associated with a change in the UE's PS Data Off status. For example, the UE may perform the request while including information notifying that the purpose of the request for a Service Request procedure is for the UE to report its PS Data Off status.

The information notifying that the purpose of the request for a Service Request procedure is for PS Data Off status reporting may be explicit or may be implicit. For example, when the UE transmits a Service Request message, the information notifying that the purpose of the request for a Service Request procedure is for PS Data Off status reporting may include at least one of (i) information indicating that the corresponding message is related to a change in the PS Data Off status or (ii) information notifying that the corresponding message is a message for PS Data Off status reporting.

According to some implementations, even if the UE is located in a non-allowed area, the information notifying that the UE's request message is for PS Data Off status reporting may be used to enable the AMF, which receives this information, to process the procedure without rejecting the UE's request for the Service Request procedure. For example, although the AMF shall reject all Service Request procedures of the UE which is located in the non-allowed area, if the UE's Service Request message include information notifying that the request is for PS Data Off status reporting, then the AMF may accept the Service Request message of the UE without rejecting it.

In some implementations, in case the AMF accepts the Service Request of the UE, and in case the UE succeeds in shifting to the 5GMM-CONNECTED state in the non-allowed area, the UE may request a PDU Session Modification procedure for PS Data Off status reporting. For example, the UE may transmit a PDU Session Modification procedure Request message including information regarding the UE's PS Data Off status.

Some examples of solutions for transmitting the information notifying that the UE's request message is for PS Data Off status reporting are described in example 1 to example 3, below. The transmission of the information notifying that the UE's request message is for PS Data Off status reporting may be realized according to a combination of at least one of the first example to third example.

I-1. First Example of the First Implementation (Example of Using Service Type Information)

When the UE transmits a Service Request message to an AMF, the UE may specify the purpose of the corresponding Service Request. For example, when performing PS Data Off status reporting, the UE may transmit the Service Request message after including a new Service type information.

For example, when performing PS Data Off status reporting due to a change (or shift) in the UE's PS Data Off status, and so on, the UE may transmit Service Type information indicating that the Service Request is associated with the change in the PS Data Off status.

The Service type information may be information indicating that the Service Request is related to a change in the UE's PS Data Off status or that the Service Request is related to the UE reporting its PS Data Off status. For example, the Service type information may be information explicitly indicating that the Service request is a request for PS Data Off status reporting, such as "PS data off status report." As another example, the Service type information may be information inclusively indicating that the Service request is a request to which the service area restriction is not applied, such as "Exemption from service area restriction".

If the UE requests a Service Request procedure for such reasons, then information related to actual user plane resources (e.g., uplink data status or allowed PDU Session status, etc.) may not be included in the Service procedure Request message, which is transmitted by the UE.

Some examples of NAS message coding being transmitted to the AMF by the UE are shown below:

A service type IE is used for specifying an object of the Service Request procedure. The Service type may be a Type 1 IE. The Service type IE may be coded as shown below in the examples of Table 1 and Table 2.

TABLE 1

| 8 | 7 | 6 | 5 | 4 | 3 | 2 | 1 | |
|---|---|---|---|---|---|---|---|---|
| Service type Information Element Identifier (IEI) | | | | Service type value | | | | octet 1 |

Referring to Table 1, the Service type information may be coded by using 8 bits to octet 1. Information regarding a Service type IEI may be included from bit 8 to bit 5, and information regarding a Service type value may be included from bit 4 to bit 1. The Service type value of octet 1 may be coded as shown in the example below in Table 2.

TABLE 2

| Service type value Bits | | | | |
|---|---|---|---|---|
| 4 | 3 | 2 | 1 | |
| 0 | 0 | 0 | 0 | signaling |
| 0 | 0 | 0 | 1 | data |
| 0 | 0 | 1 | 0 | mobile terminated services |
| 0 | 0 | 1 | 1 | emergency services |
| 0 | 1 | 0 | 0 | emergency services fallback |
| 0 | 1 | 0 | 1 | high priority access |
| 0 | 1 | 1 | 0 | "PS data status report", "Exemption from service area restriction" or "elevated signaling" |
| 0 | 1 | 1 | 1 | unused; shall be interpreted as "signaling", if received by the network |
| 1 | 0 | 0 | 0 | unused; shall be interpreted as "signaling", if received by the network |
| 1 | 0 | 0 | 1 | unused; shall be interpreted as "data", if received by the network |
| 1 | 0 | 1 | 0 | unused; shall be interpreted as "data", if received by the network |
| 1 | 0 | 1 | 1 | unused; shall be interpreted as "data", if received by the network |

All other values are reserved

Referring to the example of Table 2, the Service type value of Table 1 may be coded based on a combination of 4 bits. The Service type information, which is described in the first example of the first implementation, may be coded while corresponding to part (e.g., 0110) of a bit combination of 4 bits. For example, as shown in the example of item 0110 of Table 2, if the service type value is equal to 0110, then the Service type information may be information indicating association to a change in the UE's PS Data Off status. For example, if the service type value is equal to 0110, then the Service type information denotes "PS data status report", "Exemption from service area restriction" or "elevated signaling".

In some systems of the related art, when the AMF receives a Service Request message from the UE, then overriding of the Service Area Restriction is performed only for emergency services or high precedence order (or priority level) access.

By contrast, according to some implementations of this disclosure, if an AMF is in an IDLE state, and if the AMF receives a Service Request message from a UE which is located in a non-allowed area, then the AMF may verify the Service type information of the UE's Service Request message. If the Service type information is related to a change (or shift) in the UE's PS Data Off status or is related to the UE reporting its PS Data Off status, then the AMF may override the Service Area Restriction and may establish an NAS signaling connection for a UE. Thereafter, the AMF may transmit a Service Request Accept message to the UE. The AMF may establish an NAS signaling connection for the UE so that the 5GMM (or CM) status of the UE can be transitioned (or shifted) from the IDLE state to the CONNECTED state.

If the UE receives the Service Request Accept message from the AMF, then the UE may initiate a PDU Session Request procedure for reporting the UE's PS Data Off status. For example, if the UE receives the Service Request Accept message, then after transitioning (or shifting) to the 5GMM-CONNECTED state, the UE may transmit a 5GSM PDU Session Modification Request message for reporting the UE's PS Data Off status.

I-2. Second Example of the First Implementation (Example of Using a Field of Service Request Message)

In case an inevitable update, such as PS Data Off status reporting according to a change in the UE's PS Data Off status, and so on, is needed, there may occur a scenario where the UE needs to be shifted to the CONNECTED state is order to perform an update.

In case an inevitable update is needed, this may also include a case where a management-related update having being less related to mobility management or registration management is needed. In such scenarios, if the UE request a Service Request procedure, then the UE may transmit the Service Request message which includes additional information.

For example, this additional information may be defined in a new IE format being included in the Service Request message. The new IE may be realized, for example, as (i) a field related to a PS Data Off status reporting request, (ii) a field related to Service Area Restriction Exemption, or, inclusively, (iii) a field related to additional information, and so on.

The new IE may be realized as an IE being included in a Service Request message, as shown below in the example of Table 3.

TABLE 3

| IEI | Information Element | Type | Presence | Format | Length |
|---|---|---|---|---|---|
| | Extended protocol discriminator | Extended protocol discriminator | M | V | 1 |
| | Security header type | Security header type | M | V | ½ |
| | Spare half octet | Spare half octet | M | V | ½ |
| | Service request message identity | Message type | M | V | 1 |
| | ngKSI | NAS key set identifier | M | V | ½ |
| | Service type | Service type | M | V | ½ |
| | 5G-S-TMSI | 5GS mobile identity | M | LV-E | 8 |
| | New indication (New IE) | New indication (New IE) | O | TV | 1 |
| 40 | Uplink data status | Uplink data status | O | TLV | 4-34 |
| 50 | PDU session status | PDU session status 9.11.3.44 | O | TLV | 4-34 |
| 25 | Allowed PDU session status | Allowed PDU session status 9.11.3.13 | O | TLV | 4-34 |
| 71 | NAS message container | NAS message container 9.11.3.33 | O | TLV-E | 4-n |

The examples of Table 3 may be part of SERVICE REQUEST message content. As such, Table 3 may be an example of an IE being included in a SERVICE REQUEST message. As shown in the example of Table 3, a New indication (new IE) may be defined as an IE having a length of 1 bit. For reference, in Table 3, remaining IEs excluding the New indication IE are merely examples of IEs that may be included in the SERVICE REQUEST message content, and the SERVICE REQUEST message may not necessarily include the other IEs shown in Table 3, or the SERVICE REQUEST message may include all or part of the remaining IEs.

In Table 3, "Presence" indicates whether an inclusion of an IE in the SERVICE REQUEST message is Mandatory or whether the inclusion of an IE in the SERVICE REQUEST message is Optional or Conditional. In this example, "M" represents Mandatory, and "O" represents Optional. If the Presence of an IE indicates "M," then the corresponding IE shall be mandatorily included in the SERVICE REQUEST message. By contrast, if the Presence of an IE indicates "O," then the corresponding IE may be optionally or conditionally included in the SERVICE REQUEST message. For reference, M and O of the Presence entry of Table 3 are merely examples, and so the meaning of M or O of the Presence entry shown in Table 3 may be different from the meaning indicated in the example shown in Table 3.

In Table 3, "Format" represents the format of an IE. "V" represents a Value, and if the format of an IE includes V, this indicates that the corresponding IE is included in Value information (e.g., a Value field). "L" represents a Length, and this means a length of a value field of an IE. In case the Format of an IE includes L, then this indicates that information related to the length of a value field of an IE may be included in the corresponding IE. "T" represents a Type, and this indicates that header information, such as IEI, of the IE exists. In case the Format of an IE includes T, then this indicates that header information, such as may be included in the corresponding IE. For example, in case the Format of the IE is TLV (i.e., in case T, L, and V are included), then a length of the IE may be equal to 65538 octets, by including Type information (e.g., generically 1 octet), information regarding the length of a value field (e.g., a maximum of 2 octets), and a value field (e.g., a maximum of 65535 octets).

"E" may mean Extension or Extended. In case the Format of an IE includes E, then this means that a Length value of the corresponding IE can be expressed by using 2 or more octets. For example, in case the Format of an IE does not include E, then the Length of the corresponding IE may be expressed by using 1 octet (i.e., a value field length of the corresponding IE is equal to or less than 255 octets). And, in case the Format of an IE includes E, then the Length of the corresponding IE may be expressed by using 2 octets (i.e., a value field length of the corresponding IE may be equal to or greater than 256 octets, and its greatest (or maximum) value may be equal to 65535 octets).

In Table 3, in case the Format of an IE only includes V, then the corresponding IE may include only the Value field. In case the Format of an IE is TV, then the corresponding IE may include both the Type and the Value. The Type information may not be included in the Format of a Mandatory IE. In case the Presence of an IE is M, then the Format of the IE may not include T (e.g., the Format of the IE may be V or LV(-E)). In case the Presence of an IE is O, since the type of the corresponding IE needs to be indicated, then the Format of the IE may include T. Additionally, in case the length of the IE is variable in accordance with the information included therein, then the Format of the IE may include L.

Some examples (a) to (c) of the New IE are described below in further detail.

(a) Field Related to a PS Data Off Status Reporting Request

In case of realizing the new IE as a field related to a PS Data Off status reporting request, this field may be related to PS Data status reporting. For example, the field related to PS Data status reporting may be configured of 1 bit, and this field may indicate whether or not the corresponding NAS MM Request message is a message for the PS Data status reporting.

If the bit of the field related to PS Data status reporting is set to 1, the corresponding message may be considered as being intended for PS Data Off status reporting. If the NAS MM Request message is considered as a message for PS Data Off status reporting, core network functions, such as AMF, and so on, may handle (or process) the NAS MM Request message by overriding the Service Area Restriction and may shift the UE to the 5GMM-CONNECTED state.

An example of a field related to a PS data off status report request being coded is as shown below.

TABLE 4

| 8 | 7 | 6 | 5 | 4 | 3 | 2 | 1 | |
|---|---|---|---|---|---|---|---|---|
| PS data off status IEI | | | | 0 spare | | | PSDO (PS Data Off) | octet 1 |

The example of Table 4 may be the new indication of Table 3. More specifically, a field related to the PS data off status report request may be included in a Service Request message in an IE format.

TABLE 5

| PS Data off status value (octet 1, bit 1) | |
|---|---|
| bits | |
| 0 | PS Data off status report is not requested |
| 1 | PS Data off status report is requested |

All other bits in the octet 1 are spare and shall be coded as zero.

According to the example of Table 5, the PS data off state value corresponding to the PS data off status IEI of Table 4 may be coded to a length of 1 bit. In case the PS data off state value is equal to 0, the IE may indicate that the PS data off status reporting is not requested. In case the PS data off state value is equal to 1, the IE may indicate that the PS data off status reporting is requested.

(b) Field related to Service Area Restriction Exemption

In case of realizing the new IE as a field related to Service Area Restriction Exemption, this field may be used not only for PS Data status reporting but also used for a more inclusive meaning. The field related to Service Area Restriction Exemption may be coded to 1 bit, and this field may indicate whether or not the AMF intends to apply the Service Area Restriction to the corresponding NAS MM Request.

The field related to Service Area Restriction Exemption shall be used only for a pre-determined purpose. Even if the NAS MM Request message includes this field, according to the policy of the network operator, the AMF may strictly apply the Service Area Restriction to the corresponding request.

In case the bit of the field related to Service Area Restriction Exemption is set, the corresponding Request message may be exempt from the Service Area Restriction. Accordingly, the AMF may handle (or process) the NAS MM Request message, shift the 5GMM status of the UE to the CONNECTED state, and exchange additional signaling with the UE.

An example of a field related to Service Area Restriction Exemption being coded is as shown below.

TABLE 6

| 8 | 7 | 6 | 5 | 4 | 3 | 2 | 1 | |
|---|---|---|---|---|---|---|---|---|
| Service Area Restriction Exemption IEI | | | | 0 spare | | | Service Area Restriction Exemption (SARE) | octet 1 |

The example of Table 5 may be the new indication of Table 3. More specifically, a field related to the Service Area Restriction Exemption may be included in a Service Request message in an IE format.

TABLE 7

| Service Area Restriction Exemption (SARE) (octet 1, bit 1) | |
|---|---|
| bits | |
| 0 | Message is not exempted from the service area restriction |
| 1 | Message is exempted from the service area restriction |

All other bits in the octet 1 are spare and shall be coded as zero.

According to the example of Table 7, the Service Area Restriction Exemption corresponding to the Service Area Restriction Exemption IEI of Table 6 may be coded to a length of 1 bit. In case the bit is 0, the IE may indicate that the message transmitted from the UE is not exempt from the Service Area Restriction. In case the bit is 1, the IE may indicate that the message transmitted from the UE is exempt from the Service Area Restriction.

(c) Field Related to Additional Information

In case of realizing the new IE as a field related to additional information, the IE itself may be used as a field that can indicate various information. The field related to additional information does not have a specific meaning by itself.

For the object of reporting the PS data off status, "PS Data off status report" or "Exemption from service area restriction", and so on, may be specified through a 1-bit indication within the field related to additional information. In case the 1-bit indication is set to 1, the AMF may perform a process of shifting the UE being located in the non-allowed area to the 5GMM-CONNECTED state.

An example of the related field being coded in the additional information is as shown below.

TABLE 8

| 8 | 7 | 6 | 5 | 4 | 3 | 2 | 1 | |
|---|---|---|---|---|---|---|---|---|
| Additional Service Type IEI | | | | 0 | | | Additional Service Type (e.g. Service Area Restriction Exemption) | octet 1 |

The example of Table 8 may be the new indication of Table 3. More specifically, a field related to the additional information may be included in a Service Request message in an IE format. As shown in the example of Table 8, the additional information may, for example, be defined as an Additional Service type. Referring to Table 8, in case the IEI of the IE is an Additional Service Type IEI, the corresponding IE may indicate an Additional Service Type, and, for example, this may be the SARE.

TABLE 9

| Additional Service Type (e.g. Service Area Restriction Exemption) (octet 1, bit 1) | |
|---|---|
| bits | |
| 0 | feature related to Additional Service Type is not applied (e.g. Message is not exempted from the service area restriction) |
| 1 | feature related to Additional Service Type is applied (e.g. Message is exempted from the service area restriction) |

All other bits in the octet 1 are spare and shall be coded as zero.

According to the example of Table 9, an Additional Service Type corresponding to the Additional Service Type IEI of Table 8 may be coded to a length of 1 bit.

In case the bit is 0, the IE may indicate that characteristics related to the Additional Service Type are not applied (e.g., the message transmitted by the UE is not exempt from the Service Area Restriction). In case the bit is 1, the IE may indicate that characteristics related to the Additional Service Type are applied (e.g., the message transmitted by the UE is exempt from the Service Area Restriction).

I-3. Third Example of the First Implementation (Example of Using a Session ID Bitmap)

The UE may transmit a Service Request message by including a Session ID of a PDU Session, among one or more PDU sessions, having its PS data status shifted (or changed) in a bitmap format. In case the Session ID bitmap field is included in the Service Request message, the AMF receiving the Service Request message may handle (or process) the corresponding Service Request message, even if the UE is located in the non-allowed area, and may then shift (or change) the UE to the 5GMM-CONNECTED state.

More specifically, for the PDU session corresponding to a Session ID indicated in the bitmap, the AMF may shift the UE to the CONNECTED mode. If the UE that is shifted to the CONNECTED mode transmits a PDU Session Modification Request message, the AMF that receives the transmitted PDU Session Modification Request message may handle (or process) the SM request (e.g., PDU Session Modification Request) for the PDU Session corresponding to the Session ID indicated (or marked) in the bitmap. If the AMF receives the Session ID bitmap, the Session ID that is indicated (or marked) in the bitmap may be stored.

An example of the Session ID bitmap, which includes the Session ID of the PDU Session having its PS data status shifted, may be realized as an IE being included in the Service Request message as shown in Table 10 to Table 12.

TABLE 10

| IEI | Information Element | Type | Presence | Format | Length |
|---|---|---|---|---|---|
| | Extended protocol discriminator | Extended protocol discriminator | M | V | 1 |
| | Security header type | Security header type | M | V | ½ |
| | Spare half octet | Spare half octet | M | V | ½ |
| | Service request message identity | Message type | M | V | 1 |

TABLE 10-continued

| IEI | Information Element | Type | Presence | Format | Length |
|---|---|---|---|---|---|
| | ngKSI | NAS key set identifier | M | V | ½ |
| | Service type | Service type | M | V | ½ |
| | 5G-S-TMSI | 5GS mobile identity | M | LV-E | 8 |
| | PS Data off status | PS Data off status | O | TLV | 4-34 |
| 40 | Uplink data status | Uplink data status | O | TLV | 4-34 |
| 50 | PDU session status | PDU session status 9.11.3.44 | O | TLV | 4-34 |
| 25 | Allowed PDU session status | Allowed PDU session status 9.11.3.13 | O | TLV | 4-34 |
| 71 | NAS message container | NAS message container 9.11.3.33 | O | TLV-E | 4-n |

Table 10 may be a part of the SERVICE REQUEST message content. In other words, Table 10 is an example of an IE being included in the SERVICE REQUEST message. As shown in the example of Table 10, an example of the Session ID bitmap may be defined as an IE having the length of 4~34.

Table 11 is a detailed example of the Session ID bitmap.

TABLE 11

| 8 | 7 | 6 | 5 | 4 | 3 | 2 | 1 | |
|---|---|---|---|---|---|---|---|---|
| | | | PS Data of status IEI | | | | | octet 1 |
| | | Length of PS data off status contents | | | | | | octet 2 |
| PSI (7) | PSI (6) | PSI (5) | PSI (4) | PSI (3) | PSI (2) | PSI (1) | PSI (0) | octet 3 |
| PSI (15) | PSI (14) | PSI (13) | PSI (12) | PSI (11) | PSI (10) | PSI (9) | PSI (8) | octet 4 |
| | | | Spare | | | | | octet 5~34 |

As shown in Table 11, PS Data off status ID may be indicated in octet 1, and a length of the PS data off status content may be indicated in octet 2. And, a bitmap of the PDU Session ID may be indicated in octet 3 and octet 4. PSI means a PDU Session ID. And, octet 5 to octet 34 may be spare octets. The example of Table 11 shows an example of a case where the number of PDU Sessions is equal to 16. And, according to the number of PDU sessions, octets to which the Session ID bitmap is allocated may be varied.

Table 12 is an example indicating the meanings of each PSI(x) bit within the Session ID bitmap of Table 11. Herein, in case of the example of Table 11, x may be any one of 0 to 15. PSI(x) may be coded as shown in the example of Table 12.

TABLE 12

| PSI(0) | 0 | Bit 1 of octet 3 is spare and shall be coded as zero |
| PSI(1) – PSI(15) | 0 | indicates that no PS data off status report are pending for the corresponding PDU session identity |
| | 1 | indicates that PS data off status report are pending for the corresponding PDU session identity. |

All bits in octet 5 to 34 are spare and shall be coded as zero, if the respective octet is included in the information element.

According to the example of Table 12, PSI(0), i.e., bit 1 of octet 3 is always a spare bit and may be set to 0. Herein, PSU(0) may be a PDU Session ID being associated with "PSI is not allocated". For example, in case the bit value of PSI(0) is equal to 1, this may indicate that there is no PDU Session. For example, in case not even one PDU session is established, or in case there is not PDU Session being allocated to the UE due to a specific reason (e.g., local release), and so on, the bit value of PSI(0) may be equal to 1.

For PSI(1) to PSI(15), in case the bit of PSI(x) is 0, this indicates that the PS data off status report for the corresponding PDU Session ID is not pending. If the bit of PSI(x) is 1, this may indicate that the PS data off status report for the corresponding PDU Session ID is pending.

In case the corresponding octet is included in the IE, all bits of octet 5 to octet 34 may be coded to 0.

The first implementation is described with reference to the above-described first example to third example of this specification.

According to the first implementation, when the UE is located in the Non-allowed area, or in case the UE is located in an area that is not the allowed area, in case the PS data off status for the PDU Session of the UE is changed (or shifted), the UE may transmit a Service Request message (including information associated with a change in the PS data off status (e.g., service type information associated with a change in the PS data off status)) for notifying a change in the PS data off status.

The AMF may receive a Service Request message from the UE. The AMF may determine whether the UE is located in the non-allowed area or located in an area that is not the allowed area.

If the AMF determines that the UE is located in the non-allowed area or located in an area that is not the allowed area, the AMF may verify the information included in the Service Request message. In case information (e.g., service type information associated with a change in the PS data off status) associated with a change in the PS data off status is included in the Service Request message, the AMF may accept the Service Request message and may perform the procedure for the Service Request.

Figure 11:
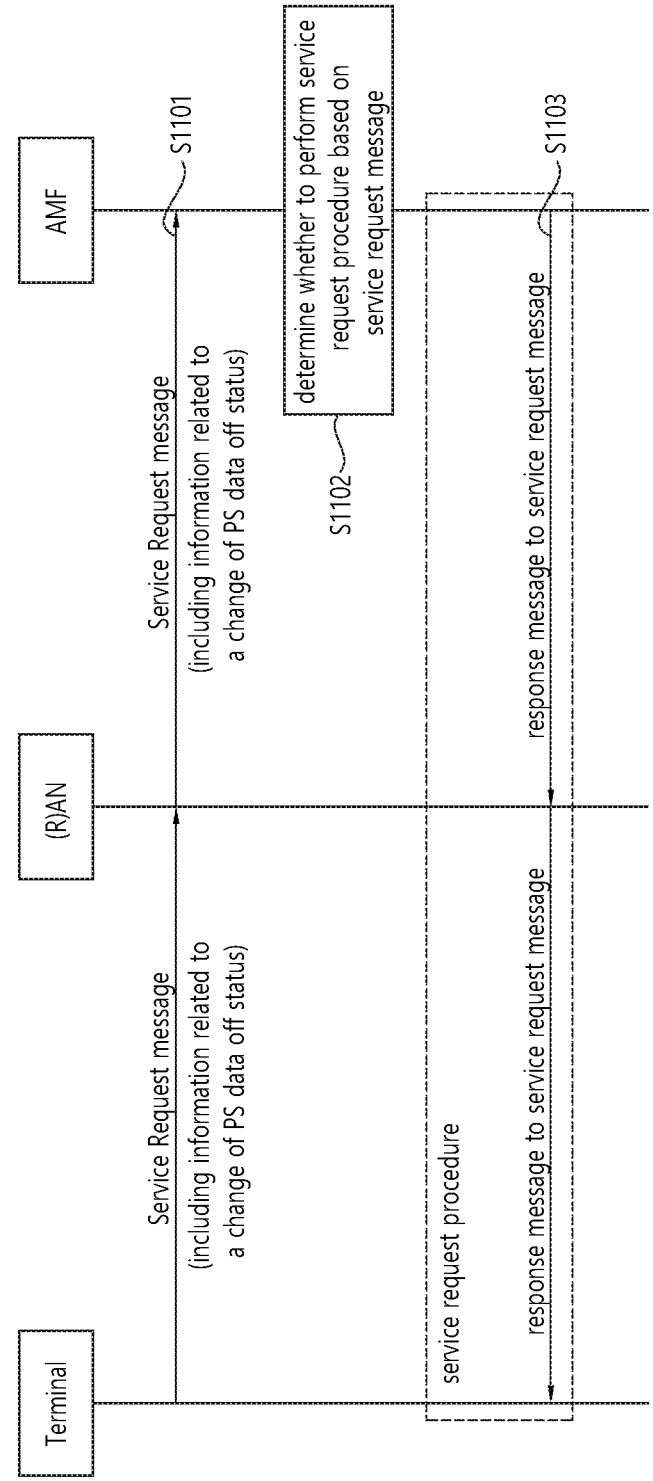
FIG. 11 is a flow chart showing an example of a procedure according to a first implementation of this disclosure.

FIG. 11 is a flow chart showing an example of a procedure according to a first implementation of this disclosure.

The procedure shown in FIG. 11 is merely an example, and, therefore, the scope of implementations in this disclosure is not limited by the example of FIG. 11. Additionally, entities, such as the UE, (R)AN, and AMF may perform operations that will be described in a second implementation, even if the operations are not shown in FIG. 11. In FIG. 11, the (R)AN may include at least one of a base station and a RAN controller being operatively connected to the base station. Herein, the base station may be a next generation NodeB (gNB) or an eNB.

In FIG. 11, it will be assumed that the UE is located in a non-allowed area. Herein, the non-allowed area may correspond to an area in which the transmission of a service request message is not allowed (not-allowed area) or an area that is not an area in which communication with the network is allowed (allowed area).

In Step (S1101), the UE may transmit a Service Request message. For example, the UE may be located in a non-allowed area or in an area that is not the allowed area, and a Service Request message may be transmitted based on a change in the PS data off status of the UE. The UE may be in the IDLE state.

Herein, the Service Request message may include information related to a change in the PS data off status.

For example, the information related to a change in the PS data off status may be service type information related to a change in the PS data off status, which is described in the first example of the first implementation.

As another example, as one of the fields within the service request message, which is described in the second example of the first implementation, the information related to the change in the PS data off status may be a field related to a PS data off status report request or a field related to service area restriction exemption.

As another example, the information related to the change in the PS data off status may be a Session ID bitmap, which is described in the third example of the first implementation. Examples of the information related to the change in the PS data off status may be an IE for notifying a change in the PS data off status.

Even though the UE is located in the non-allowed area, the information related to the change in the PS data off status (e.g., service type information related to a change in the PS data off status) may be used to allow the AMF to transmit a Service Accept message as a response message to the Service Request message.

Before performing Step (S1101) or while performing Step (S1101), based on the facts that the UE is located in the non-allowed area and that the PS data off status of the UE is changed (or shifted), a Service type information within the Service Request message may be set as the Service type information related to the change in the PS data off status.

In Step (S1102), the AMF may determine whether or not to perform a Service request procedure based on the Service Request message. In case the information related to the change in the PS data off status is included in the Service Request message, even if the UE is located in the non-allowed area or in an area that is not the allowed area, the AMF may accept the Service Request message of the UE without applying the Service Area Restriction.

For example, the AMF may determine whether the UE is to be located in the non-allowed area or in an area that is not the allowed area. If the AMF determines to locate the UE in the non-allowed area or in an area that is not the allowed area, the AMF may verify the information included in the Service Request message. In case the information related to the change in the PS data off status is included in the Service Request message, the AMF may accept the Service Request message and may perform the procedure for the Service Request.

If the AMF accepts the Service Request message, a Service Request procedure is performed. The Service Request procedure may, for example, be the Service Request procedure that is described in FIG. 10A to FIG. 10C. In FIG. 11, although the UE, the (R)AN, and the AMF are illustrated, as described in the examples of FIG. 10A to FIG. 10C, network nodes associated with the Service Request procedure (network nodes that are not shown in FIG. 11) may also perform the Service Request procedure.

In Step (S1103), the AMF may transmit a response message to the Service Request message. For example, the response message may be a Service Accept message.

If the Service Request procedure is successfully performed, the UE may transmit a PDU Session Modification Request message to the AMF. The PDU Session Modification Request message may include information regarding the change in the PS data off status. The UE may report its current PS data off status through the PDU Session Modification Request message.

II. Second Implementation

In case a need for a UE being located in a non-allowed area or an allowed area to report the PS Data Off status occurs, the UE may perform the operations that are described below. At this point, the UE may be in the IDLE state.

When the PS Data Off status of the UE is changed by having the user activate or deactivate the PS Data Off, in case the 5GMM status or CM status of the UE is an IDLE state, and in case the 5GMM status of the UE is a 5GMM-REGISTERED.NON-ALLOWED-SERVICE state, the UE may perform a Registration Request instead of a Service Request for reporting the PS Data Off status. More specifically, the UE may transmit a Registration Request message.

Since the UE is located in the non-allowed area, it is basically impossible for the UE to perform a request related to the user plane resource. Therefore, information related to the request for the user plane resource (uplink data status or allowed PDU Session status) cannot be included in the Registration Request message, which is transmitted by the UE.

Since the primary object of the Registration Request message, which is transmitted by the UE, is to transition (or shift) the 5GMM status of the UE to the 5GMM-CONNECTED state, the Registration Request message may not include unnecessary information that is irrelevant (or not related) to this object. However, in order to maintain the NAS signaling connection, the UE may transmit the Registration Request message by setting a Follow-on Request (FOR) field of a 5GS registration type IE within the Registration Request message to 1. When the UE has pending uplink signaling or uplink data, and after performing other Registration Request procedures, in case the NAS signaling connection needs to be maintained without being released, the FOR field is a field being included in the 5GS registration type IE Additionally, the UE may include information indicating that the corresponding Registration Request message is related to the change in the PS data off status in the Registration Request message and may transmit the corresponding message. For example, information indicating that the Registration Request message is being transmitted for the reporting of the PS data off status or information regarding the Service Area Restriction Exemption may be included in the Registration Request message. The information being included in the Registration Request message may be included in the Registration Request message by using a method that is similar to that of the information being included in the Service Request message of the first implementation. For example, in the first example of the first implementation, the UE transmits a Service Request message by using the Service type information, and, in the second implementation, the UE may transmit a Registration Request message by using a 5GS update type field within the Registration Request message.

Herein, the 5GS update type may be included in the Registration Request message in an IE format. The 5GS update type IE may be used by the UE for providing additional information to the network while performing the Registration procedure. The 5GS update type IE may be a type 4 IE. Table 13 and Table 14 shown below are examples of the 5GS update type IE.

TABLE 13

| 8 | 7 | 6 | 5 | 4 | 3 | 2 | 1 | |
|---|---|---|---|---|---|---|---|---|
| | | | 5GS update type IEI | | | | | octet 1 |
| | | | Length of 5GS update type | | | | | octet 2 |
| 0 | 0 | 0 | 0 | 0 | PSDO | NG- | SMS | octet 3 |
| Spare | Spare | Spare | Spare | Spare | or SARE | RAN-RCU | re-quested | |

Referring to Table 13, information indicating the relation to the change in the PS data off status may be allocated to bit 3 of octet 3 of the 5GS update type IE as PSDO or SARE having the length of 1 bit. Table 14 is a detailed example of the information being allocated to octet 3 of Table 13.

TABLE 14

| | | |
|---|---|---|
| SMS over NAS transport requested (SMS requested) (octet 3, bit 1) | 0 | SMS over NAS not supported |
| | 1 | SMS over NAS supported |
| NG-RAN Radio Capability Update (NG-RAN-RCU) (octet 3, bit 2) | 0 | NG-RAN radio capability update not needed |
| | 1 | NG-RAN radio capability update needed |
| option 1: PS Data off status report (PSDO) (octet 3, bit 3) | 0 | PS Data off status report is not requested |
| | 1 | PS Data off status report is requested |
| option 2: Service Area Restriction Exemption (SARE) (octet 3, bit 3) | 0 | Message is not exempted from the service area restriction |
| | 1 | Message is exempted from the service area restriction |

Bits 4 to 8 of octet 3 are spare and shall be coded as zero.

According to the example of Table 14, in case PSDO is included in the 5GS update type IE, and in case the corresponding bit is 0, the IE may indicate that the PS data off status report is not requested. In case the corresponding bit is 1, the IE may indicate that the PS data off status report is requested.

In case SARE is included in the 5GS update type IE, and in case the corresponding bit is 0, the IE may indicate that the message transmitted by the UE is not exempt from the Service Area Restriction. In case the corresponding bit is 1, the IE may indicate that the message transmitted by the UE is exempt from the Service Area Restriction.

The AMF may handle (or process) the Registration Request message of the UE by using a method that is similar to the method for handling (or processing) the Service Request message of the UE, which is located in the non-allowed area, by the AMF in the first implementation. For example, in case information indicating that the Registration Request message is related to the change in the PS data off status is included in the corresponding Registration Request message, or based on another condition, if it is determined that the Registration Request message of the UE is a request being irrelevant to the Service Request, the UE may perform the Registration procedure even though the UE is located in the non-allowed area. Additionally, in case the UE transmits the Registration Request message by setting a Follow-on Request to 1, even after transmitting the Registration Accept message to the UE, the AMF may not release the NAS signaling connection with the UE.

Figure 12:
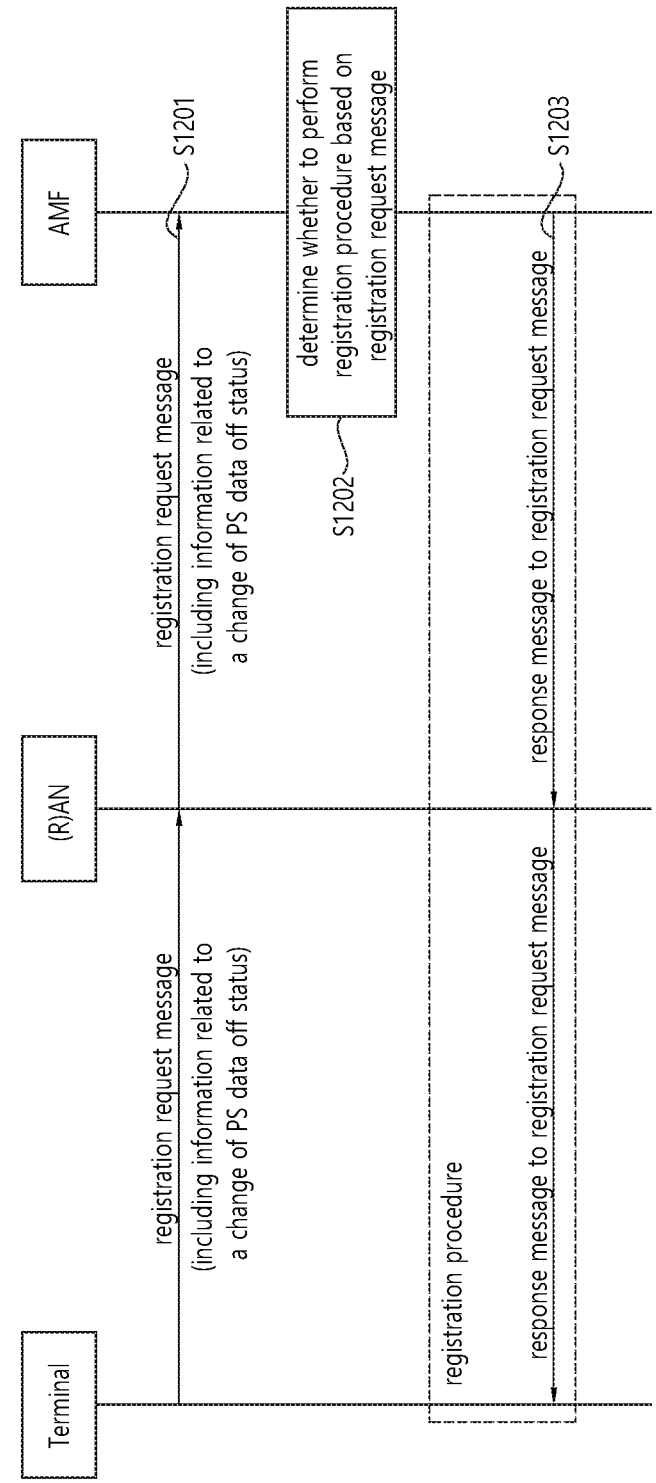
FIG. 12 is a flow chart showing an example of a procedure according to a second implementation of this disclosure.

FIG. 12 is a flow chart showing an example of a procedure according to a second implementation of this disclosure.

The procedure shown in FIG. 12 is merely an example, and, therefore, the scope of implementations in this disclosure will not be limited by FIG. 12.

Additionally, entities, such as the UE, (R)AN, and AMF may perform operations that will be described in a second implementation, even if the operations are not shown in FIG. 12. In FIG. 12, the (R)AN may include at least one of a base station and a RAN controller being operatively connected to the base station. Herein, the base station may be a next generation NodeB (gNB) or an eNB.

In FIG. 12, it will be assumed that the UE is located in a non-allowed area or an area that is not an allowed area. Herein, the non-allowed area may correspond to an area in which the transmission of a service request message or registration request message is not allowed (not-allowed area) or an area that is not an area in which communication with the network is allowed (allowed area).

In Step (S1201), the UE may transmit a Registration Request message. For example, the UE may be located in a non-allowed area or in an area that is not the allowed area, and the UE may transmit a Registration Request message based on a change in the PS data off status of the UE. The UE may be in the IDLE state. And, the UE may be in a 5GMM-REGISTERED.NON-ALLOWED-SERVICE state.

Information related to the user plane resource (uplink data status or allowed PDU Session status) may not be included in the Registration Request message, which is transmitted by the UE. In order to maintain the NAS signaling connection, the UE may transmit the Registration Request message by setting a FOR field of a 5GS registration type IE within the Registration Request message to 1.

Herein, the Registration Request message may include information related to a change in the PS data off status.

For example, the information related to the change in the PS data off status may be information indicating that the Registration Request message is being transmitted for the reporting of the PS data off status or information regarding the Service Area Restriction Exemption. For example, the information related to the change in the PS data off status may be transmitted in a 5GS update type field format.

In Step (S1202), the AMF may determine whether or not to perform a Registration Request procedure based on the Registration Request message. In case the information related to the change in the PS data off status is included in the Registration Request message, even if the UE is located in the non-allowed area or in an area that is not the allowed area, the AMF may accept the Registration Request message of the UE without applying the Service Area Restriction.

For example, the AMF may determine whether the UE is to be located in the non-allowed area or in an area that is not the allowed area. If the AMF determines to locate the UE in the non-allowed area or in an area that is not the allowed area, the AMF may verify the information included in the Registration Request message. In case the information related to the change in the PS data off status is included in the Registration Request message, the AMF may accept the Registration Request message and may perform the procedure for the Registration.

If the AMF accepts the Registration Request message, a Registration procedure is performed. The Registration procedure may, for example, be the Registration procedure that is described in FIG. 6A and FIG. 6B. In FIG. 12, although the UE, the (R)AN, and the AMF are illustrated, as described in the examples of FIG. 6A and FIG. 6B, network nodes associated with the Service Request procedure (network nodes that are not shown in FIG. 12) may also perform the Registration procedure.

In Step (S1203), the AMF may transmit a response message to the Registration Request message. For example, the response message may be a Registration Accept message.

If the Registration procedure is successfully performed, the UE may transmit a PDU Session Modification Request message to the AMF. The PDU Session Modification Request message may include information regarding the change in the PS data off status. The UE may report its current PS data off status through the PDU Session Modification Request message.

III. Third Implementation

The third implementation describes a solution for resolving the problem of the UE of being incapable of sending a PDU session request message while being in the CONNECTED state, in case the UE is located in the non-allowed area.

In the third implementation, it will be assumed that the UE is located in the non-allowed area and that the UE is in the CONNECTED state.

According to at least one example of the above-described first implementation and second implementation, in case the UE being located in the non-allowed area is shifted to the 5GMM-CONNECTED state, or in case the UE being located in the non-allowed area is already in the 5GMM-CONNECTED state, in case the PS data off status of the UE is changed (a change (or shift) from the active state to the inactive state, or a change (or shift) from an inactive state to the active state), the UE may operate as described below.

In case the PS data off status of the UE is changed, in order to report the PS data off status, the UE may transmit a PDU session modification request message. Even in case the UE is located in the non-allowed area, the UE may transmit the PDU session modification request message. The UE may piggyback the corresponding SM message (e.g., PDU session modification request message) to an UPLINK NAS TRANSPORT message and may transmit the processed message to the AMF. At this point, the UE may include information indicating that the corresponding SM message (e.g., PDU session modification request message) is associated with the PS data off status within the UPLINK NAS TRANSPORT message.

Once the AMF receives the information indicating that the SM message is associated with the PS data off status, even if the UE is located within the non-allowed area, the AMF may handle this message. The AMF may forward the SM message transmitted from the UE to the SMF.

At this point, by using the same method as the above-described first implementation or second implementation, the UE may transmit information indicating that the SM message is associated with the PS data off status by using an old IE field or by using a new IE field.

In case the third implementation is applied along with the solution of using a bitmap as described in the third example of the first implementation or the second implementation, the AMF may shift the UE to the CONNECTED mode based on the Session ID bitmap included in the service request message or based on the 5GS update type IE within the registration request message. In this case, instead of using the information indicating that the SM message is associated with the PS data off status, which is included in the NAS transport message, the AMF may also determine whether or not to forward the SM message (e.g., PDU session modification request message) transmitted from the UE based on the previously received (old) Session ID bitmap or the 5GS update type IE.

For example, the AMF may obtain PDU session ID information requiring a PS data off status report based on the Session ID bitmap included in the service request message or based on the 5GS update type IE included in the registration request message. Thereafter, in case the UE transmits SM messages for multiple PDU sessions while being in the CONNECTED state, the AMF may transmit only the SM message for the PDU session corresponding to the obtained PDU Session ID information and may reject the SM messages for the other PDU sessions.

Figure 13:
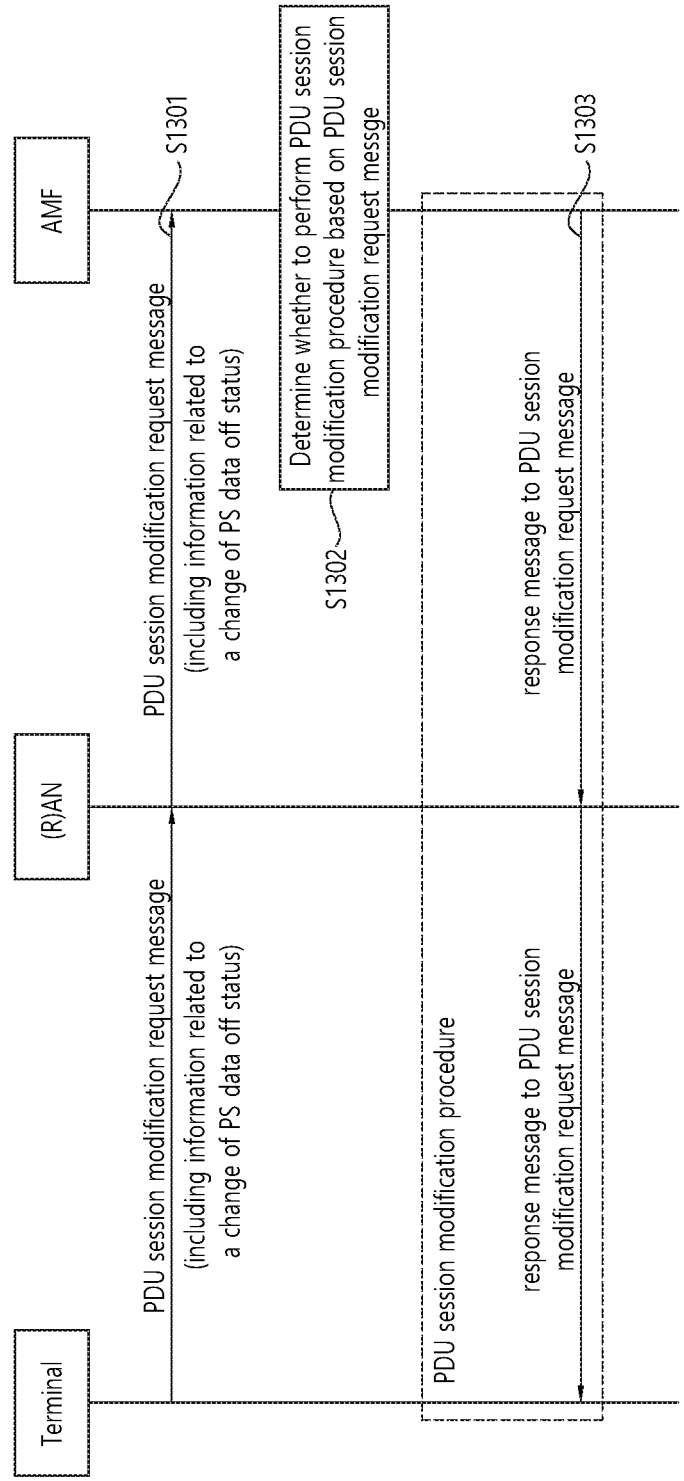
FIG. 13 is a flow chart showing an example of a procedure according to a third implementation of this disclosure.

FIG. 13 is a flow chart showing an example of a procedure according to a third implementation of this disclosure.

The procedure shown in FIG. 13 is merely an example, and, therefore, the scope of this disclosure is not limited by FIG. 13. Additionally, entities, such as the UE, (R)AN, and AMF may perform operations that will be described in a second implementation, even if the operations are not shown in FIG. 13. In FIG. 13, the (R)AN may include at least one of a base station and a RAN controller being operatively connected to the base station. Herein, the base station may be a next generation NodeB (gNB) or an eNB.

In FIG. 13, it will be assumed that the UE is located in a non-allowed area or an area that is not an allowed area. Herein, the non-allowed area may correspond to an area in which the transmission of an SM message is not allowed (not-allowed area) or an area that is not an area in which communication with the network is allowed (allowed area).

In step (S1301), the UE may transmit a PDU session modification request message. The UE may transmit a PDU session modification request message in order to report the PS data off status. For example, the UE may transmit a PDU session modification request message based on information that the UE is located in the non-allowed area or an area that is not the allowed area and that the PS data off status of the UE is changed. At this point, the UE may be in the CONNECTED state. For example, according to the solution described in at least one of the first implementation and the second implementation, the UE being located in the non-allowed area may be shifted to the CONNECTED state. Alternatively, the UE being located in the non-allowed area may already be in the CONNECTED state.

The UE may piggyback the corresponding SM message (e.g., PDU session modification request message) to an UPLINK NAS TRANSPORT message and may transmit the processed message to the AMF. At this point, the UE may include information indicating that the corresponding SM message (e.g., PDU session modification request message) is associated with the PS data off status within the UPLINK NAS TRANSPORT message.

At this point, by using the same method as the above-described first implementation or second implementation, the UE may transmit information indicating that the SM message is associated with the PS data off status by using an old IE field or by using a new IE field.

In Step (S1302), the AMF may determine whether or not to perform a PDU Session Modification Request procedure based on the PDU Session Modification Request message. In case the information related to the change in the PS data off status is included in the PDU Session Modification Request message, even if the UE is located in the non-allowed area or in an area that is not the allowed area, the AMF may accept the PDU Session Modification Request message of the UE without applying the Service Area Restriction.

For example, in case the third implementation is applied along with the solution of using a bitmap as described in the third example of the first implementation or the second implementation, before performing step (S1301), the AMF may shift the UE to the CONNECTED mode based on the Session ID bitmap included in the service request message or based on the 5GS update type IE within the registration request message. In this case, in step (S1302), instead of using the information indicating that the SM message is associated with the PS data off status, which is included in the NAS transport message, the AMF may also determine whether or not to forward the SM message (e.g., PDU session modification request message) transmitted from the UE based on the previously received (old) Session ID bitmap or the 5GS update type IE.

If the AMF accepts the PDU Session Modification Request message, a PDU Session Modification procedure is performed. The PDU Session Modification procedure may, for example, be the PDU Session Modification procedure that is described in FIG. 9A and FIG. 9B. In FIG. 13, although the UE, the (R)AN, and the AMF are illustrated, as described in the examples of FIG. 9A and FIG. 9B, network nodes associated with the PDU Session Modification procedure (network nodes that are not shown in FIG. 13) may also perform the PDU Session Modification procedure.

In Step (S1303), the AMF may transmit a response message to the PDU Session Modification Request message. For example, the response message may be a PDU Session Modification Accept message.

IV. Fourth Implementation: A Combination of at Least One of the First Implementation to the Third Implementation At least one of the above-described content of the first implementation, content of the second implementation, and content of the third implementation may be combined.

The above-described first implementation to the fourth implementation are described based on the operation, performed by the UE, of reporting the PS data off status, in a case where the PS data off status of the UE located in the non-allowed area is changed. The description of the first implementation to the fourth implementation may be inclusively applied to a case where the UE, which is a situation of being forbidden to perform any service request or operation related to a service (e.g., SM message transmission, and so on) (i.e., a situation where the performance of such operations is not allowed), is required to report the PS Data off status to the network.

V. Examples of Usage of Implementations of this Disclosure.

An example in which implementations of this disclosure can be applied will be described below.

<Generic Device to which Implementations of this Disclosure can be Applied>

Hereinafter, a device to which the implementations of this disclosure can be applied will be described in detail.

Figure 14:
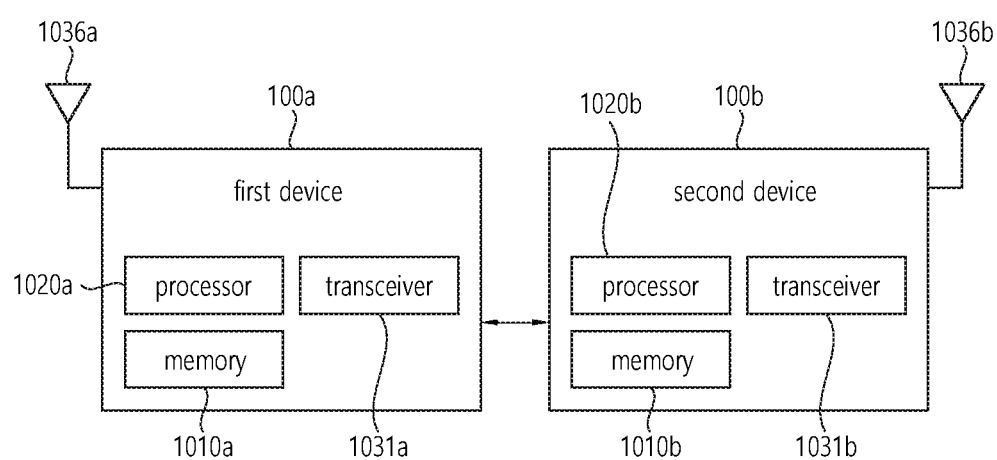
FIG. 14 is a diagram illustrating an example of a wireless communication device according to some implementations of this disclosure.

FIG. 14 is a wireless communication device according to implementations of this disclosure.

Referring to FIG. 14, a wireless communication system may include a first device 100*a* and a second device 100*b*.

The first device 100*a* may be a user equipment (e.g., UE) that is described in implementations of this disclosure. Additionally, the first device 100*a* may be a base station, a network node, a transmitting terminal, a receiving terminal, a wireless device, a wireless communication device, a vehicle, a vehicle equipped with an autonomous driving function, a connected car, a unmanned aerial vehicle (UAV), an Artificial Intelligence (AI) module, a robot, an Augmented Reality (AR) device, a Virtual Reality (VR) device, a Mixed Reality (MR) device, a hologram device, a public safety device, an Machine Type Communication (MTC) device, an Internet of Things (IoT) device, a medical device, a pin-tec device (or financial device), a security device, a climate/environmental device, devices related to 5G services, or other devices related to fourth industrial revolution fields.

The second device 100*b* may be a network node (e.g., AMF) that is described in implementations of this disclosure. Additionally, the second device 100*b* may be a base station, a network node, a transmitting terminal, a receiving terminal, a wireless device, a wireless communication device, a vehicle, a vehicle equipped with an autonomous driving function, a connected car, a unmanned aerial vehicle, UAV), an Artificial Intelligence (AI) module, a robot, an Augmented Reality (AR) device, a Virtual Reality (VR) device, a Mixed Reality (MR) device, a hologram device, a public safety device, an Machine Type Communication (MTC) device, an Internet of Things (IoT) device, a medical device, a pin-tec device (or financial device), a security device, a climate/environmental device, devices related to 5G services, or other devices related to fourth industrial revolution fields.

For example, the terminal may include a cellular phone, a smart phone, a laptop computer, a digital broadcasting terminal, a personal digital assistants (PDA), a portable multimedia player (PMP), a navigation, a slate PC, a tablet PC, an ultrabook, a wearable device such as a smartwatch, a smart glass, or a head mounted display (HMD)), etc. For example, the HMD may be a display device worn on a head. For example, an HMD may be used to implement the VR, AR, or MR.

For example, the UAV may be a flying object that is not ridden by people but that flies by radio control signals. For example, the VR device may include a device that implements an object or background in a virtual world. For example, the AR device may include a device that connects and implements the object or background in the real world to the object or background in a real world. For example, the MR device may include a device that fuses and implements the object or background in the virtual world with the object or background in the real world. For example, the hologram device may include a device for implementing a 360-degree stereoscopic image by recording and reproducing stereoscopic information by utilizing a phenomenon of interference of light generated by the two laser lights meeting with each other, called holography. For example, the public safety device may include a video relay device or a video device that may be worn by a body of a user. For example, the MTC device and the IoT device may be a device which does not require direct human intervention or manipulation. For example, the MTC device and the IoT device may include a smart meter, a vending machine, a thermometer, a smart bulb, a door lock, or various sensors. For example, the medical device may be a device used for diagnosing, treating, alleviating, treating, or preventing a disease. For example, the medical device may be a device used for diagnosing, treating, alleviating, or correcting an injury or disability. For example, the medical device may be a device used for inspecting, replacing, or modifying a structure or function. For example, the medical device may be a device used for controlling pregnancy. For example, the medical device may include a medical treatment device, a surgical device, an (in vitro) diagnostic device, a hearing aid or a (medical) procedure device, and the like. For example, the security device may be a device installed to prevent a risk that may occur and to maintain safety. For example, the security device may be a camera, a CCTV, a recorder, or a black box. For example, the pin-tec device may be a device capable of providing financial services such as mobile payment. For example, the pin-tec device may include a payment device or a point of sales (POS). For example, the climate/environmental device may include a device for monitoring or predicting a climate/environment.

The first device 100a may include at least one processor, such as a processor 1020a, at least one memory, such as a memory 1010a, and at least one transceiver, such as a transceiver 1031a. The processor 1020a may perform the functions, procedures, and/or methods described above. The processor 1020a may perform one or more protocols. The processor 1020a may perform one or more layers of a radio interface protocol. The memory 1010a may be connected to the processor 1020a and store various types of information and/or commands. The transceiver 1031a may be connected to the processor 1020a and controlled to transmit/receive a radio signal.

The second device 100b may include at least one processor, such as a processor 1020b, at least one memory, such as a memory 1010b, and at least one transceiver, such as a transceiver 1031b. The processor 1020b may perform the functions, procedures, and/or methods described above. The processor 1020b may implement one or more protocols. For example, the processor 1020b may implement one or more layers of the radio interface protocol. The memory 1010b may be connected to the processor 1020b and store various types of information and/or commands. The transceiver 1031b may be connected to the processor 1020b and controlled to transmit/receive a radio signal.

The memory 1010a and/or the memory 1010b may be each connected inside or outside the processor 1020a and/or the processor 1020b and connected to other processors through various techniques such as wired or wireless connection.

The first device 100a and/or the second device 100b may have one or more antennas. For example, an antenna 1036a and/or an antenna 1036b may be configured to transmit and receive the radio signal.

Figure 15:
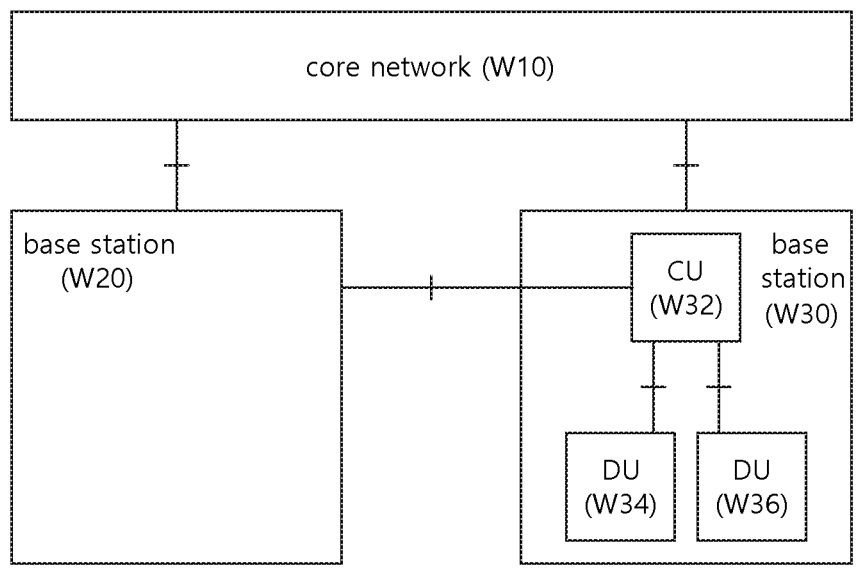
FIG. 15 is a block diagram illustrating an example of a network node according to an implementation of the present disclosure.

FIG. 15 is a block structural diagram of a network node according to an implementation of the present disclosure.

Most particularly, in FIG. 15, in case the base station is divided into a central unit (CU) and a distributed unit (DU), this drawing shows a more detailed example of a network node.

Referring to FIG. 15, the base station W20 and W30 may be connected to a core network W10, and the base station W30 may be connected to a neighboring base station. For example, an interface between the base station W20 and W30 and the core network W10 may be referred to as NG, and an interface between the base station W30 and the neighboring base station W20 may be referred to as Xn.

The base station W30 may be divided into a CU W32 and a DU W34 and W36. More specifically, the base station W30 may be hierarchically divided and operated. The CU W32 may be connected to one or more DUs W34 and W36, and, for example, an interface between the CU W32 and the DU(s) W34 and W36 may be referred to as F1. The CU W32 may perform the function of a higher layer (higher layers), and the DU(s) W34 and W36 may perform the function of a lower layer (lower layers). For example, the CU W32 may be a logical node hosting Radio Resource Control (RRC), service data adaptation protocol (SDAP) and packet data convergence protocol (PDCP) layers of the base station (e.g., gNB), and the DU(s) W34 and W36 may be a logical node hosting radio link control (RLC), media access control (MAC) and physical (PHY) layers of the base station. Alternatively, the CU W32 may be a logical node hosting RRC and PDCP layers of the base station (e.g., en-gNB).

Operations of the DU(s) W34 and W36 may be partially controlled by the CU W32. One DU W34 and W36 may support one or more cells. One cell may be supported by only one DU W34 and W36. DU W34 and W36 may be connected to one CU W32, and, according to an appropriate realization, one DU W34 and W36 may also be connected to multiple CUs.

Figure 16:
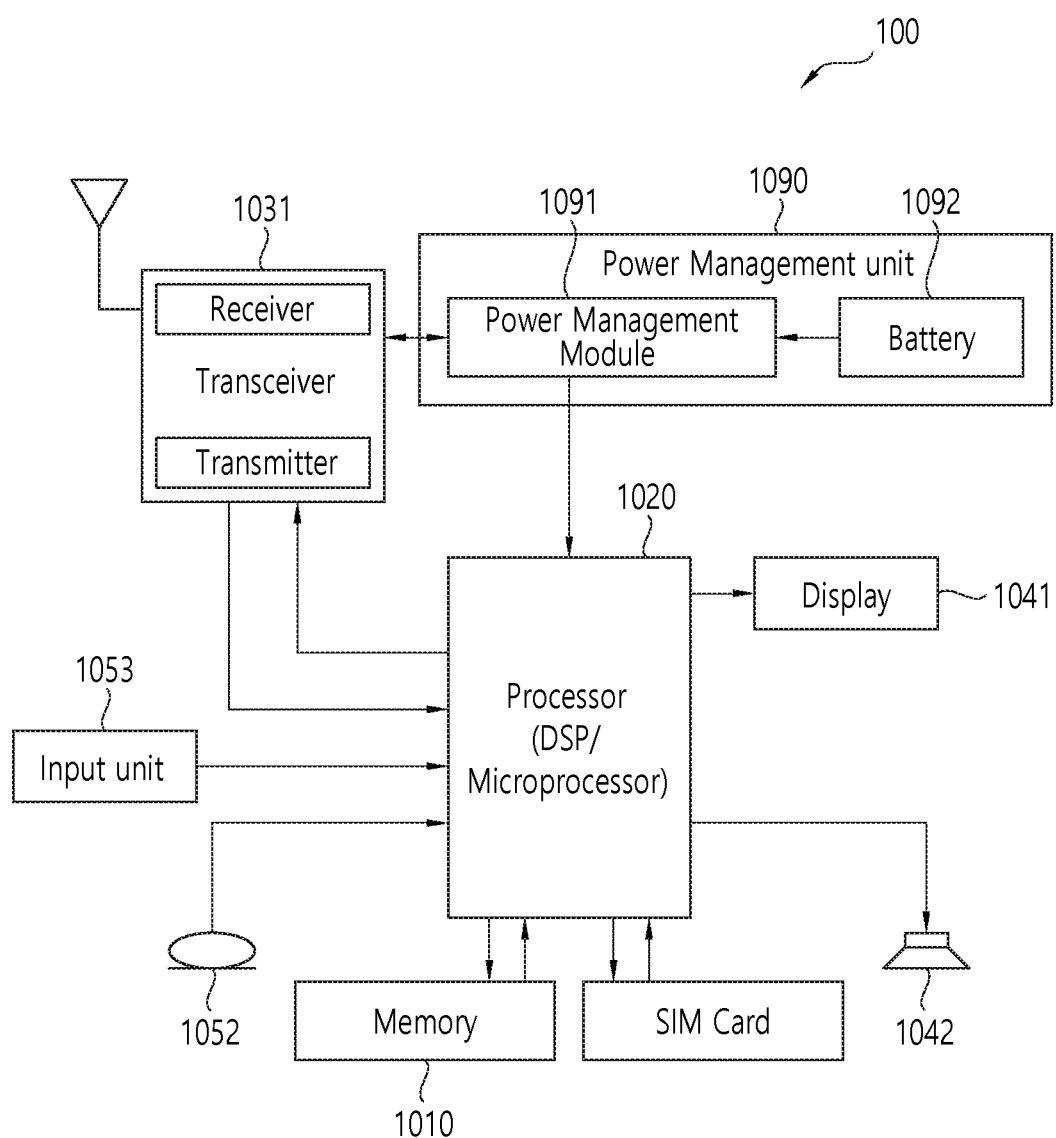
FIG. 16 is a block diagram showing an example of a structure of a user equipment (UE) according to an implementation of the present disclosure.

FIG. 16 is a block diagram showing a structure of a user equipment (UE) according to an implementation of the present disclosure.

A UE includes a memory 1010, a processor 1020, a transceiver 1031, a power management module 1091, a battery 1092, a display 1041, an input unit 1053, a speaker 1042 and a microphone 1052, a subscriber identification module (SIM) cared, and one or more antennas.

The processor 1020 may be configured to realize the proposed functions, procedures, and/or methods described in this specification. Layers of a radio interface protocol may be realized in the processor 1020. The processor 1020 may include an application-specific integrated circuit (ASIC), another chipset, a logical circuit, and/or a data processing device. The processor 1020 may include at least one of a digital signal processor (DSP), a central processing unit (CPU), a graphics processing unit (GPU), and a modulator and demodulator (Modem). Examples of the processor 1020 may include a SNAPDRAGON™ series processor manufactured by Qualcomm®, an EXYNOS™ series processor manufactured by Samsung®, an A series processor manufactured by Apple®, a HELIO™ series processor manufactured by MediaTek®, an ATOM™ series processor manufactured by INTEL® or other corresponding next-generation processors.

The power management module 1091 manages the power of the processor 1020 and/or the transceiver 1031. The battery 1092 supplies power to the power management module 1091. The display 1041 outputs results processed by the processor 1020. The input unit 1053 receives inputs that are to be used by the processor 1020. The input unit 1053 may be displayed on the display 1041. The SIM card is an international mobile subscriber identity (IMSI) being used for identifying and authenticating a subscriber in a mobile telephony device, such as a mobile phone or a portable computer, and an integrated circuit being used for safely storing a key related to the IMSI. Contact information may be stored in numerous SIM cards.

The memory 1010 is operatively coupled to the processor 1020 and stores various information for operating the processor 1020. The memory 1010 may include a read-only memory (ROM), a random access memory (RAM), a flash memory, a memory card, a storage medium and/or other storage devices. In case the implementations are realized by software, in this specification, the above-described methods may be realized by a module (a process, a function, and so on) that perform the above-described functions. The module may be stored in the memory 1010 and executed by the processor 1020. The memory 1010 may be provided inside the processor 1020, or the memory 1010 may be provided outside the processor 1020. And, the memory 1010 may be connected to the processor 1020 through various known techniques disclosed in the technical field so as to perform communication.

The transceiver 1031 is operatively coupled to the processor 1020 and transmits and/or receives radio signals. The transceiver 1031 includes a transmitter and a receiver. The transceiver 1031 may include a baseband circuit for processing radio frequency signals. The transceiver 1031 controls one or more antennas so as to transmit and/or receive radio signals. In order to initiate communication, the processor 1020 forwards command information to the transceiver 1031 so that radio signals configuring, for example, audio communication data can be transmitted. The antennas perform the function of transmitting and receiving radio signals. When receiving a radio signal, the transceiver 1031 forwards the signal to the processor 1020, so that the processor 1020 can process the received signal, and may convert the signal to a baseband signal. The processed signal may be converted to audible or readable information being outputted through the speaker 1042.

The speaker 1042 outputs results related to the sound being processed by the processor 1020. The microphone 1052 receives an input related to the sound that is to be used by the processor 1020.

The user, for example, input command information, such as a telephone number, and so on, by pressing (or touching) buttons on the input unit 1053 or by performing audio operation (voice activation) using the microphone 1052. The processor 1020 receives such command information and processes the information so that adequate functions, such as making a phone call by dialing the telephone number, and so on, can be performed. Operational data may be extracted from the SIM card or the memory 1010. Additionally, the processor 1020 may display the command information or operation information on the display 1041 for the recognition and convenience of the user.

VI. Scenario to which Implementations of this Disclosure is to be Applied

Hereinafter, a scenario to which the above-described disclosures of this specification are to be applied will be described.

In this specification, an always-on PDU session for URLLC having the characteristic of low latency may be used for artificial intelligence, robot, self-driving, extended reality, and so on, in the 5G scenario, which is described below.

<5G Usage Scenario>

Figure 17:
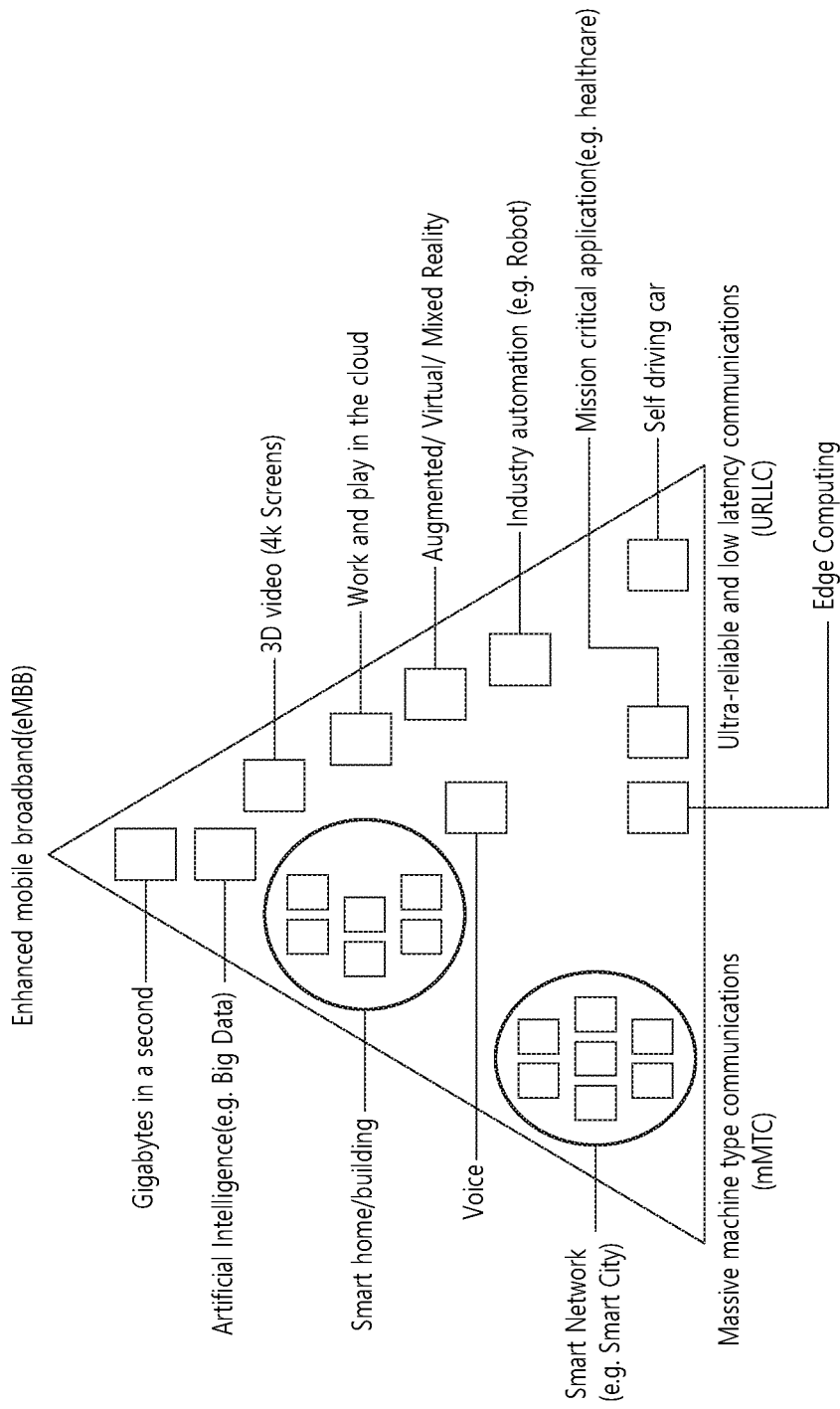
FIG. 17 is a diagram showing examples of 5G usage scenarios.

FIG. 17 shows examples of 5G usage scenarios.

FIG. 17 shows examples of 5G usage scenarios to which the technical features of the present disclosure can be applied. The 5G usage scenarios shown in FIG. 17 are only exemplary, and the technical features of the present disclosure can be applied to other 5G usage scenarios which are not shown in FIG. 17.

Referring to FIG. 17, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 17 will be described in more detail.

5G can complement fiber-to-the-home (FTTH) and cable-based broadband (or DOCSIS) for delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

<Artificial Intelligence (AI)>

Artificial intelligence refers to a field for researching artificial intelligence and a methodology for creating such intelligence, and Machine Learning refers to a field researching a methodology for defining various problems being handled in the field of artificial intelligence and for resolving such problems. Machine Learning is also defined as an algorithm for enhancing the capability of a particular operation through extensive experience related to the operation.

An Artificial Neural Network (ANN) is a model being used in Machine Learning, which is configured of artificial neurons (nodes) forming a network by a combination of synapses, and may refer to an overall model having problem-solving capabilities. The ANN may be defined by a connection pattern between neurons of other layers, a learning process renewing model parameters, an activation function generating output values, and so on.

<Robot>

A robot may refer to a machine that can automatically handle a given task or that can be automatically operated by an ability given to the machine itself. Most particularly, a robot having a function of acknowledging its surrounding environment and performing operations based on its own judgement may be referred to as an intelligent robot.

A robot may be categorized as an industrial robot, a medical robot, a home robot, a military robot, and so on, depending upon its purpose or field of usage.

A robot is equipped with a driving unit including an actuator or a motor and may perform various physical operations, such as moving robotic joints. Additionally, a movable robot includes wheels, brakes, propellers, and so on, in its driving unit, thereby being capable of driving on land or flying in the air using its driving unit.

<Self-Driving (Autonomous-Driving)>

Self-driving refers to a technology enabling an entity to drive on its own. A self-driving vehicle refers to a vehicle that can perform driving without any user manipulation or by using minimum user manipulation.

For example, self-driving may include all of a technology for maintaining traffic lanes while driving, a technology automatically controlling speed, such as adaptive cruise control, a technology for performing automatic driving along a given path, a technology for automatically setting a driving path and performing driving after inputting destination settings, and so on.

A vehicle may include a vehicle being equipped with only an internal combustion engine, a hybrid vehicle being equipped with both an internal combustion engine and an electric motor, and an electric car being equipped with only an electric engine. And, the vehicle may include automobiles, as well as trains, motorcycles, and so on.

At this point, a self-driving car may be considered as a robot having a self-driving function.

<eXtended Reality (XR)>

Extended reality collectively refers to Virtual Reality (VR), Augmented Reality (AR), and Mixed Reality (MR). The VR technology provides an object or background of the real world as a CG image, the AR technology provides a CG image created as a virtual object over an actual real-life object image, and the MR technology is a computer graphic technology providing a mixture and combination of virtual objects in the real world.

The MR technology is similar to the AR technology in that it shows a real-life object with a virtual object. However, the AR technology is different from the MR technology, in that, in the AR technology, the virtual object is used in a form of complementing the real-life object, whereas, in the MR technology, the virtual object and the real-life object are used as equivalent characters.

The XR technology may be applied to a Head-Mount Display (HMD), a Head-Up Display (HUD), a mobile phone, a tablet PC, a laptop computer, a desktop computer, a television receiver (TV), digital synergy, and so on, and a device applying the XR technology may be referred to as an XR device.

Figure 18:
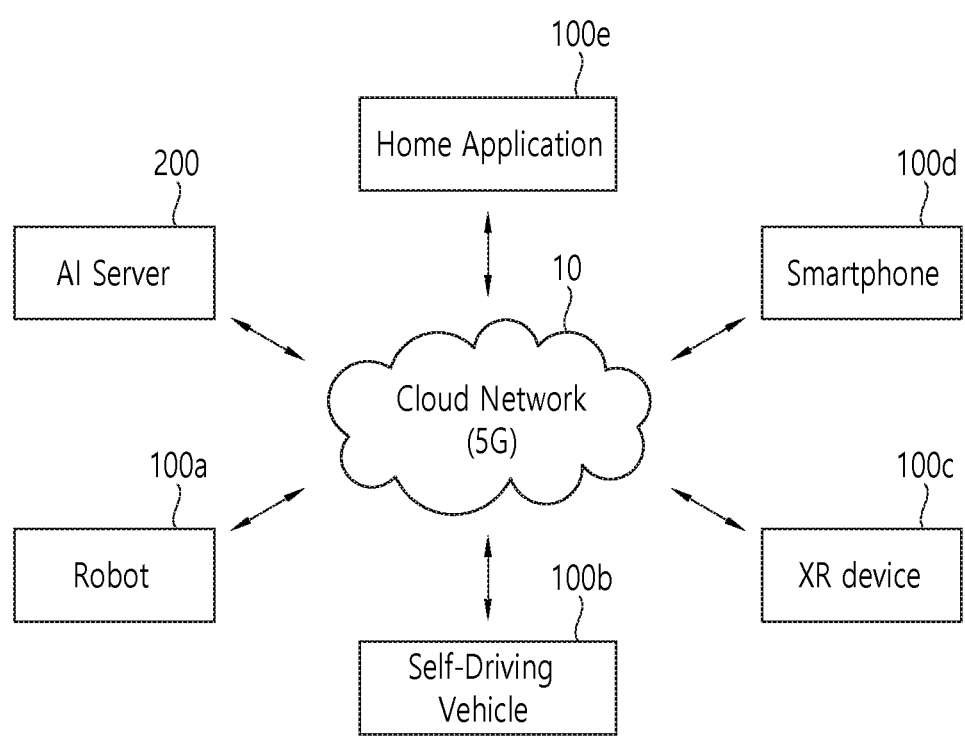
FIG. 18 is a diagram showing an AI system according to an implementation of the present disclosure.

FIG. 18 shows an AI system 1 according to an implementation of the present disclosure.

Referring to FIG. 18, in an AI system 1, at least one or more of an AI server 200, a robot 100a, a self-driving vehicle 100b, an XR device 100c, a smartphone 100d, and a home application 100e is connected to a cloud network 10. Herein, a robot 100a, a self-driving vehicle 100b, am XR device 100c, a smartphone 100d, and a home application 100e adopting the AI technology may be referred to as AI devices 100a to 100e.

The cloud network 10 may refer to a network being partly configured of a cloud computing infra or a network existing inside the cloud computing infra. Herein, the cloud network 10 may be configured by using a 3G network, a 4G or Long Term Evolution (LTE) network, or a 5G network, and so on.

More specifically, each device 100a to 100e and 200 configuring the AI system 1 may be interconnected through the cloud network 10. Most particularly, each device 100a to 100e and 200 may communicate with one another through a base station but may also directly communicate with one another without using the base station.

The AI server 200 may include a server performing AI processing and a server performing calculation of big data.

The AI server 200 is connected to at least one or more of the robot 100a, the self-driving vehicle 100b, the XR device 100c, the smartphone 100d, and the home application 100e through the cloud network 10, and the AI server 200 may assist at least part of the AI processing of the connected AI devices 100a to 100e.

At this point, the AI server 200 teaches an artificial neural network according to a machine learning algorithm instead of the AI devices 100a to 100e, and may also directly store the learning model or may transmit the learning model to the AI devices 100a to 100e.

At this point, the AI server 200 may receive input data from the AI devices 100a to 100e, deduce a result value for the received input data by using the learning model, generate a response or control command based on the deduced result value, and transmit the generated response or control command to the AI devices 100a to 100e.

Alternatively, the AI devices 100a to 100e may also deduce a result value for inputted data by directly using a learning model and generate a response or control command based on the deduced result value.

Hereinafter, various implementations of the AI devices 100a to 100e adopting the above-described technology will be described.

<AI+Robot>

The robot 100a may adopt the AI technology and may, therefore, be realized as a guiding robot, a transport robot, a cleaning robot, a wearable robot, an entertainment robot, a pet robot, an unmanned aerial robot, and so on.

The robot 100a may include a robot control module for controlling operations, and the robot control module may refer to a software module or a chip realizing the software module in the form of hardware.

The robot 100a may obtain status information of the robot 100a by using sensor information obtained from various types of sensors, detect (recognize) the surrounding environment and objects, generate map data, determine a travel path and driving schedule (or plan), determine a response to user interaction, or determine operations.

Herein, in order to determine the travel path and driving schedule (or plan), the robot 100a may use sensor information obtained from at least one or more sensors, among a lidar, a radar, and a camera.

The robot 100a may perform the above-described operations by using a learning model, which is configured of at least one or more artificial neural networks. For example, the robot 100a may recognize the surrounding environment and objects by using the learning model and may determine the operations by using the recognized surrounding environment and objects. Herein, the learning model may be directly learned by the robot 100*a*, or may be learned by an external device, such as the AI server 200, and so on.

At this point, the robot 100*a* may generate a result by directly using the learning model and perform the operations. However, the robot 100*a* may also transmit sensor information to an external device, such as the AI server 200, and may receive a result being generated according to the transmitted information and may then perform the operations.

The robot 100*a* may determine the travel path and driving schedule (or plan) by using at least one or more of map data, object information detected from the sensor information, and object information obtained from an external device, and may control the driving unit to drive the robot 100*a* according to the determined travel path and driving schedule (or plan).

The map data may include object identification information regarding various objects being deployed in the space where the robot 100*a* travels. For example, the map data may include object identification information regarding fixed objects, such as walls, doors, and so on, and movable objects, such as flower pots, desks, and so on. Also, the object identification information may include name, type, distance, location, and so on, of the objects.

Additionally, by controlling the driving unit based on a user control/interaction, the robot 100*a* may perform operations or drive. At this point, the robot 100*a* may obtain intention information of an interaction caused by a user's action or vocal enunciation, and the robot 100*a* may then determine a response to the obtained intention information and may perform the operations.

<Combination of AI, Robot, Self-Driving, XR>

The self-driving vehicle 100*b* may adopt the AI technology and the XR technology and may, therefore, be realized as a mobile robot, a vehicle, an unmanned flying object, and so on.

The XR device 100*c* may adopt the XR technology and may, therefore, be realized as a Head-Mount Display (HMD), a vehicle equipped with a Head-Up Display (HUD), a television receiver (TV), a mobile phone, a smartphone, a computer, a wearable device, a home appliance, digital synergy, a vehicle, a fixed robot or mobile robot, and so on.

The robot 100*a* may adopt the AI technology and the XR technology and may, therefore, be realized as a guiding robot, a transport robot, a cleaning robot, a wearable robot, an entertainment robot, a pet robot, an unmanned aerial robot, a drone, and so on.

As described above, although the implementations have been described as examples, since the content and scope of this specification will not be limited only to a particular implementation of this specification, this specification may be amended, modified, or enhanced to other various forms.

In the above-described exemplary system, although the methods have been described based on the flowcharts using a series of the steps or blocks, this specification will not be limited to the sequence of the steps, and some steps may be performed at different sequences from the above-described steps or may be performed simultaneously with the steps. Furthermore, it shall be understood by those skilled in the art that the steps shown in the flowcharts are not exclusive and may include other steps or one or more steps of the flowcharts may be deleted without affecting the scope of this specification.

Claims in the present description can be combined in various ways. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method performed by a terminal operating in a wireless communication system, the method comprising:

transmitting a registration request message to an Access and Mobility Management Function (AMF);

receiving a registration accept message from the AMF;

when the terminal is located in a non-allowed area, setting a service type information to 4 bits-length service type value indicating "0110" for informing a change in a Packet Switch (PS) data off status of the terminal, based on that the terminal has a pending uplink signaling to inform the change in the PS data off status of the terminal;

when the terminal is located in the non-allowed area, transmitting a service request message to the AMF, based on that the terminal has the pending uplink signaling to inform the change in the PS data off status of the terminal, wherein the change in the PS data off status is related to PS data off being activated or deactivated by the terminal, wherein traffic between the AMF and the terminal is prevented, based on the PS data off being activated, and wherein the non-allowed area is an area in which the terminal is not allowed to transmit the service request message except for cases, which include a case for informing the PS data off status; and receiving, from the AMF, a response message to the service request message, wherein the AMF is configured to transmit a reject message as the response message to the service request message, except for the cases, which include the case for informing the PS data off status, when the terminal is located in the non-allowed area, and based on that an Information Element (IE) for informing the change of the PS data off status is included in the service request message, a service accept message is received as the response message, which is transmitted by the AMF, when the terminal is located in the non-allowed area.

2. The method of claim 1, further comprising:

transmitting a Packet Data Unit (PDU) session modification request message to a Session Management Function (SMF).

3. The method of claim 2, wherein the PDU session modification request message includes information related to the PS data off status of the terminal.

4. The method of claim 1, wherein the non-allowed area is (i) an area in which transmission of the service request message is not allowed or (ii) an area other than an allowed area in which communication with a network is allowed.

5. A device configured to operate in a wireless communication system, the device comprising:

a transceiver;

at least one processor; and at least one computer memory operably connectable to the at least one processor and storing instructions that, based on being executed by the at least one processor, perform operations comprising:

transmitting a registration request message to an Access and Mobility Management Function (AMF);

receiving a registration accept message from the AMF;

when the device is located in a non-allowed area, setting a service type information to 4 bits-length service type value indicating "0110" for informing a change in a Packet Switch (PS) data off status of the device, based on that the device has a pending uplink signaling to inform the change in the PS data off status of the device;

when the device is located in the non-allowed area, transmitting a service request message to the AMF, based on that the device has the pending uplink signaling to inform the change in the PS data off status of the device, wherein the change in the PS data off status is related to PS data off being activated or deactivated, wherein traffic between the AMF and the device is prevented, based on the PS data off being activated, and wherein the non-allowed area is an area in which the device is not allowed to transmit the service request message except for cases, which include a case for informing the PS data off status; and receiving, from the AMF through the transceiver, a response message to the service request message, wherein the AMF is configured to transmit a reject message as the response message to the service request message, when the device is located in the non-allowed area, and based on that an Information Element (IE) for informing the change of the PS data off status is included in the service request message, except for cases, which include a case for informing the PS data off status, a service accept message is received as the response message, which is transmitted by the AMF, when the device is located in the non-allowed area.

6. The device of claim 5, wherein the operations further comprise:
transmitting a Packet Data Unit (PDU) session modification request message to a Session Management Function (SMF).

7. The device of claim 6, wherein the PDU session modification request message includes information related to the PS data off status of the device.

8. The device of claim 5, wherein the operations further comprise:
setting the service type information in the service request message to a service type that is for informing the change of the PS data off status of the device.

9. The device of claim 5, wherein based on that the device is located in the non-allowed area:
the service type information in the service request message is used to enable the AMF to transmit a service accept message as the response message to the service request message.

10. The device of claim 5, wherein the non-allowed area is (i) an area in which transmission of the service request message is not allowed or (ii) an area other than an allowed area in which communication with a network is allowed.

11. The device of claim 5, wherein the device is an autonomous driving device that is configured to communicate with at least one of a mobile terminal, a network, or an autonomous vehicle other than the device.

12. A processing apparatus configured to control a wireless communication device, the processing apparatus comprising:
at least one processor; and
at least one computer memory operably connectable to the at least one processor and storing instructions that, based on being executed by the at least one processor, perform operations comprising:
transmitting a registration request message to an Access and Mobility Management Function (AMF);
receiving a registration accept message from the AMF;
when the wireless communication device is located in a non-allowed area, setting a service type information to 4 bits-length service type value indicating "0110" for informing a change in a Packet Switch (PS) data off status of the wireless communication device, which is located in the non-allowed area, based on that the wireless communication device has a pending uplink signaling to inform the change in the PS data off status of the wireless communication device;
when the wireless communication device is located in the non-allowed area, transmitting a service request message to the AMF, based on that the wireless communication device has the pending uplink signaling to inform the change in the PS data off status of the wireless communication device,
wherein the change in the PS data off status is related to PS data off being activated or deactivated,
wherein traffic between the AMF and the wireless communication device is prevented, based on the PS data off being activated,
wherein the non-allowed area is an area in which the wireless communication device is not allowed to transmit the service request message except for cases, which include a case for informing the PS data off status; and
receiving, from the AMF, a response message to the service request message,
wherein the AMF is configured to transmit a reject message as the response message to the service request message, when the wireless communication device is located in the non-allowed area, and
based on that an Information Element (IE) for informing the change of the PS data off status is included in the service request message, except for cases, which include a case for informing the PS data off status, a service accept message is received as the response message, which is transmitted by the AMF, when the wireless communication device is located in the non-allowed area.

* * * * *